(12) United States Patent  
Gerszberg et al.

(10) Patent No.: US 6,396,531 B1
(45) Date of Patent: May 28, 2002

(54) SET TOP INTEGRATED VISIONPHONE USER INTERFACE HAVING MULTIPLE MENU HIERARCHIES

(75) Inventors: Irwin Gerszberg, Kendall park; Jeffrey S. Martin, Dover; Thomas Oplinger, Morristown; Philip Andrew Treventi, Murray Hill; Hopeton S. Walker, Haledon, all of NJ (US)

(73) Assignee: AT+T Corp., New York, NY (US)

( * ) Notice: Subject to any disclaimer, the term of this patent is extended or adjusted under 35 U.S.C. 154(b) by 0 days.

(21) Appl. No.: 09/224,286

(22) Filed: Dec. 31, 1998

Related U.S. Application Data

(63) Continuation-in-part of application No. 09/001,908, filed on Dec. 31, 1997.

(51) Int. Cl.[7] .................................................. H04M 7/14
(52) U.S. Cl. ................................ 348/14.01; 348/14.03; 348/14.05; 379/93.17
(58) Field of Search ...................... 348/14, 15; 345/173, 345/352, 353, 356, 357, 329, 978; 379/93.24, 93.12, 93.17, 93.23, 110.01

(56) References Cited

U.S. PATENT DOCUMENTS

| | | |
|---|---|---|
| 4,456,925 A | 6/1984 | Skerlos et al. |
| 4,620,289 A | 10/1986 | Chauvel |
| 4,725,694 A | 2/1988 | Auer et al. |
| 4,775,935 A | 10/1988 | Yourick |
| 4,916,441 A | 4/1990 | Gombrich |
| 5,014,267 A | 5/1991 | Tompkins et al. |
| 5,157,717 A | 10/1992 | Hitchcock |
| 5,305,197 A * | 4/1994 | Axler et al. ................. 364/401 |
| 5,335,276 A | 8/1994 | Thompson et al. |
| 5,393,964 A | 2/1995 | Hamilton et al. |
| 5,406,615 A | 4/1995 | Miller, II et al. |
| 5,488,412 A | 1/1996 | Majeti et al. |
| 5,512,935 A | 4/1996 | Majeti et al. |
| 5,515,424 A | 5/1996 | Kenney |
| 5,534,913 A | 7/1996 | Majeti et al. |
| 5,546,316 A | 8/1996 | Buckley et al. |
| 5,561,604 A | 10/1996 | Buckley et al. |
| 5,572,005 A | 11/1996 | Hamilton et al. |
| 5,583,965 A | 12/1996 | Douma et al. |
| 5,584,054 A | 12/1996 | Tyneski et al. |
| 5,587,735 A | 12/1996 | Ishida et al. |
| 5,619,684 A | 4/1997 | Goodwin et al. |

(List continued on next page.)

FOREIGN PATENT DOCUMENTS

| | | | |
|---|---|---|---|
| DE | 38 37 620 A1 | 4/1989 | |
| EP | 0794642 A2 * | 9/1997 | ........... H04L/29/06 |
| GB | 2 302 478 | 1/1997 | |
| JP | 64-35692 | 2/1989 | |
| JP | 408331531 A * | 12/1996 | ............ H04N/7/14 |

Primary Examiner—Melur Ramakrishnaiah
(74) Attorney, Agent, or Firm—Banner & Witcoff

(57) ABSTRACT

A system architecture for bypassing a local exchange carrier comprises an intelligent terminal, a residential gateway coupled to the terminal, a cable facility management platform terminating a twisted pair or coaxial cable facility and a network service platform. The platform serves both a cable headend and a telephone DSL network to enable a single service provider to provide different information content services independent of how a user actually receives the services. The twisted pair and/or coaxial cable fed, integrated residence gateway controlled intelligent terminal or set-top device provides a multiple menu heirarchy for selecting a plurality of enhanced services. The menus are implemented on a video telephone or similar device with a touch-sensitive screen display for interactively displaying video and accompanying audio signals and menu screens. The integrated residence gateway is coupled to either or both of the coaxial cable or twisted pair and distributes the bandwidth facilities available over either service vehicle to customer devices including the set top box.

30 Claims, 68 Drawing Sheets

U.S. PATENT DOCUMENTS

| | | | |
|---|---|---|---|
| 5,621,456 A | * | 4/1997 | Florin et al. .................... 348/7 |
| 5,633,920 A | | 5/1997 | Kikinis et al. |
| 5,638,438 A | | 6/1997 | Keen |
| 5,644,628 A | | 7/1997 | Schwarzer et al. |
| 5,671,267 A | | 9/1997 | August et al. |
| 5,682,195 A | | 10/1997 | Hendricks et al. |
| 5,684,918 A | | 11/1997 | Abecassis |
| 5,802,147 A | | 9/1998 | Beyda et al. |
| 5,815,142 A | | 9/1998 | Allard et al. |
| 5,838,775 A | * | 11/1998 | Montalbano ............. 379/93.23 |
| 5,845,263 A | * | 12/1998 | Camaisa et al. ............... 705/27 |
| 5,875,110 A | | 2/1999 | Jacobs |
| 5,884,271 A | * | 3/1999 | Pitroda .......................... 705/1 |
| 5,922,047 A | * | 7/1999 | Newlin et al. ......... 345/200.47 |
| 5,943,055 A | * | 8/1999 | Sylvan ....................... 345/346 |
| 5,999,207 A | * | 12/1999 | Rodriguez et al. ............ 348/14 |
| 6,026,158 A | * | 2/2000 | Bayless et al. ............. 379/355 |
| 6,029,062 A | * | 2/2000 | Hanson ..................... 455/408 |
| 6,072,520 A | * | 6/2000 | Yuen et al. .................. 348/5.5 |
| 6,237,145 B1 | * | 5/2001 | Narasimhan et al. ......... 725/23 |

\* cited by examiner

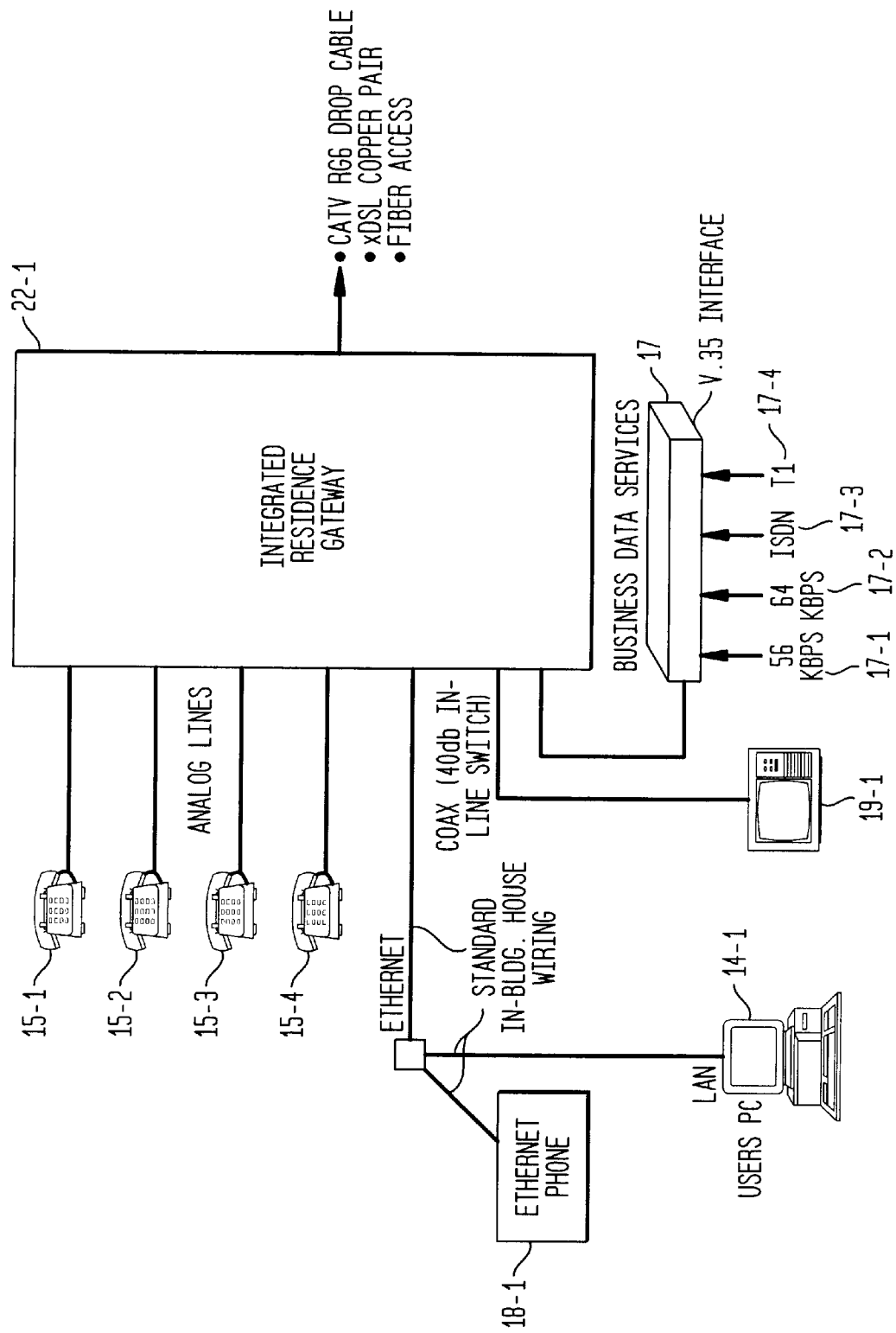

AT&T CASH AND COUPON SERVICES

FIG. 49

```
                    IP TELEPHONY PARENTAL CONTROL MENU
                                (KITCHEN)

TIME RESTRICTIONS
    1350 ─┐ ☐ RESTRICT HOURS OF USE BETWEEN THESE HOURS:   6:00 AM  TO  8:00PM
    1352 ─┐ ☒ UNRESTRICTED

TIME RESTRICTIONS
    1354 ─┐ ☐ LOCAL & CREDIT CARD CALLING ONLY
    1356 ─┐ ☐ LOCAL ONLY
             UNRESTRICTED
    1358 ─┐ ☐ RESTRICT AREAS CODES
             971, 555, 412

┌──────┐
                                              │ DONE │ ─── 1322
                                              └──────┘
```

SET TOP INTEGRATED VISIONPHONE USER INTERFACE HAVING MULTIPLE MENU HIERARCHIES

This application is a continuation-in-part of U.S. application Ser. No. 09/001,908, filed Dec. 31, 1997, entitled "Videophone User Interface Having Multiple Menu Hierarchies" of Gerszberg et al.

FIELD OF THE INVENTION

The invention relates generally to combined cable and telephone communication systems and, more particularly, to a user interface having multiple menu hierarchies for selecting local house or feeder to a house programming, telephone, and Internet services using a hybrid optical fiber and twisted pair and/or coaxial cable connected multiplexing line. The menus are implemented on a video telephone or similar device with a touch-sensitive screen display for interactively displaying video and accompanying audio signals and menu screens.

BACKGROUND

As deregulation of the telephone industry continues and as companies prepare to enter the local telephone access market, there is a need to offer new and innovative, high bandwidth services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange carrier company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the type of DSL modem provided by the local telephone company must also be the same type provided to the end user in the customer premises equipment (CPE). Additionally, since the network is not completely controlled by the interexchange companies, it is difficult for the interexchange companies to provide data at committed delivery rates and/or desired quality levels. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

Another opportunity to bypass the local telephone company is for the interexchange carrier to employ wireless means of reaching the local telecommunications service subscriber. In co-pending U.S. patent application Ser. No. 09/001,363, filed Dec. 31, 1997, entitled "ISD Wireless Network", it was suggested to provide a wireless integrated service director for communicating with wireless subscriber apparatus. Also, from other U.S. Patent Applications, for example, in "Circuit-Switched Switching System" U.S. Pat. No. 5,978,370, issued Nov. 2, 1999, it is known to provide satellite or other wireless connections directly to the local subscriber, thus bypassing the local network and the local telephone company.

Yet another opportunity for bypassing the local telephone company is the provision of telecommunications services over known coaxial cable or hybrid optical fiber coaxial cable television transmission systems utilizing cable television spectrum in the downstream (toward the subscriber) and upstream (toward the cable television headend) paths for such services. For example, Time Warner has been experimenting with the provision of telecommunications services to and among cable television service subscribers in various geographic regions of the country with marginal success.

As part of this system, there is a need for improved architectures, services and equipment utilized to distinguish the interexchange companies' products and services.

As new services which require the transfer of large amounts of data over existing telephone networks are created, so is there an equal increase in the need for specialized devices or peripherals that will allow users to gain access to these enhanced services. Users are already overwhelmed by the number of access devices that they have to obtain and interact with in order to access these enhanced services. As a result, there exists a need to create one device that can transparently provide speedy access to all of these enhancement services.

With a proliferation of new services, users now require an integrated device that incorporates access to all of the different services that might be available into a single access device. The present invention provides such a device. It seamlessly integrates traditional telephoning functions with advanced computer functions such as advertising, directory assistance, customer service, etc., and video display to form a unique, single platform that incorporates a high speed link into the network to give the user direct access to these services. Presently, many different hardware platforms are used to independently provide access to these services. The present invention integrates access to these services into a single platform with a user friendly interface.

SUMMARY OF THE INVENTION

In order to provide an improved network, it is desirable for the interexchange companies to have access to at least one of the twisted-pair lines, coaxial cable, hybrid fiber facilities with either twisted pair or coaxial cable or alternate wireless facility connecting each of the individual users to the local cable television or toll telephone or hybrid network before the lines are routed through the conventional local telephone network equipment. It is preferable to have access to these lines prior to any modem or switching technology offered by the local telephone service providers. By having access to the twisted-pair wires or coaxial cable or hybrid facilities entering or leading to the customer's premises, interexchange companies can differentiate their services by providing higher bandwidth, improving the capabilities of the customer premises equipment, and lowering overall system costs to the customer by providing competitive service alternatives.

In one embodiment of the present invention, the interexchange carrier may obtain access to the coaxial cable feeding subscribers to existing cable television services, for example, at a subscriber tap or after a fiber/coaxial cable hub or node in a hybrid fiber coaxial cable television distribution plant. The interexchange carrier may ultimately provide services via the optical fiber leaving the cable television headend. The cable television set top terminal may comprise a telecommunications apparatus. A separate cable modem connected intelligent terminal may provide such services as plain old telephone services, high speed Internet services, video conference services, directory services, multimedia services or other digital services depending on subscriber requirements and capabilities.

A new architecture for providing such services may utilize a video phone and/or other devices to provide new services to an end user; a residence gateway which may be an integrated residence gateway (IRG) disposed near the customer's premises for multiplexing and coordinating many digital services onto a single twisted-pair line or coaxial cable (or both); a cable facilities management platform (C-FMP) disposed remote from or in the local telephone network's central office, the subscriber loop or the coaxial cable distribution plant for routing data to an appropriate interexchange company network; and a network server platform (NSP) coupled to the C-FMP for providing new and innovative services to the customer and for distinguishing services provided by the interexchange companies from those services provided by the local telephone network.

As part of this system, one aspect of the invention provides active components located in the CATV/telephone network access unit such as a cable/xDSL modem, multiplexer, and a controller.

The present invention provides an innovative way for integrating a plurality of access devices used to access multiple video, audio and telephoning services into a revolutionary telephoning device. The device utilizes intelligent control circuitry that integrates several service access devices into one unit that has a user-friendly interface and flexible connectivity to the various media and communications networks (for example, cable, SONET, wireless, Internet, and satellite). In order to reduce the cost of each video telephone, some of the software operations are downloaded from the telephone network on an application by application basis. In addition, the present invention is capable of providing a motion detection advertising service so as to display advertisements when a person is in the proximity of the video telephone thus creating a more efficient method of advertising.

According to one embodiment of the present invention, a video telephone creates a tremendous advantage by offering a versatile user interface with multiple menu hierarchies which gives the user the ability to select various cable, satellite, and broadcast program packages; access available Internet services; and place and receive phone calls while offering services that are advanced compared with traditional telephoning. Some of these services include: parental control, cable programming access, satellite programming access, interactive and downloadable videogame services, video on demand, voice calls, video calls, voice recognition, bill paying, Internet access, self-provisioning, advertising, e-mail, voicemail, videomail, operator services, debit card transactions, and alarm monitoring.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 1E illustrates an expanded view of a residence architecture for enhanced CATV/telephony services.

FIG. 49 illustrates a kitchen IP telephony parental control menu screen according to one embodiment of the present invention.

DETAILED DESCRIPTION OF PREFERRED EMBODIMENTS

Figure 1A:
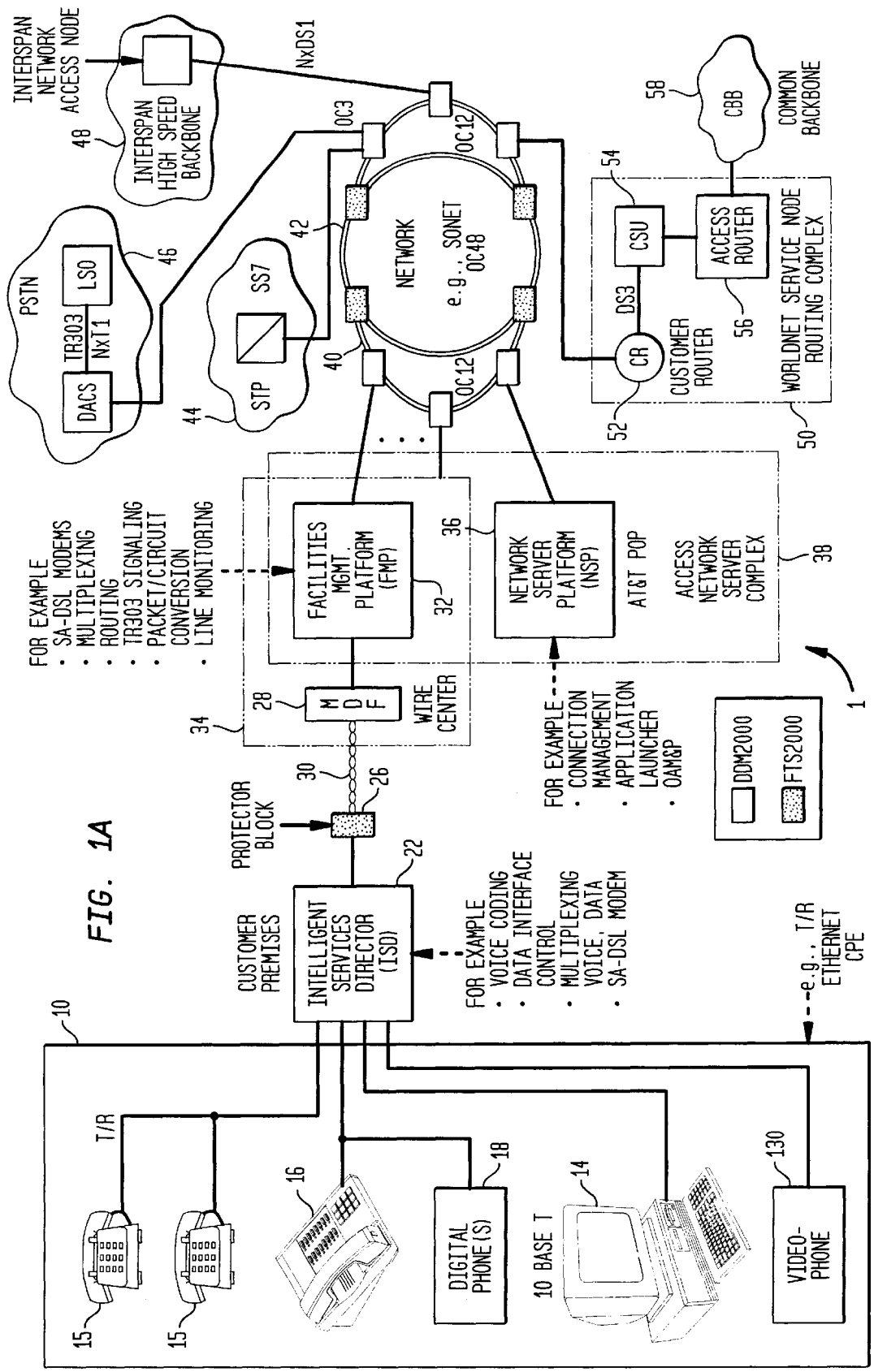
FIG. 1A illustrates an embodiment of a hybrid fiber twisted pair local loop architecture.

Referring to FIG. 1A, a first exemplary communication network architecture employing a hybrid fiber, twisted-pair (HFTP) local loop 1 architecture is shown. This network and an intelligent service director controlled set-top box are already described by U.S. patent application Ser. Nos. 09/001,360 and 09/001,424, filed Dec. 31, 1997, incorporated as to their entire contents by reference. Those descriptions are summarized here by way of introduction to a related and potentially overlapping or integrated architecture which will be described with reference to FIGS. 1B–1E. Similar reference numerals are used throughout to denote similar elements.

Figure 1B:
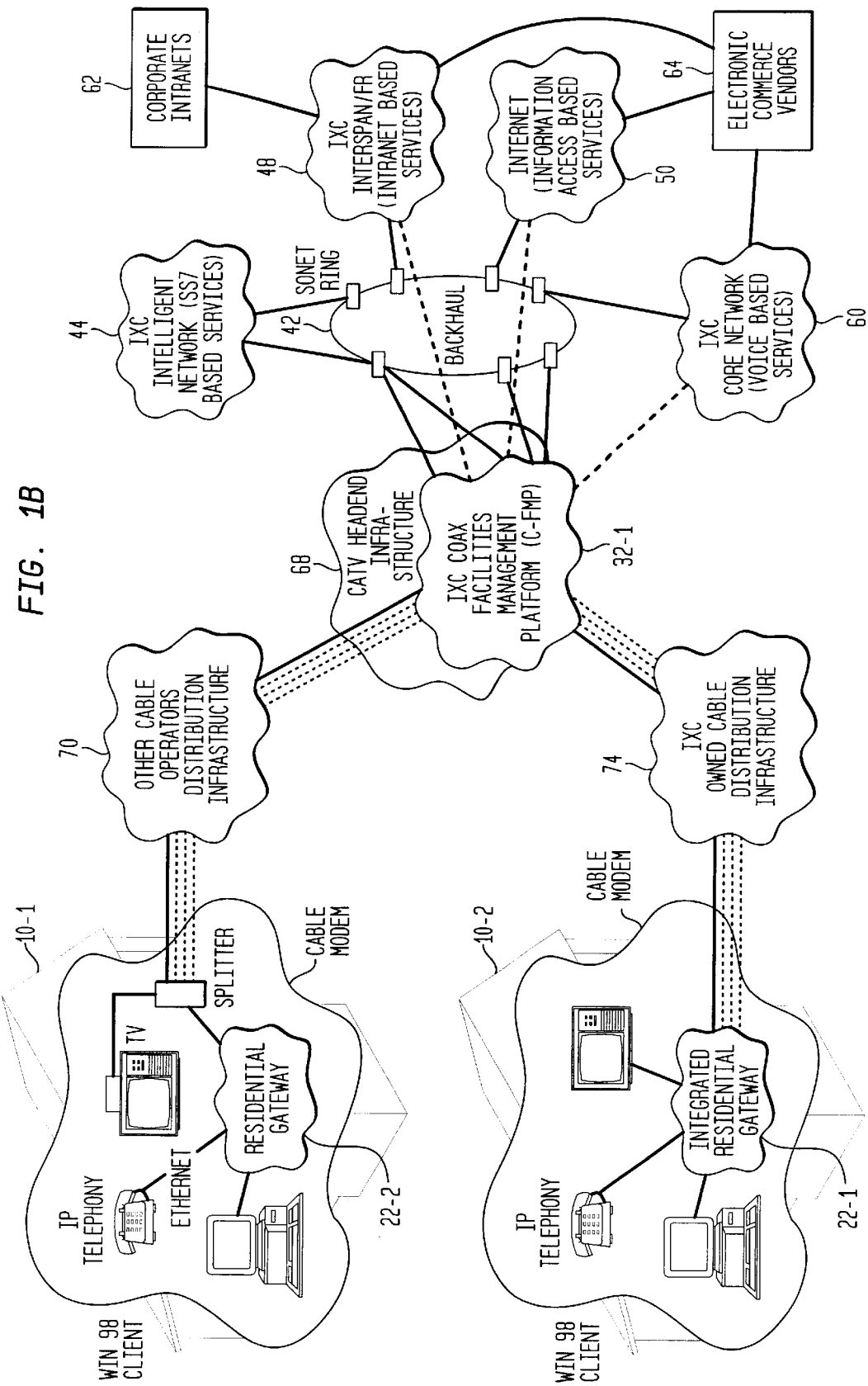
FIG. 1B illustrates alternative arrangements wherein an interexchange carrier may access a subscriber premises via an inter-exchange carrier owned or another cable television company.

According to FIG. 1A, an intelligent services director (ISD) 22 may be coupled to a telephone central office 34 via a twisted-pair wire, hybrid fiber interconnection, wireless and/or other customer connection 30, a connector block 26, and/or a main distribution frame (MDF) 28. Referring briefly to FIG. 1B, and according to the present invention, the ISD 22 is replaced by either a residential gateway 22-2 (when an interexchange carrier partners with a cable television service provider) or an integrated residential gateway 22-1 (when an interexchange carrier is integrated with the cable television service provider. FIG. 1B further shows other cable operators distribution infrastructure 70 or IXC owned cable distribution infrastructure 74 connected to a CATV headend infrastructure 68 which may include an inter-exchange carrier coaxial Cable Facilities Management Platform 32-1. Per FIG. 1B, the CATV headend 68 is in turn connected to a backhaul SONET ring 42 and to various alternative service networks including but not limited to IXC SS-7 based services 44, IXC interspan, frame relay services 48 (to corporate intranets 62), and via frame relay 48, Internet service cloud 50 or IXC core network 60 to electronic commerce vendors 64.

Wireless communication in FIG. 1A may be via land-based intelligent base stations or by satellite. The ISD 22 and the telephone central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, an xDSL modem (for example, a tethered virtual radio channel (TVRC) modem) (shown in FIG. 4A). The remaining data may be output to a high speed backbone network (for example, a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

As will be discussed in connection with FIGS. 1B–1E, an alternative or integrated way of reaching subscriber 10 to hybrid fiber/twisted pair facilities is via hybrid fiber/coaxial cable facilities of a cable television service provider. Such an arrangement may bypass the local subscriber loop and the local telephone switching central office or wire center 34 altogether. There are several varieties of hybrid fiber coaxial cable distribution facilities. In one embodiment fiber is provided to curb; that is, fiber reaches the subscriber tap where from the tap, coaxial cable is "dropped" or provided via an underground pedestal to the customer premises. In another embodiment, fiber reaches an active amplifier chain for providing downstream services to several thousand subscribers. In yet another embodiment, fiber reaches a plurality of microcells of customer premises which can be served by passive (rather than active) devices. Referring briefly to FIGS. 1-C and 1-D, a cable facilities management platform (C-FMP) 32-1, 32-2, 32-3, in such an alternative, may be located at the telephone central office, a cable television headend (as per FIG. 1-B) or in the cable television signal distribution plant, for example, at a fiber/coax node or hub.

Referring again to FIG. 1A, the FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (for example call setup SS7-type network 44), and/or a network server platform (NSP) 36. Alternatively, the FMP 32 may be directly connected to any of these networks. One or more FMPs 32 may be connected directly to the high speed backbone network (for example, direct fiber connection with the SONET network 42) or they may be linked via a trunk line (for example, trunks 40 or 42) to one or more additional networks.

Figure 1C:
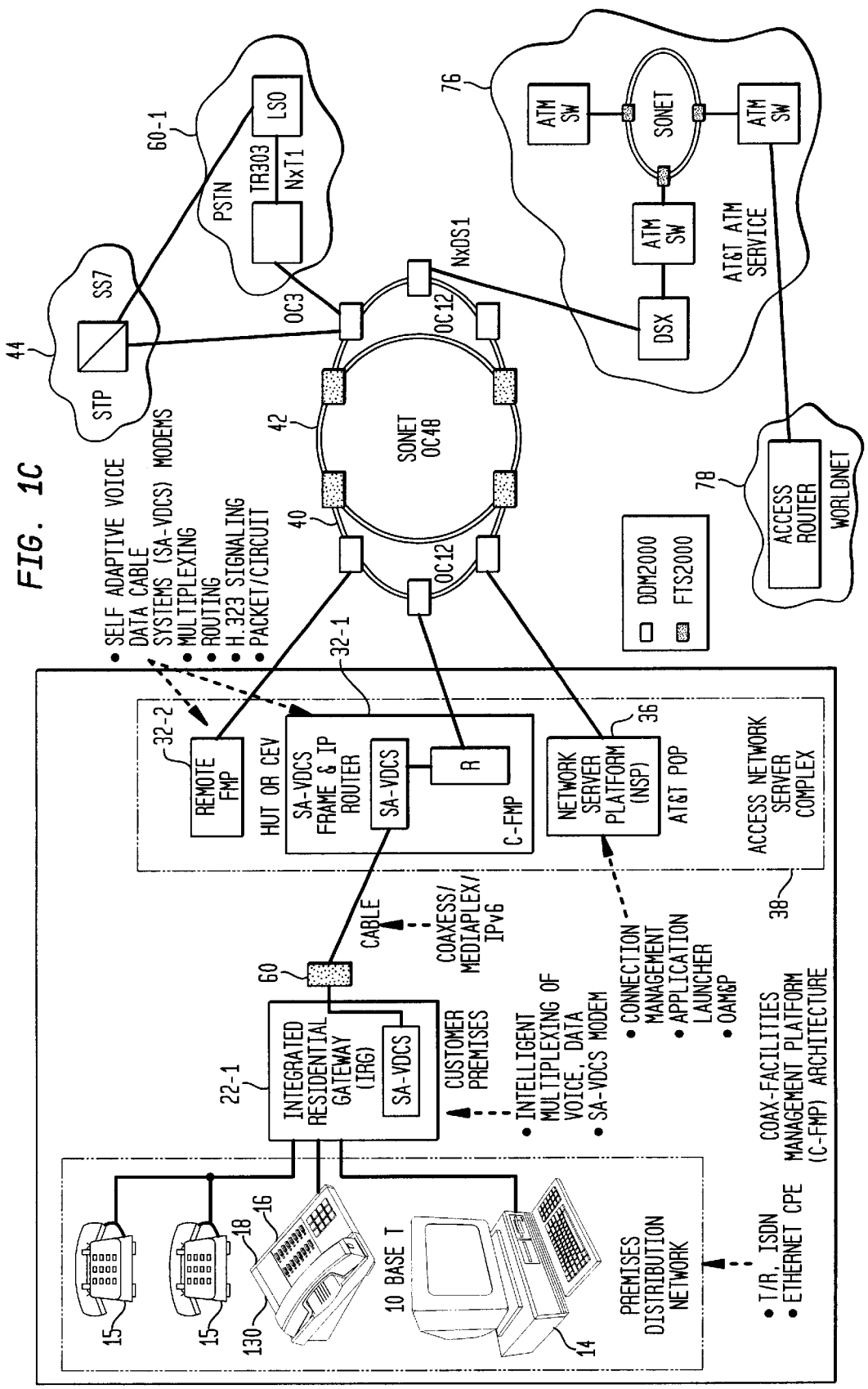
FIG. 1C illustrates an embodiment of FIG. 1B where an integrated residence gateway and coaxial cable facilities management platform (C-FMP) provide enhanced residence services via hybrid fiber coaxial cable distribution plant access.

Similarly, referring to FIG. 1C, remote FMP 32-2, C-FMP 32-1 and a network server platform 36 are connected to SONET, for example, an OC48 ring 42 with ports 40 for connection to telephony out-of-band signaling SS7 network 44, ATM cloud 76 or Internet network 78, frame relay networks, interworked networks or other networks (not shown).

In either FIG. 1A or FIG. 1C, the NSP 36 may provide a massive cache storage for various information that may be provided across the SONET net 42 to the FMP 32 of C-FMP 32-1 and out to the ISD 22 (FIG. 1A) or integrated residential gateways (RGs) 22-1 or 22-2 (FIG. 1-B) via tap 60. The NSP 36 and the FMP 32 or C-FMP 32-1 may collectively define an access network server complex 38. The NSP 36 may be interconnected with multiple FMPs 32 or C-FMP's 32-1. Furthermore, each FMP/C-FMP 32, 32-1 may interconnect with one or more ISDs 22 or IRGs 22-1. The NSP 36 may be located anywhere but is preferably located in a point-of-presence (POP) facility. The NSP 36 may further act as a gateway to, for example, any number of additional services.

The ISD 22 or IRG 22-1 FIGS. 1C, 1E) may be interconnected to various devices such as a videophone 130, other digital phones 18, set-top devices (not shown), computers 14, and/or other devices 15, 16 comprising the customer premise equipment 10. Per FIG. 1E, the IRG 22-1 is shown coupled with a plurality of analog lines 15-1 to 15-4 to a business data services interface 17, for example, a set of V. 35 interfaces, for providing various digital bandwidth services such as an 56 Kbps service 17-1, 64 Kbps service 17-2, ISDN service 17-3 and T1 (1.544 Megabps service) 17-4. An Ethernet link serves an Ethernet telephone 18-1 and the user's personal computer local area network including PC 14-1 provided via telephone house wiring. The user's television 19-1 and other coaxial cable fed devices are connected to CATV and enhanced services via in-house coaxial cable.

The customer premise equipment 10 may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 or C-FMP 32-1 and thereafter to the NSP 36 for reinitialization and downloading of new applets. To ensure widespread availability of the new features made possible by the present architecture, the customer premise equipment 10 may be provided to end users either at a subsidized cost or given away for free, with the cost of the equipment being amortized over the services sold to the user through the equipment. Additionally, the service provider may collect fees from advertisers to subsidize the cost of the equipment.

Figure 1D:
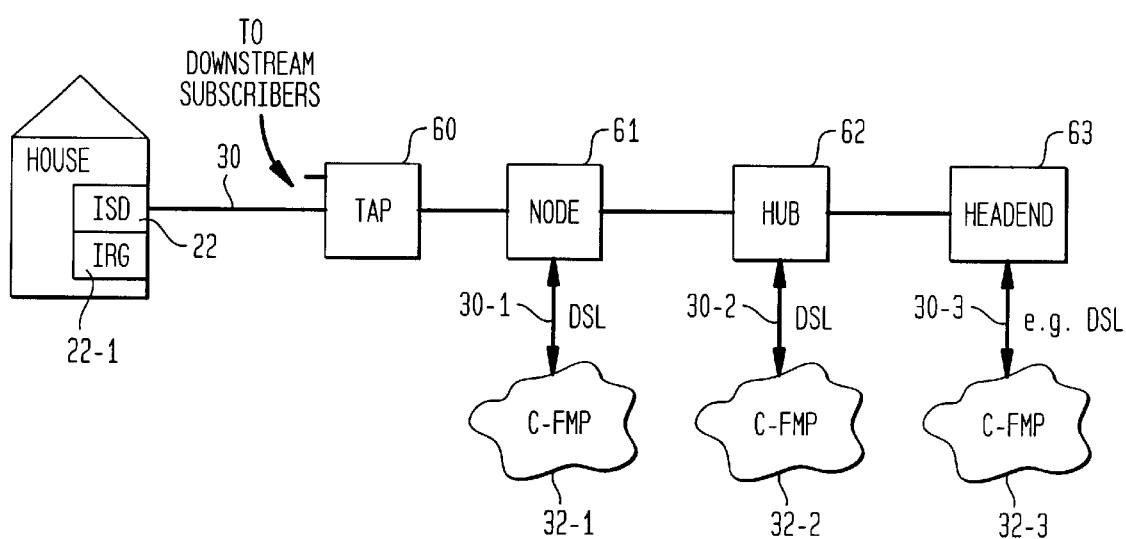
FIG. 1D illustrates an embodiment of a hybrid fiber coaxial cable local loop architecture that shows when the C-FMP may connect within the architecture of FIG. 1B or FIG. 1C.

Referring to FIG. 1D, similar reference characters are utilized to denote similar elements. While a house is depicted, any customer premises is intended, for example, a personal residence, a multiple dwelling unit or a small or large business premises. In many such situations, the ISD 22 or IRG 22-1 introduced above may be mounted to the side of the premises, in an accessible wire closet inside the premises or in the basement among other places discussed herein. In a cable television arrangement, facility 30 coupling tap 60 to a premises is typically a coaxial cable or may comprise a CommScope or other cable manufacturer head-end cable that comprises both coaxial cable and twisted pairs, for example, the CommScope 3-22 which provides three 22 gauge audio pair in addition to a coaxial cable television drop. Power also may be fed down the drop to power the ISD 22. Likewise the facility from node 61 to tap 60 may comprise such a coaxial cable facility or, in a fiber to the curb arrangement, may comprise optical fiber. Similarly, the facility linking hub 62 and node 61 may comprise an optical fiber or a coaxial cable. In a hybrid fiber coaxial cable arrangement the facility connecting headend 63 and hub 62 is typically an optical fiber and in a conventional cable television system comprises a coaxial cable.

As shown in FIG. 1D, the C-FMP 32-1 may be connected to a node 61 of a hybrid fiber coaxial cable plant typically with coaxial cable in and out of the node and where active amplifier or passive devices are provided for providing service to downstream subscribers. A C-FMP 32-2 may be connected to a hub 62 of a hybrid fiber coaxial cable television plant where the fiber typically terminates and the coaxial cable link to a plurality of subscribers (not shown) begins. Also, a C-FMP 32-3 is shown coupled to the cable television headend 63 where cable television service for a geographic region over a hybrid fiber coaxial cable or pure coaxial cable facility originates. If the C-FMP 32-1 is not located at the headend, hub, or node, the facility between the C-FMP 32-1 and these may comprise a DSL twisted pair facility in one embodiment shown or a coaxial cable or optical fiber in another embodiment.

A known coaxial cable television tap 60 is shown where 1, 2, 4 or up to 8 subscriber drop cables tie in to the coaxial cable serving downstream subscribers. Tap 60 comprises a directional coupler for permitting a subscriber to tap into the main downstream coaxial cable to receive service. When a tap is being serviced or repaired, the downstream service is typically interrupted for the duration of the service or repair. It is a principle of the present invention to design the tap or the service so that "lifeline" support may be provided to a customer over a coaxial cable facility. Such a scenario means that both service and power for powering a subscriber telephone device may not be interrupted. The tap may be provided, for example, with a redundant switchable coupler such that one, when taken out-of-service may leave the other redundant coupler in service and power pass-through to downstream subscribers.

Power in a cable television system is typically provided for powering active amplification devices. Set top terminals are typically powered from AC power lines within the premises. The downstream cable television power is typically 90 V AC. In telephony, the line power is typically 48 volts DC. Thus there is a difference between telephone and cable television power services. Furthermore, the tap and drop cable for television service may be over the same strand or a different strand and may enter the premises in a different entry way than the drop wire for telephone. House wiring systems of coaxial cable in cable television and twisted pair for telephony may be totally different and are completely within the control of the subscriber, the television service provider and/or the telephone service provider. These differences must be accounted for in design of a particular premises installation.

Figure 2:
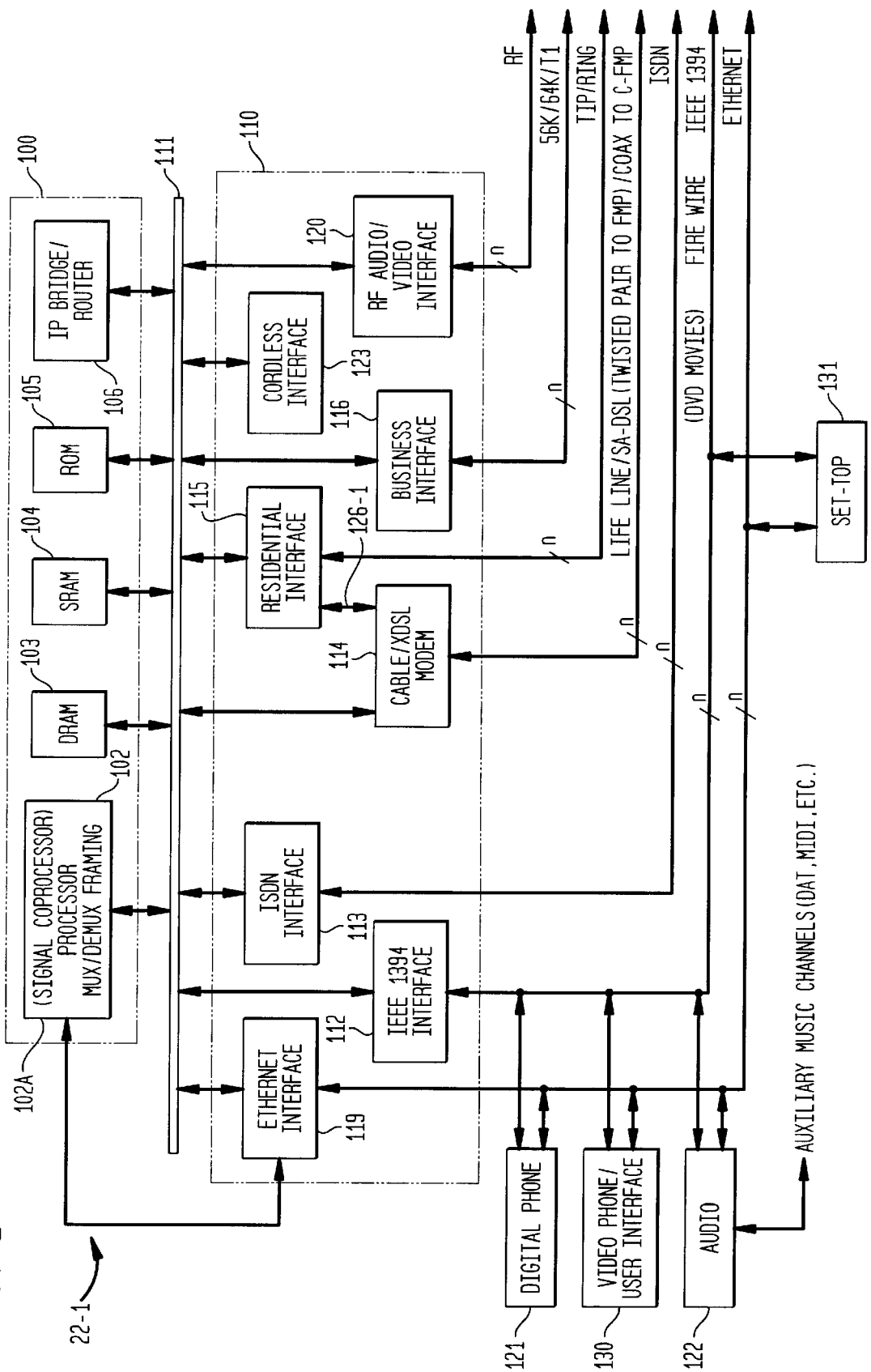
FIG. 2 is a block diagram of an embodiment of an integrated residence gateway consistent with the architecture shown in FIGS. 1A and 1B.

Referring to FIG. 2, there is shown an IRG 22-1 which is very similar to an ISD 22 discussed in earlier U.S. application Ser. No. 09/001,424, filed Dec. 31, 1997. The IRG 22-1 may connect with a variety of devices including analog and digital voice telephones 15, 18; digital videophones 130, devices for monitoring home security, meter reading devices (not shown), utilities devices/energy management facilities (not shown), facsimile devices 16, digital audio devices via audio interface 122, personal computers 14, cable television set top devices 131 and/or other digital or analog devices. Some or all of these devices may be connected with the IRG 22-1 via any suitable mechanism such as a single and/or multiple twisted-pair wires, in-premises coaxial cable, fiber and/or a wireless connection. For example, a number of digital devices may be multi-dropped on a single twisted-pair (to FMP) or coaxial cable (to C-FMP) connection. Similarly, analog phones and other analog devices may be multi-dropped using conventional techniques. Set top cable television terminals 131 or personal computers utilizing cable modem bandwidth Internet services are typically coupled to IRG 22-1 to coaxial cable lines run within the home. Alternatively, services are provided via an Ethernet interface 119 or other high bandwidth interface.

The IRG 22-1 may be located within the home/business, in a wire closet, in the basement or mounted exterior to the home/business. The IRG 22-1 may operate from electrical power supplied by the local or central office 34, by power supplied by the headend 63 and/or from the customer's power supplied by the customer's power company. Where the IRG 22-1 includes an xDSL or cable modem 114, it may be desirable to power the IRG 22-1 with supplemental power from the home in order to provide sufficient power to enable the optimal operation of the xDSL/cable modem.

As shown in FIG. 2, in some embodiments the IRG 22-1 may include a controller 100 which may have any of a variety of elements such as a central processing unit 102, a DRAM 103, an SRAM 104, a ROM 105 and/or an Internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (for example, for 10 Base T, 100 Base T, etc.), an IEEE 1394 "fire wire" interface 112 (for example, for a digital videodisc device (DVD)), an xDSL/cable modem interface 114 (for example, TVRC or other digital subscriber line (xDSL) and/or cable modem), a residential interface 115, (for example, standard POTS phone systems such as tip ring), a business interface 116 (for example, a T1 line or slower data speed and/or PABX interface), a radio frequency (RF) audio/video interface 120 (for example, a coaxial cable television connection to a set-top box/television or to a personal computer), and a cordless phone interface 123 (for example, a 900 MHZ or other unlicensed frequency transceiver). Connected to one of the network interfaces and/or the system bus 111 may be any number of devices such as an audio interface 122 (for example, for digital audio, digital telephones, digital audio tape (DAT) recorders/players, music for restaurants, MIDI interface, DVD, etc.), a digital phone 121, a videophone/ user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the IRG 22-1 to the local telecommunications company's central office 34 and, in particular, to the FMP 32 or C-FMP 32-1 located in the central office 34. Lifeline 126 may connect to Tip/Ring (conventional) and may be provided as lifeline 126-1 via xDSL modem 114 to twisted pair or via integral or separate cable modem 114 to coaxial cable.

A fundamental difference between an ISD 22 and the IRG 22-1 of the present invention is the IRG's ability to receive or transmit signals over a coaxial drop or a twisted pair drop or both. An xDSL modem and a cable modem operate according to different protocols. Typically, the twisted pair facility is terminated by an xDSL modem which provides available bandwidth services over a dedicated twisted pair subscriber loop while the cable modem provides an upstream band of frequencies of approximately 5–40 Megahertz susceptible to noise ingress over the cable plant and as much as one gigahertz of bandwidth in the downstream direction. Both upstream and downstream bandwidth is shared with other upstream subwscribers.

A typical cable modem, for example, one implementing a data over cable service interface specification (DOCSIS), comprises QPSK or 16-QAM modulation for upstream transmission and 64 or 256 point QAM for downstream transmission. Each 6 MHZ downstream or upstream channel can provide up to 38 Mbps data service in accordance with quality of service constraints since the bandwidth is shared with other downstream and upstream subscribers. Some studies suggest that up to 200 or more subscribers can share the bandwidth effectively. In the upstream direction due to various issues a 10 Mbps may be provided. In contrast to Ethernet's CSMA/CD protocol, the DOCSIS access scheme provides cable/telephone operators the opportunity to fill their pipelines at 75% or greater of their theoretical capacity. Data encryption, for example, DES-based encryption/ decryption, provides privacy to users of the shared upstream and downstream bandwidth.

The ISD/IRG 22, 22-1 may be variously configured to provide any number of suitable services. For example, the ISD/IRG 22, 22-1 may offer high fidelity radio channels by allowing the user to select a particular channel and obtaining a digitized radio channel from a remote location and outputting the digital audio, for example, on an audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device 131. These services may include any number of suitable services such as weather, headlines in the news, stock quotes, neighborhood community services information, ticket information, restaurant information, service directories (for example, yellow pages), call conferencing, billing systems, mailing systems, coupons, advertisements, maps, classes, Internet, pay-per-view (PPV), and/or other services using any suitable user interface such as the audio interface 122, the video phone I user interface 130, digital phones, 121 and/or another suitable device such as a settop device 131.

In further embodiments, the ISD/IRG 22, 22-1 may be configured as an IP proxy server such that each of the devices connected to the server utilizes transmission control protocol/Internet protocol (TCP/IP). This configuration allows any device associated with the ISD/IRG 22, 22-1 to access the Internet via an IP connection through the FMP/ C-FMP 32, 32-1. Where the ISD/IRG 22, 22-1 is configured as an IP proxy server, it may accommodate additional devices that do not support the TCP/IP protocol. In this embodiment, the ISD/IRG 22, 22-1 may have a proprietary or conventional interface connecting the ISD/IRG 22, 22-1 to any associated device such as to the set top box 131, the personal computer 14, the video telephone 130, the digital telephone 18, and/or some other end user device.

In still further embodiments, the ISD/IRG 22, 22-1 may be compatible with multicast broadcast services where multicast information is broadcast by a central location and/or other server on one of the networks connected to the FMP/C-FMP 32, 32-1, for example, an ATM-switched network. The ISD/IRG 22, 22-1 may download the multicast information via the FMP/C-FMP 32, 32-1 to any of the devices connected to the ISD/IRG 22. The ISD/IRG 22, 22-1 and/or CPE 10 devices may selectively filter the information in accordance with a specific customer user's preferences. For example, one user may select all country music broadcasts on a particular day while another user may select financial information. The ISD/IRG 22, 22-1 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
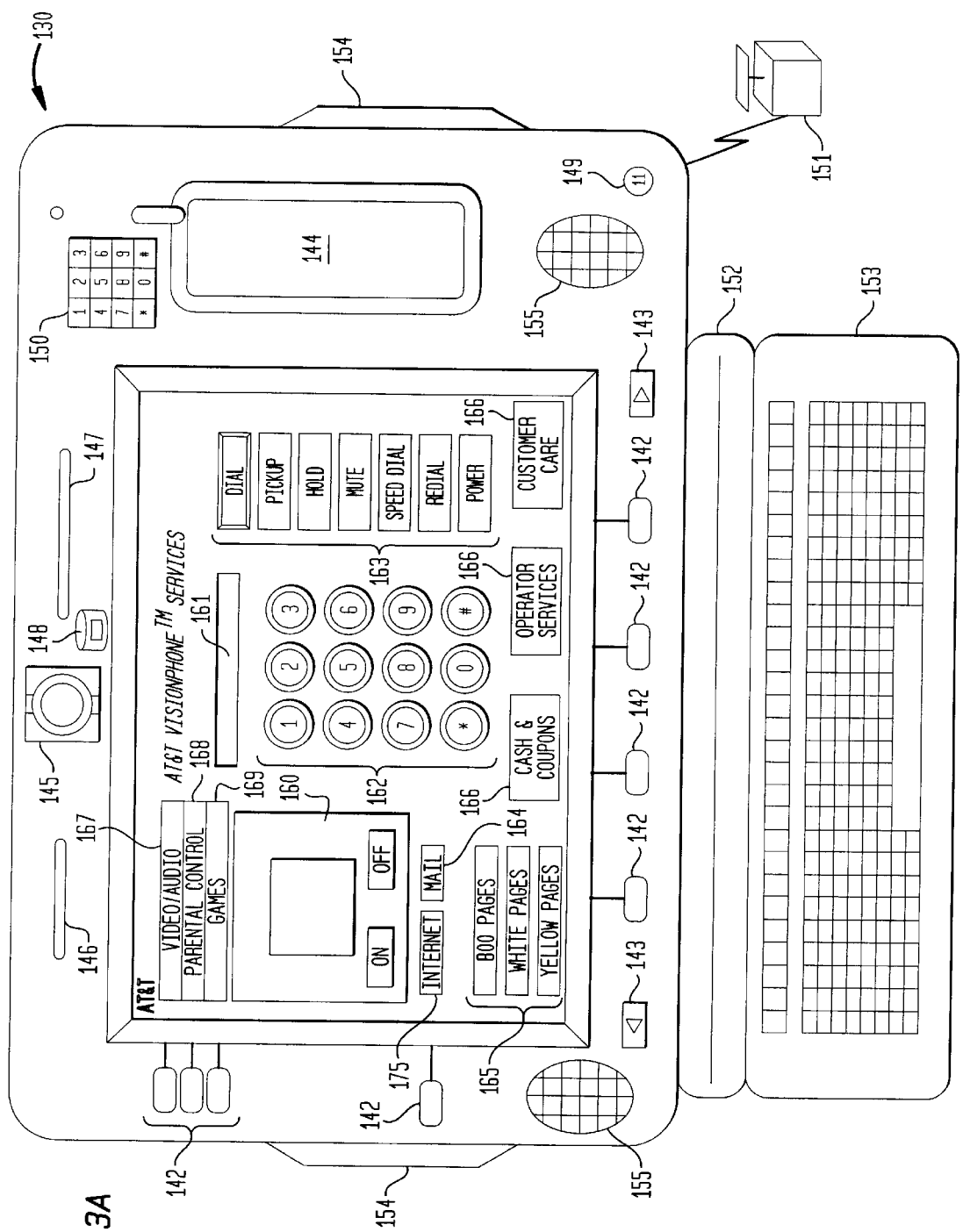
FIGS. 3A and 3B illustrate an embodiment of a video phone consistent with the architecture shown in FIG. 1.
Figure 3B:
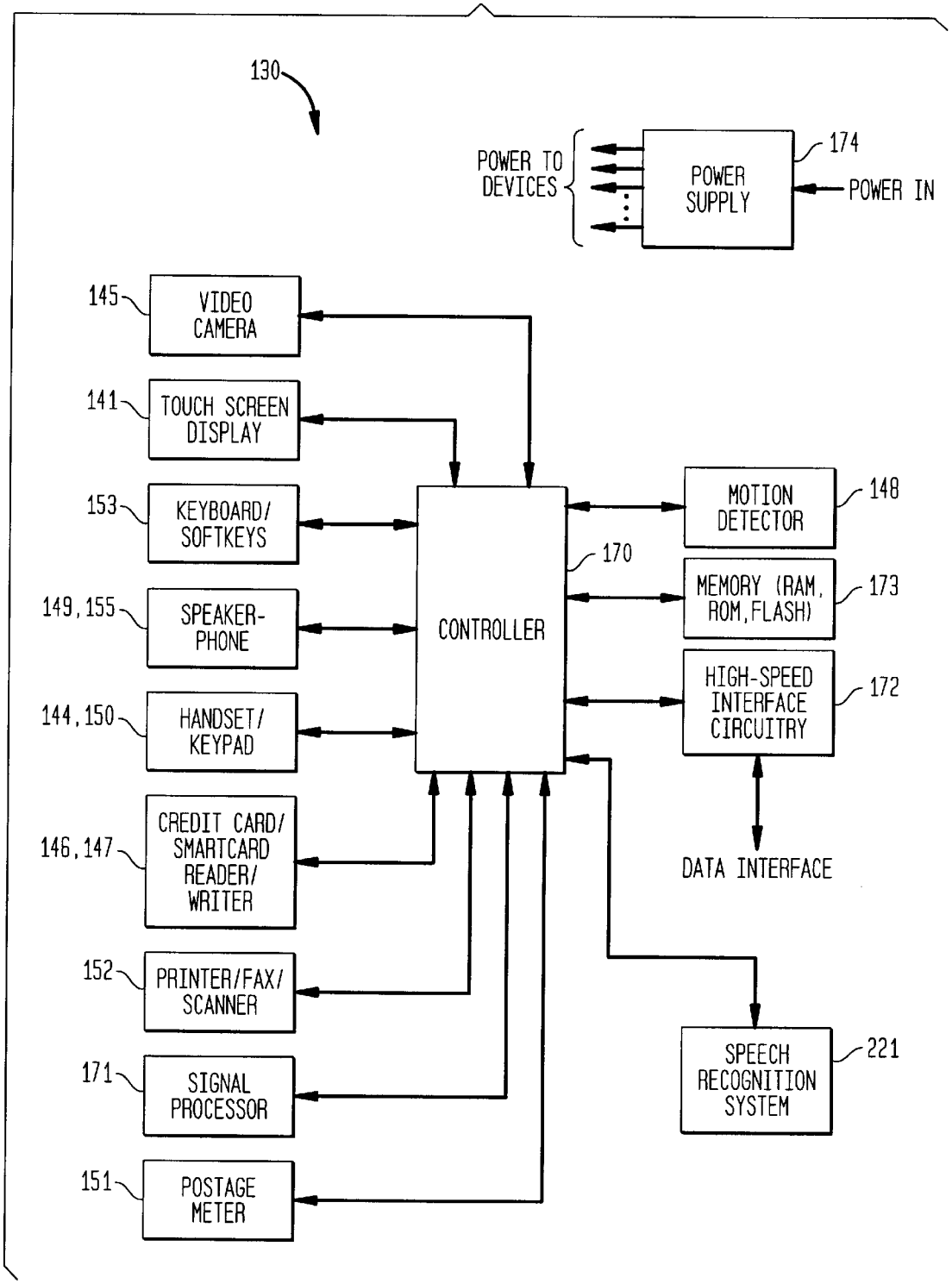

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 130 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (for example, stereo speakers). A keyboard 153 and/or a postage scale 151 may also be connected to the videophone 130. Any or all of the abovementioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172 (to house wire or coaxial cable), memory 173, power supply 174, all interconnected via a controller 170.

When the videophone 130 is used as a video telephone, the display 141 may include one or more video window(s)

160 for viewing a person to whom a user is speaking and/or showing the picture seen by the person on the other end of the video phone. The display may also include, for example: a dialed-telephone-number window 161 for displaying the phone number dialed, a virtual keypad 162, virtual buttons 163 for performing various telephone functions, service directory icons 165, a mail icon 164, various other service icons 166 which may be used (for example, for obtaining coupons or connecting with an operator), a video/audio services icon 167 (for example, cable, satellite, and related services), a parental control icon 168, a games icon 169, and an Internet icon 175. Any or all of these items may be displayed as virtual buttons and/or graphic icons and may be arranged in any combination. Additionally, any number of other display features may be shown on the video phone in accordance with one or more of the applications incorporated by reference below.

Figure 4A:
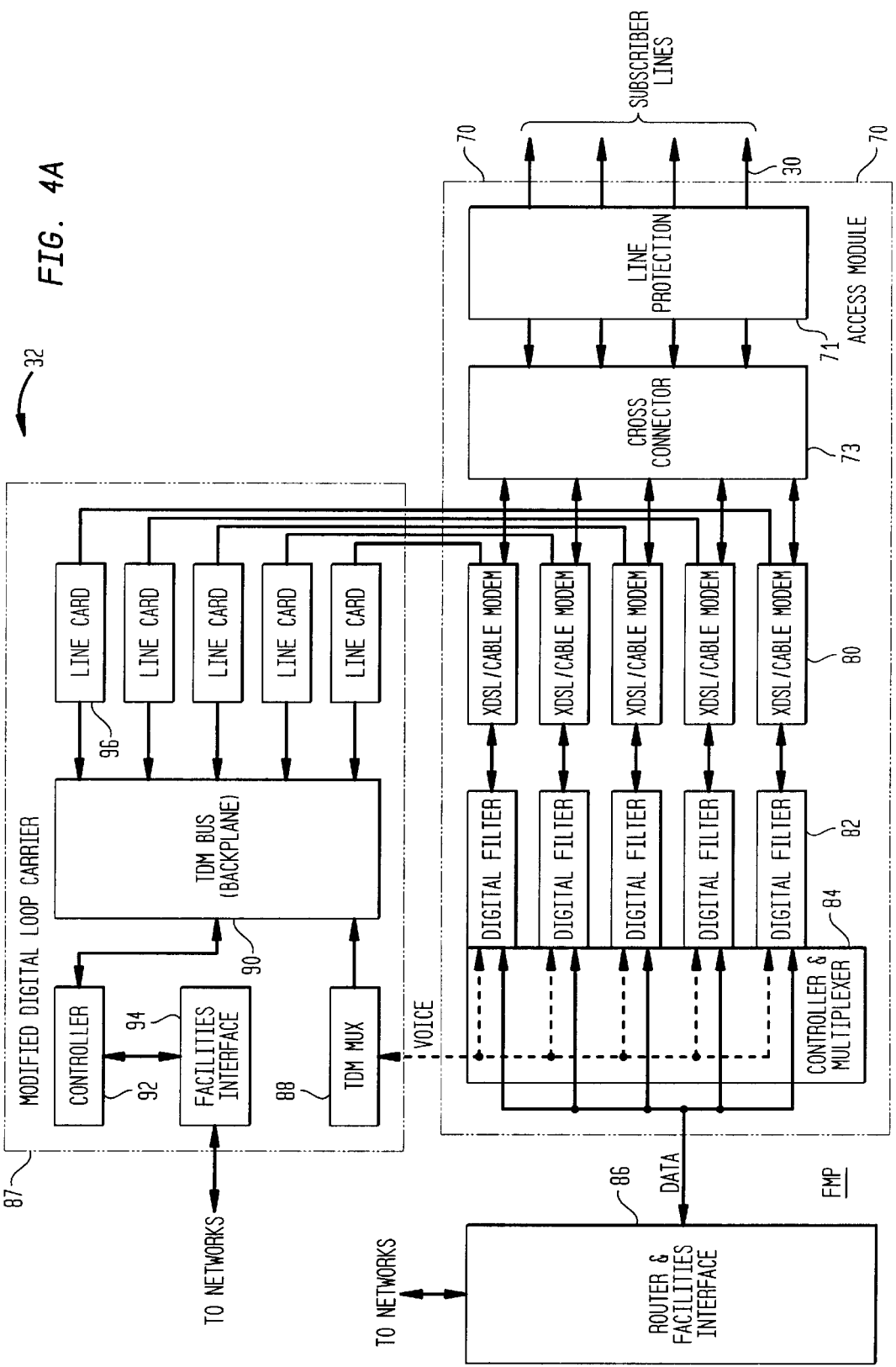
FIG. 4A is a block diagram of an embodiment of a facilities management platform consistent with the architecture shown in FIG. 1.

Referring to FIG. 4A, the FMP/C-FMP 32, 32-1 may coordinate the flow of data packets, separate voice signals from other signals, perform line monitoring and switching functions, and/or convert between analog and digital signals. The FMP/C-FMP 32, 32-1 may process data sent from the CPE 10 to the central or local office 34 by separating and reconstructing analog voice signals, data, and control frames. The FMP/C-FMP 32, 32-1 may process data sent from the central or local office 34 to the CPE 10 by separating control messages from user information, and configure this information into segments for transport across the digital subscriber loop. The FMP/C-FP 32, 32-1 may also terminate the link layer associated with the digital subscriber loop.

In some embodiments, the FMP/C-FMP 32, 32-1 may include an access module 70 and a digital loop carrier 87. The access module 70 may include a line protector 71, a cross-connector 73, a plurality of xDSL/cable modems 80, a plurality of digital filters 82, a controller multiplexer 84, and/or a router and facilities interface 86. The digital loop carrier 87 may include a plurality of line cards 96, a time domain multiplexing (IDM) multiplexor (MUX) 88, a TDM bus 90, a controller 92, and/or a facilities interface 94.

During normal operations, digital signals on the customer connection 30 (for example, twisted-pair lines, coaxial cable, or hybrid facility) containing both voice and data may be received by the xDSL/cable modems 80 via the line protector 71 and the cross-connector 73. Preferably, the line protector 71 includes lightning blocks for grounding power surges due to lightning or other stray voltage surges. The xDSL/Cable modems 80 may send the digital voice, picture and/or data signals to the controller multiplexer 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (for example, if there is a failure of the xDSL/cable modems 80 at the FMP/C-FMP 32, 32-1 or the xDSL/cable modem 114 at the ISD/IRG 22, 22-1), only analog voice signals might be sent over the subscriber lines 30 (twisted pair or coax). In such a case, the analog voice signals may be directly routed to the line cards 96, bypassing the xDSL/Cable modems 80, the digital filters 82, the controller multiplexor 84, and the TDM MUX 88. Thus, voice communication is ensured despite a failure of the digital data link. The line cards 96 may convert the analog voice signals into digital format (for example, TDM format) and send the digitized voice data onto the TDM bus 90 and eventually through the controller 92 and the facilities interface 94 for transmission to one or more external networks. Since the ISD/IRG 22, 22-1 may be powered via the serving cable (telephone or coaxial cable television), lifeline service may be provided over the cable modem or the twisted pair tip and ring.

Figure 4B:
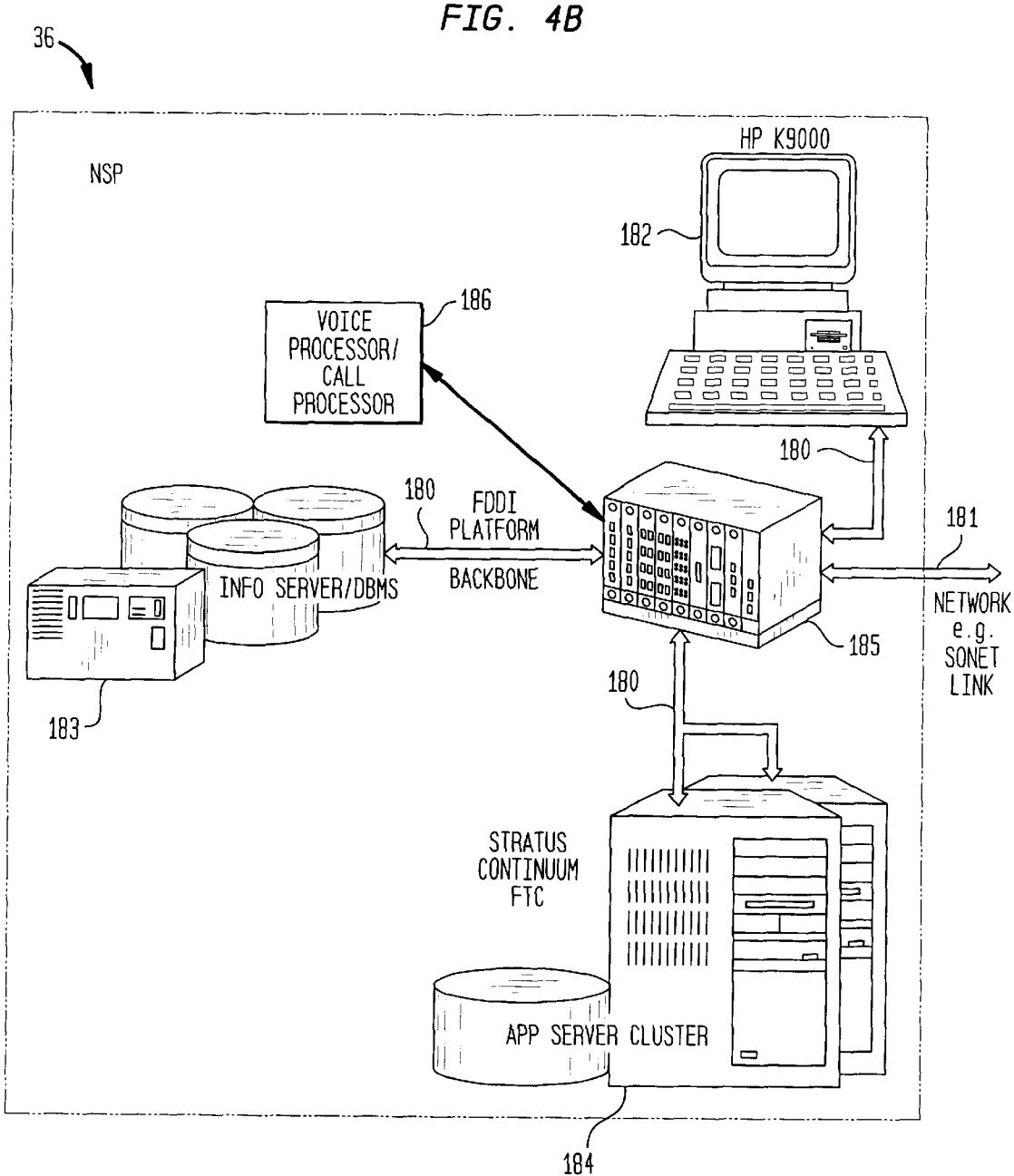
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (for example, a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMP/C-FMPs 32, 32-1. The information/data base server 183 may perform storage and/or database functions. The application server cluster 184 may maintain and control the downloading of applets to the ISD/IRG 22, 22-1. The NSP 36 may also include a voice/call processor 186 configured to handle call and data routing functions, set-up functions, distributed operating system functions, voice recognition functions for spoken commands input from any of the ISD/IRG 22, 22-1 connected devices as well as other functions.

Again referring to FIG. 2, the ISD/IRG 22, 22-1 will now be explained in more detail. The ISD/IRG 22, 22-1 enables the seamless integration of voice and data across the telephone network. The ISD/IRG 22, 22-1 utilizes leverages interface and networking innovations originally developed to expedite information retrieval via the World Wide Web. When applied to telecommunications access, these advances enable a revolutionary change in service delivery, that makes the telephone companies network a much more valuable asset than ever before. Coupled with the introduction of low-cost premises devices (for example, browser based touch-screen phones), the technology enables a natural and compelling link to a rich new class of service offerings and features such as CD quality voice, far more friendly access to a wide range of telephony services (CLASS, conferencing, messaging, emergency services, etc.), new non-traditional services on an AT&T secure intranet such as Bill payment, Banking, Electronic shopping, Home-based smart card ATM transactions, Electronic coupons, Interactive advertising/Point-casting, Corporate LAN extensions for Work-at-Home, Interactive multimedia telephony, High-speed access to the Internet even without a PC, restaurant ordering, sports ticket ordering, catalogue ordering, mail metering machines, directory services, customer services, rate tables, calling plan options, as well as self provision new services, get credit for wrong number calls, vastly reducing the number of service representatives required.

The ISD/IRG 22, 22-1 performs intelligent multiplexing, dynamic bandwidth allocation, and routing of voice and data and may also include advance signal processing for enabling voice activated commands. It may be possible to give the video phone of FIG. 3A away for free or for a nominal cost so that all house-holds regardless of income level or desire to purchase a personal computer will have access to the vast information resources of the Internet, an interexchange carrier's such as AT&T's networks, and/or third party networks including those providing pay-per-view (PPV) movie content and broadcast networks. It is anticipated that the video phone concept together with the ISD/IRG 22, 22-1, FMP/C-FMP 32, 32-1, and NSP 36 of the present invention will revolutionize the delivery of telephony services and provide a quantum leap in the paradigm of telecommunications, improving the quality of life of interexchange carrier customers while turning the copper loop or the coaxial cable drop into their homes into an increasing necessity for all users.

For high end residential consumers who want more convenience and simplicity in their daily lives and convenient access to more information devices coupled to the ISD/IRG 22, 22-1 provide, for example: easier delivery of a wider range of telephony services (for example, customer care, marketing, operator services) with cost savings due to automation; new service opportunities such as interactive electronic catalog shopping from the home, and advertising; ability to offer ultra fast Internet access to every household, penetrating even those without a PC unlike traditional voice/touch tone telephony access; high fidelity voice and music; touch screen and/or voice activated customer interface; asymmetric high speed transport of data to the home with the asymmetric character of the link and apportionment of that bandwidth variable depending on the amount of traffic; new service opportunities such as 3rd party bill payment including paper-less bill payment, banking, obtaining smart card cash in an ATM transactions, electronic shopping from the home, electronic coupons, advertising, electronic review and payment of bills, calling plans, class of services, as well as other services and plans; Interactive video teleconferencing; state-of-the-art networking for Work-at-Home; private line services; Call Connection including the self scheduling of conference calls without the need for an operator as well as initiation of interactive calls with white board augmentation using an appropriate applet downloaded from the NSP 36; class services invoked, for example, via icons and prompts in a natural manner without requiring memorization of numerical codes; navigation & access for voice, e-mail, and fax messages; obtain operator services without an operator, credit for wrong number, rate table, etc.; define profile for pointcast services; purchase products advertised on TV via synchronized ordering screen with television or PPV shows; Multimedia Enhanced Voice Calls, interactive voice & data response applications & info-on-demand; Support for work-at-home via virtual WAN; Screen pops for message/call alerting; graphical call management using touch and/or a mouse interface, including, for example call setup/bridging capabilities and point-and-click/tap-and-drag conferencing graphical use interfaces to initiate POTS calls, personal registry, mobility manager, call scheduling, call me back standard messages, personal assistant; Universal Multimedia Mailbox including a common interface for fax, voice, text, audio, and/or audio/visual images; 7 kHz high fidelity voice; asymmetric high speed transport with dynamic bandwidth allocation; residential LAN interface and associated local area network within the home; interactive video teleconferencing, display of web pages for customers placed on-hold, and other applications as discussed herein.

The service in accordance with aspects of the present invention makes the phone or coaxial cable TV lines a conduit for a wide variety of high revenue service offerings, allows the differentiation of local telephone and long distance telephone services, significantly reduces operation costs, extracts additional performance benefits from the imbedded loop plant, makes maximum use of the existing network infrastructure, and uniquely leverages new technology. Aspects of the present invention will enable a revolutionary change in service delivery, which can greatly improve the quality of people's lives, and make the telephone network a much more valuable asset than ever before. When coupled with the introduction of low-cost premises devices (for example, touch-screen phones), the technology enables a natural and compelling interface to rich new classes of service offerings for all telephone users regardless of their ability or desire to afford a personal computer or learn. Thus interexchange carriers such as AT&T can reduce the cost of their own billing while making it easier for the customer to pay the bill. Additionally electronic billing services can be offered to other companies.

The ISD/IRG 22, 22-1 may be physically located on the premises side of the protector block. In exemplary embodiments as shown in FIG. 2, the ISD/IRG 22, 22-1 terminates the twisted-pair loop or coaxial cable or both facilities either leased from the local exchange carrier or obtained from the cable television service provider on the network side and the premise equipment and associated networks on the premises side. The ISD/IRG 22, 22-1 may operate to aggregate the diverse traffic from the customer premise equipment onto a single stream for transmission over the loop to the twisted pair or cable Facilities Management Platform (FMP) and to de-multiplex the traffic from the FMP/C-FMP 32, 32-1.

Figure 5:
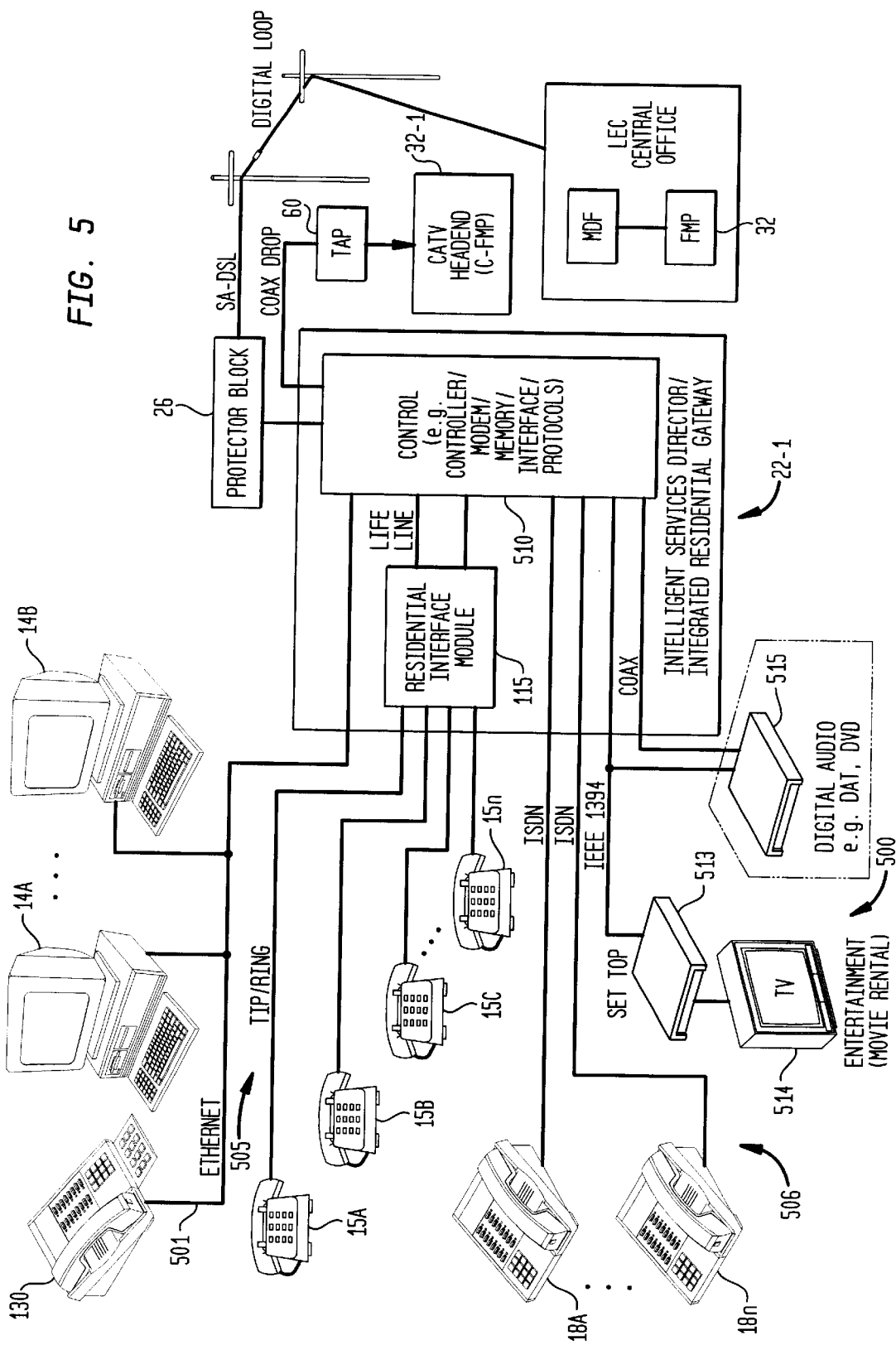
FIG. 5 is a block diagram of an embodiment of the ISD/IRG.

A basic Premises Distribution Network (PDN) 500 for one exemplary embodiment of a typical residential application of the ISD/IRG 22, 22-1 is shown in FIG. 5. The premise distribution network 500 may include one or more Ethernet connections 500 for connecting a plurality of devices such as a number of personal computers 14A, 14B, a vision phone, cable set top terminal and/or other devices. Further, the premise distribution network 500 may include any number of conventional analog lines 505 (for example, Tip/Ring (T/R) phone lines), each having one or more associated analog phones (for example, 15A–15n), and/or associated PCs with modem and/or phone cards. Further, the premises distribution network 500 may include any number of ISDN lines 506, each having any number of digital appliances such as ISDN compliant devices and/or video phones 130. The premises distribution network 500 may use existing twisted pair telephone line, a coaxial cable line and/or may utilize a special cable to facilitate CATV, Ethernet and/or other LAN connections. Where the video phone 130 may share the same LAN as a connected PC 14A, prioritization software in the LAN driver gives priority to video and/or audio transmissions to and from the video phone to reduce latency time and unpredictable delays. Alternatively, the video phone 130 may be coupled via a dedicated ISDN connection, a dedicated ethernet connection, and/or another dedicated connection or coaxial cable connection to the ISD/IRG 22, 22-1. The video phone may have an integrated analog phone for life line support. Alternatively, one of the analog phones serves the function of providing lifeline support. Further, an internet telephony phone (not shown) may provide lifeline service via a coaxial drop to the home. Where the video phone 130 includes lifeline support, it is preferred to transmit data to the phone in a band above 7 kHz using ADSL like modem technology.

In exemplary embodiments, the ISD/IRG 22, 22-1 multiplexes traffic from the various components of the PDN 500

(for example, Ethernet, Screen Phone, Tip/Ring, ISDN, coaxial house cable) either between other devices on the PDN and/or onto xDSL/cable modem 114 for transport over loop twisted pair to the Central Office or coax toward the cable television headend. The xDSL/cable modem may be constructed using any of the techniques described in the applications incorporated by reference below. For example, there is some advantage in providing an integrated xDSL/cable modem with either twisted pair or coaxial connectors where, for example, central controller capabilities may be shared.

Within the scope of the current document, the term xDSL will be used to represent any member of the DSL family. This family comprises, High Speed Digital Subscriber Line (HDSL), Asymmetric Digital Subscriber Line (ADSL), Symmetrical Digital Subscriber Line (SDSL) and Very high Data rate Digital Subscriber Line (VDSL). This list is not limited to the members described herein, since changing technology adds more DSL schemes.

The ISD/IRG 22, 22-1 may execute any number of additional telephony functions using known techniques such as Packetization of voice for all telephone calls, Tip/Ring Borscht functions, default to Central Office Battery/Tip/Ring to provide lifeline service during power failure, overvoltage Protection, ringing, supervision, answer and incoming call/ringing supervision, generation of call progress tones (for example, dial tone, busy, ringback, invalid number, etc.), various coding such as 7 KHz G.722 coding for Electra called parties, 3.3. KHz mu-law coding for non-ISD enabled parties, transmit messages reporting DTMF, on hook/off hook/flash hook events, support for voice dialing and enablement of special calling features (for example, through the use of processor 102 which may include signal co-processor 102A and/or a high performance controller such as the 8960), provision of dial tone with time-out for voice dialing service, coding/forwarding voice commands (for example, to a voice processor in the FMP/C-FMP 32, 32-1 and/or NSP 36.

The data link protocol of the xDSL modem may be variously configured to include incorporate Forward Error Correction for traffic unsuited to re-transmission such as voice traffic. Additionally, the data link protocol may organize the aggregate data stream created by multiplexing downstream channels, duplex channels, and maintenance channels together into blocks, attaching an error correction code to each block. The receiver then can correct errors that occur during transmission up to the limits implied by the code and the block length. The data link protocol may also provide sufficient interleaving to correct errors due to impulsive noise but supporting low latency for voice traffic, create superblocks by interleaving data within subblocks to allow the receiver to correct any combination of errors within a specific span of bits. It may be desirable to tailor the interleaving interval to the latency budget for voice applications in XDSL modems utilized to carry voice as in the present invention.

The packet handling in the present system may be variously configured. For example, in the CPE-Network direction, the processor 102 may be configured to act as a packet handling subsystem to processes frames from the FMP and to generate DSL frames going to the FP. The ISD/IRG 22, 22-1 and the FMP/C-FMP 32, 32-1 include xDSL/cable modems (for example, TVRC/DOCSIS standard cable) modems to terminate the link layers associated with the DSL or coaxial segment of the connection. In a similar manner as the FMP/C-FMP 32, 32-1, the processor in the ISD/IRG 22, 22-1 may be configured to reconstruct the IPv6 packets from DSL frames and then separates IP packets containing voice from those containing data and from those containing signaling. In the ISD/IRG 22, 22-1, speech packets from the Packet Handling subsystem may be delivered to the residential interface for output to one or more analog lines to create virtual phone lines using the upper bandwidth of the XDSL modem (for example, 40 Khz to 1 Mhz) in a similar manner as the packet-to-circuit translation subsystem which may be utilized in the FMP/C-FMP 32, 32-1. The processor 102 in the ISD/IRG 22, 22-1 may also be configured to generate signaling packets which may be forwarded to the FMP/C-FMP 32, 32-1 for later utilization in either an in-band or out-of-band routing subsystem such as a conventional subscriber signaling subsystem (for example, TR 303). Similarly, the processor 102 in the ISD/IRG 22, 22-1 may include a subscriber signaling subsystem as part of an external routing subsystem. In this manner, packets received from the FMP/C-FMP 32, 32-1 in the network-CPE direction (including voice, data, video, and control packets) may be demultiplexed, reformatted with an appropriate protocol, and output to an attached peripheral device connected to the premise distribution network 500.

In the network to CPE direction, the processor 102 may be configured to re-construct IPv6 packets from DSL frames, and separating IP packets containing voice from those containing data from those containing signaling. This process may involve, for example, multiplexing (at the IP packet level) voice, data and subscriber signaling packets bound for a single DSL link with IP packets mapped onto DSL frames.

The processor 102 may also include one or more signal processors 102A and/or voice processor to perform various MPEGII coding/decoding functions, codec functions, voice recognition functions, encryption/decryption, etc. The processor 102 may also be configured to perform various protocol conversion functions such that data having protocols used on a device connected to the premise distribution network may be efficiently transmitted to and from the FMP/C-FMP 32, 32-1 using an appropriate transmission protocol. Additionally, the processor 102 monitors the devices connected to the premise distribution network and stores information concerning which devices are currently in use. In this manner, where there is an incoming call, the ISD/IRG 22, 22-1 has the intelligence to know which CPE is in use and which CPE is not in use. As a result, if there is an incoming call, the ISD/IRG 22, 22-1 will not send a ringing tone to any CPE that is already in use, but will route the call to another device that is available. Further, where there is a choice of a plurality of phones and/or other devices to route the call, the ISD/IRG 22, 22-1 may review activity detected on the motion sensors on any attached motion sensing devices such as those which may be present in a video phone 130 and ring a phone which is most convenient to the user. As an alternative, all available phones will be rung, with the user given the option to switch between incoming lines.

In an exemplary embodiment shown in FIG. 5, where an incoming call arrives at the ISD/IRG 22, 22-1, the controller 510 rings one or all of the attached phones. Where a user answers a first phone (for example, 15A), the utilization of this phone is recorded. Thereafter, the user may continue talking on this phone and an off-hook status is indicated. Where another call comes in, the user may choose to answer this call via a conventional method such as "call waiting" and/or using multiple lines. Further, the answering machine (described in an attached application) may be configured to indicate that the user is receiving an incoming call at the moment and provide an on-hold menu as discussed in the applications incorporated by reference below. The controller 510 may be configured to have a plurality of calls on-hold and toggle between these calls by depressing a DTMF key and/or the hang-up actuator. Alternatively, a digital phone and/or video phone 130 may have any number of lines with a name, address, and phone number associated with each of the incoming callers. Thus, the residential interface module allows multiple virtual analog phone lines to be multiplexed on a single twisted pair phone line. Further, one of the phone lines may be provided with life line support.

Interconnected to the ISD/IRG 22, 22-1 may be a protector block 26 (for lightning and overvoltage protection) which is used for impedance matching. The protector block 26 may also act as a demarcation of the customer premise and the local loop transmission network. Copper twisted pair and/or coaxial cable may be utilized to connect the protector block 26 and a CATV headend or a telephone Main Distribution Frame (MDF) as the main transmission medium in the local loop.

The xDSL/cable modems shown as 114 may be implemented using a Tethered Virtual Radio Channel (TVRC)/DOCSIS specification cable modem as discussed in the applications incorporated herein by reference. The TVRC engine may be implemented using a simultaneous voice-data modem which may be a full-duplex Variable Rate-Adaptive Digital Subscriber Line (VR-ADSL) modem. The modem may transmit and receive the modulated voice+data bit stream via the twisted pair. The modem uses discrete multi-tone (DMT) modulation to achieve at least 1.5 Mbps data rate in both directions. Some of the TVRC engine functions include forward error control (Reed Solomon), channel coding (Turbo or Wei Convolution), TVRC spreading, echo cancellation and analog transmit/receive line interfacing. The TVRC modem may be implemented using one or more programmable DSPs which may be utilized to provide the modem transmit FFT and/or receive IFFT engine. However, the embodiments of aspects of the instant invention are not limited to the use of TVRC modulation technology. However, TVRC may be desirable as an alternate to interleaving in order to overcome impairments such as noise and interference and which results in unacceptable delays. (A typical cable modem has already been described above.) The processor 102 in the ISD/IRG 22, 22-1 may be configured to discriminate between the various forms of traffic and to route this traffic to an appropriate device. Where high priority voice and/or video is distributed across the interface, the ISD/IRG 22, 22-1 may include one or more priority queues disposed in the SRAM 104 and/or DRAM 103. There may be different priority queues for each connected device on the premise distribution network (including any attached device described with regard to FIG. 2 or discussed herein). Additionally, there may be different queues for each device in both the transmit and receive direction. Further, control and signaling information may be assigned various levels of priority. A similar queue structure may also be implemented in the FMP/C-FMP 32, 32-1. In one exemplary embodiment, the queues give priority to signaling information, and voice information for the various attached telephones. If a queue is in danger of overflow, flow control mechanisms may be utilized by the ISD/IRG 22, 22-1 and/or FMP/C-FMP 32, 32-1. Voice data is accessed first using an appropriate queuing scheme such as priority fair weighted queuing or another suitable scheme. In addition to queuing, bandwidth may be varied so that more DSL frames are assigned to voice and/or video than data. Further, asymmetric DSL protocols may be dynamically implemented such that more bandwidth may be allocated to one direction or the other as necessary. Where one ISD/IRG 22, 22-1 is serving as the node for, for example, a seven way conference call, the outgoing bandwidth for the node may need to be increased relative to the incoming bandwidth. However, where a PPV movie and/or Internet file is being downloaded, the bandwidth may be reversed such that more bandwidth is available from the network to the CPE equipment. Thus, asymmetric high speed transport of data to the home with the asymmetric character of the link and apportionment of that bandwidth variable depending on the amount of traffic results in a substantially more flexible platform to implement advanced services to the user. Multiple modem protocols may be downloaded into the DSL modem dynamically to chose the best protocol for a particular dynamic bandwidth allocation to maximize the amount of through put.

Figure 6A:
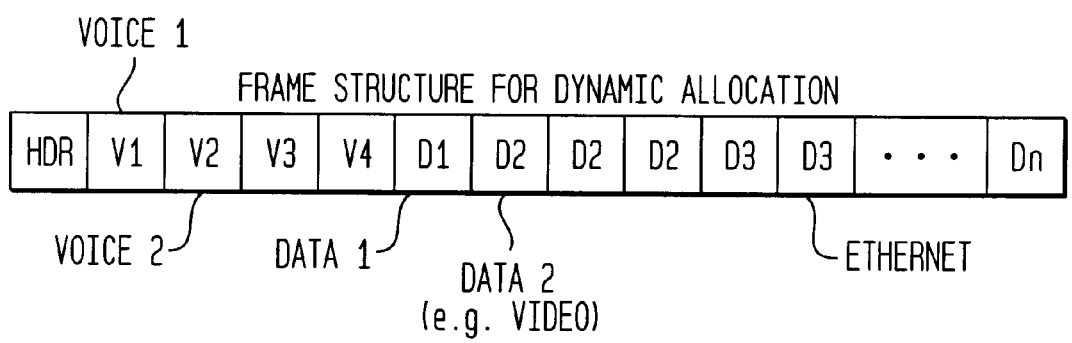
FIGS. 6A and 6B are block diagrams of various frame structures which may be used to communicate between the ISD/IRG and the FMP/C-FMP.
Figure 6B:
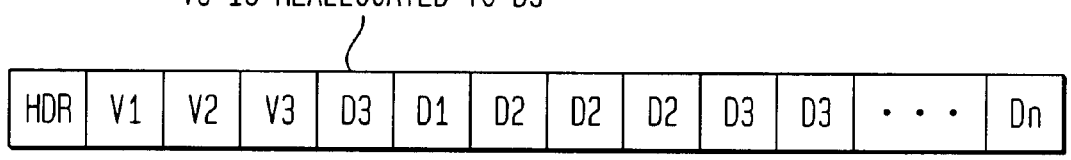

For example, with reference to FIGS. 6A and 6B, information may be multiplexed into one or more DSL frames in order to dynamically allocate bandwidth. In one exemplary embodiment, where data is being input to one of the connected data devices (for example, a PC), and a voice call comes in, a dynamic allocation of bandwidth may occur. Assume that 1 Mbps is available for information transfer. Prior to the incoming call, all 1 Mbps may be completely used for the data transmission. However, as soon as a voice call comes in, since voice has a higher priority than data, a 64 Kbps channel is deallocated from data usage and is allocated for voice. If a second voice call comes in, then another data channel will be deallocated from data usage and allocated for voice. As a voice call gets terminated, then the allocated voice slots will be reallocated to use by data and/or another voice channel. For example, as shown in FIG. 6B, voice call 4 V4 is terminated and the bandwidth is reallocated to D3. Accordingly, as the bandwidth is reallocated, the header may be updated to reflect the new bandwidth allocation. This allocation may occur in both the CPE to network traffic and network to CPE traffic. Additionally, as slots are added to CPE to network traffic, slots may be deallocated to network to CPE traffic implementing a dynamic asymmetric bandwidth allocation. Hence, the system dynamically allocates bandwidth in real time to maximize information transfer. Where individual packets are used to transport voice and data between the ISD/IRG 22, 22-1 and the FMP/C-FMP 32, 32-1, an individual channel does not need to be allocated. Voice packets are simply given priority over data packets in the transfer. Therefore, silence periods may be used to the advantage and a higher overall bandwidth occurs. Data is simply stored in the buffer and/or slowed in its transfer using standard flow control where voice has priority. In aspects of the present invention, bandwidth may be allocated on a per-frame basis. By contrast, conventional systems only allocated bandwidth at the time a secession is initiated—and once initiation has been completed, bandwidth allocation cannot be changed without tearing down the call. However, in aspects of the present invention, bursty data may be accommodated more efficiently since the burst data rate may be accommodated via dynamic bandwidth allocation.

The xDSL/cable modem 114 may be variously configured to supporting transport over 18000 foot loops at following rates exceeding 1 Mbits/second, or coaxial cable or hybrid facilities of any length and may include adapting duplex and downstream bit-rates to the needs of the current traffic such that more bandwidth is provided to the upstream and/or downstream and/or between various devices based on an intelligent bandwidth allocation algorithm. The xDSL/cable modem may provide a single-tone DMT mode for low power operation during idle periods to avoid re-synchronization at next service request and enable "always on" functionality. The always on and/or virtually always on functionality allows voice/data calls to be established virtually instantaneously without long delays. The virtually always on functionality allows the channel bandwidth to adapt to the current needs of the system to minimize power consumption, reduce thermal dissipation, and generate less interference. For example, if no device is currently being utilized, only a very low bandwidth channel is required. Accordingly, by reducing the bandwidth available across the loop, it is possible to improve overall performance for other lines.

The DSL/cable modem must share upstream and downstream bandwidth over coaxial or hybrid fiber/coaxial facilities but has the advantage of being able to allocate upstream and downstream demand for services in priority with other coaxial cable subscribers or, if both twisted pair and coaxial facilities are provided, to allocate to one or the other depending on priority.

The present invention discloses a local loop architecture that can overcome many of the problems associated with either a twisted pair or coaxial cable architecture alone. Amongst the claimed advantages is the ability to have multiple appearances of a call on a single twisted pair or coaxial cable channel. The architecture also allows data and voice to be mixed and bandwidth can be dynamically allocated in real time.

To illustrate the interaction between the various components of the instant invention, a voice dialing scenario will be described. When a subscriber picks up the telephone and if no digits have been dialed after a specified period of time has elapsed, the ISD/IRG 22, 22-1 may start digitizing the voice information into 64 Kbps $\mu$-law PCM data. The samples may be interpreted locally using processor 102 and converted into commands, and/or stored in a wave file for later transmission. For example, where the voice commands are saved, they may be subsequently transmitted to the FMP/C-FMP 32, 32-1 over a signaling channel. On receipt by the FMP/C-FMP 32, 32-1, the FMP/C-FMP 32, 32-1 may either interpret the commands (for example, using a controller in the controller and multiplexer 84), and/or forward the information to the NSP 36 for further processing. In the NSP 36, the commands may be interpreted using known voice recognition technology. The NSP 36 may attempt to authenticate the request by ensuring that the subscriber does indeed have a subscription to the voice dialing service. The NSP 36 may then determine the identity of the subscriber by looking at the address in the IP field of the packet. The NSP 36 can therefore interpret the information in the wave files and take the appropriate action.

Figure 7A:
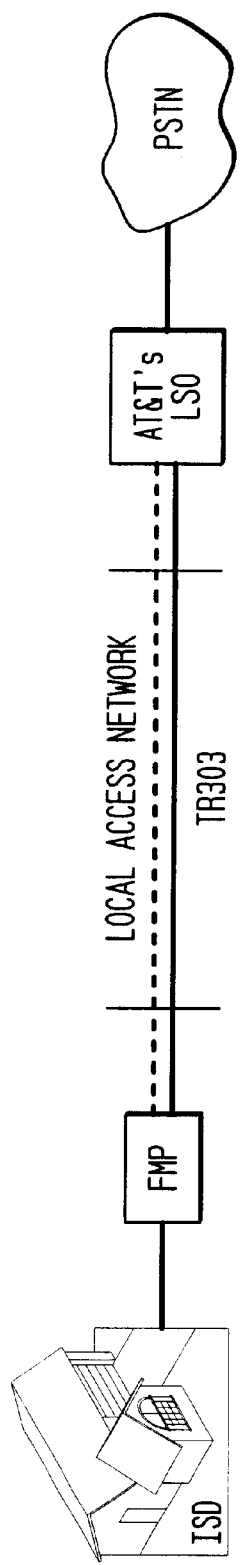
FIGS. 7A and 7B are examples of one signaling structure which may be used to initiate a call.
Figure 7B:
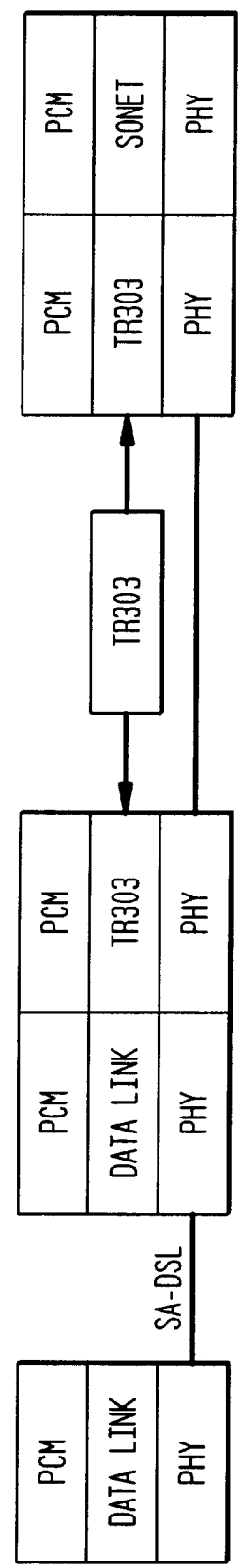

In one illustrative example, assume that subscriber John wanted to call another subscriber Paul. The NSP 36 may attempt to determine who is Paul as defined by John. Once the telephone number for John has been determined, the NSP 36 may inform the FMP/C-FMP 32, 32-1 to set up a call to John's number. In some configurations, this my be done by the FMP/C-FMP 32, 32-1 using the TR303 interface (as shown in FIGS. 7A and FIG. 7B), for example, by sending a signal to a SLC to request the local Serving Office to tell the latter the appropriate ports to use for setting up the call. The FMPIC-FMP 32, 32-1 may also include its own DTMF and tone generator for signaling. The inclusion of a DTMF tone generator in the FMP/C-FMP 32, 32-1 and/or ISD/IRG 22, 22-1 has significant advantages in that a voice dialing service may be provided by the interexchange companies and there is no need to pay for the Local Exchange Carrier (LEC) for providing such a service. Similar services, such as speed dialing, that the LEC provides can now be made available locally using the ISD/IRG 22, 22-1 and/or FMP/C-FMP 32, 32-1.

In the case where there is an incoming call, say from the PSTN, the FMP/C-FMP 32, 32-1 may obtain signaling information from the SLC. The information may be dispatched over the signaling channel to the NSP 36. The NSP 36 may instruct the FMP/C-FMP 32, 321 with information on how the call should be terminated. On receiving this message, the FMP/C-FMP 32, 32-1 may send the appropriate signaling message to the ISD/IRG 22, 22-1. The ISD/IRG 22, 22-1 may be configured to know which phones are in use and which ones are not. As a result, the ISD/IRG 22, 22-1 may apply ringing voltage to a phone that is not in use and/or take other remedial action as discussed above, for example, using a call waiting signal.

The ISD/IRG 22, 22-1 may be configured to facilitate multiple appearances of calls on a single twisted pair or within a coaxial cable television channel to integrate voice and data traffic. The ISD/IRG 22, 22-1 is unlike conventional system that uses bandpass filters or splitter to separate voice and data. The ISD/IRG 22, 22-1 provides a local smart hub interface for all lines in the home as well as providing digital communication coordination among different devices in the home. The ISD/IRG 22, 22-1 may be configured for various functions including an alarm system, utility meter monitoring, standard POTS phone systems such as tip ring, or multiple tip rings, or multiple tip rings assigned to a single number, and/or multiple tip rings assigned to unique numbers, detection generation and conversion of DTMF tones, ring generation, off hook generation, and other call progress indication, and/or a business interface such as a T1 line, and/or other analog and/or digital lines.

Figure 8:
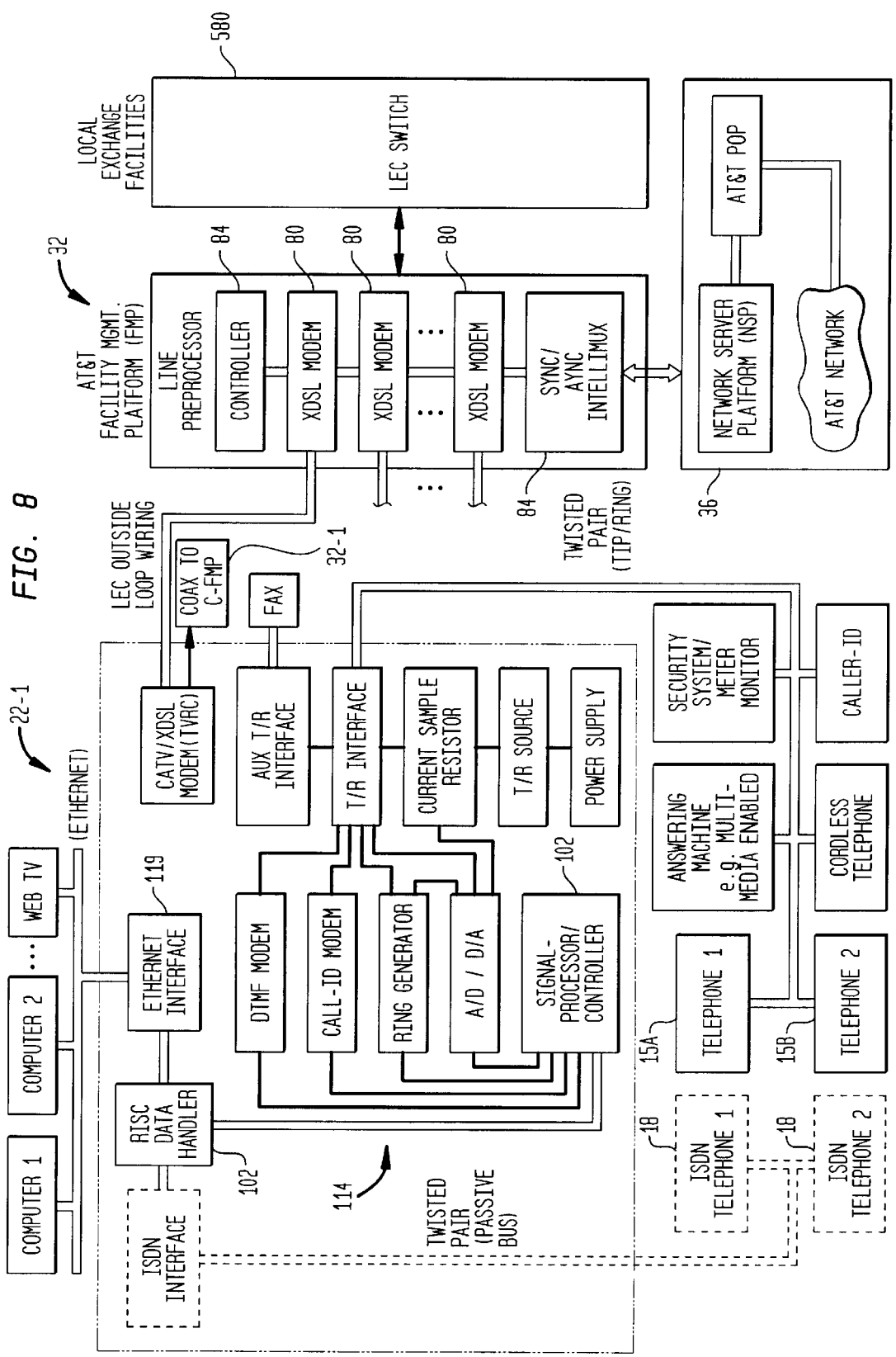
FIGS. 8–10 are various embodiments of the ISD/IRG.
Figure 9:
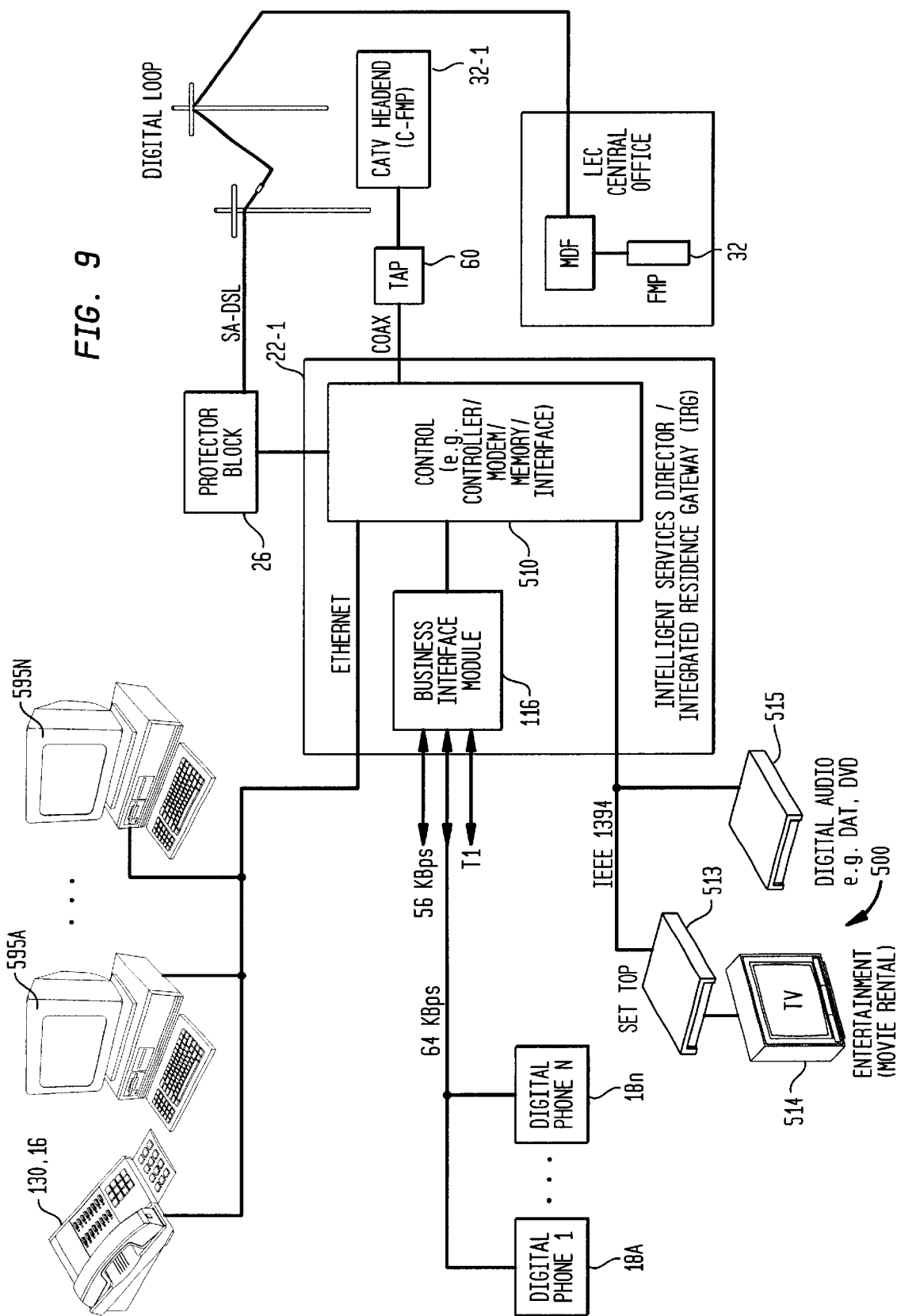
Figure 10:
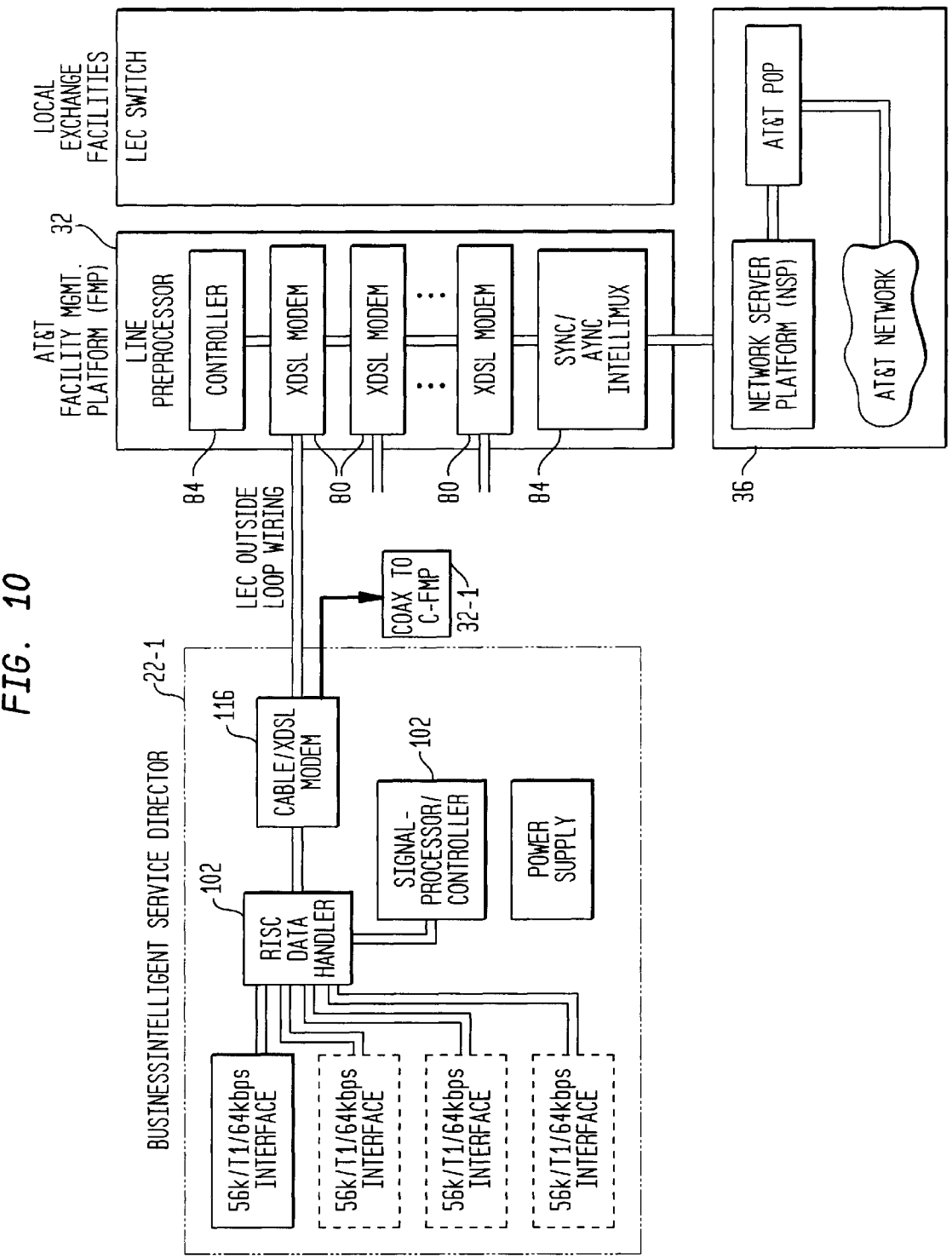

Of course, other embodiments of the ISD/IRG 22, 22-1 will be apparent to those skilled in the art. For example, as shown in FIGS. 8–10, a second exemplary example of the ISD/IRG 22, 22-1 is shown.

Further, various implementations of the ISD/IRG 22, 22-1 may be utilized in different implementations. For example, in FIG. 9, settop 513 may be coupled to any suitable interface such as the IEEE 1394, RF audio/video interface 120, ethernet interface 119, etc. A TV may be coupled to the settop. Additionally, a DAT, DVD and/or other audio device 515 may be coupled to the ISD/IRG 22, 22-1 using a suitable interface.

A typical digital set top device comprises a controller, QPSK or QAM transmitters and receivers and MPEG encoding/decoding. The settop device may communicate with a high resolution HDTV television or an NTSC low resolution television or a personal computer or web-TV type device. The set-top may be coupled to high speed Ethernet or to coaxial cable according to the present invention and include features of the ISD/IRG 22, 22-1 as appropriate.

Figure 11:
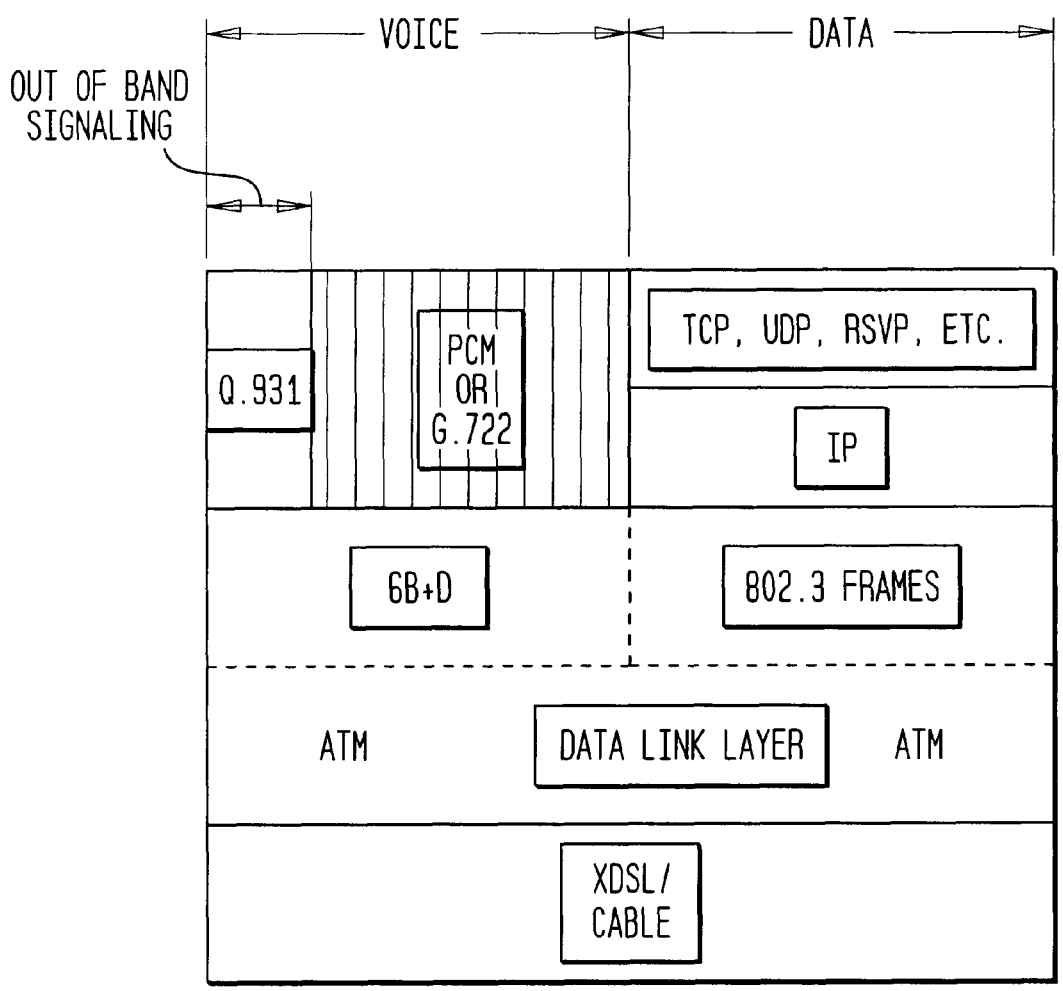
FIG. 11 is an example of one protocol stack for use with the ISD.

Referring to FIG. 11, various protocol stacks may be utilized to transmit the voice and data. For example, a voice signaling stack such as in-band voice over ATM and/or other voice signaling stack may be used. Additionally, an ethernet and/or other IP stack may be utilized.

Figure 12:
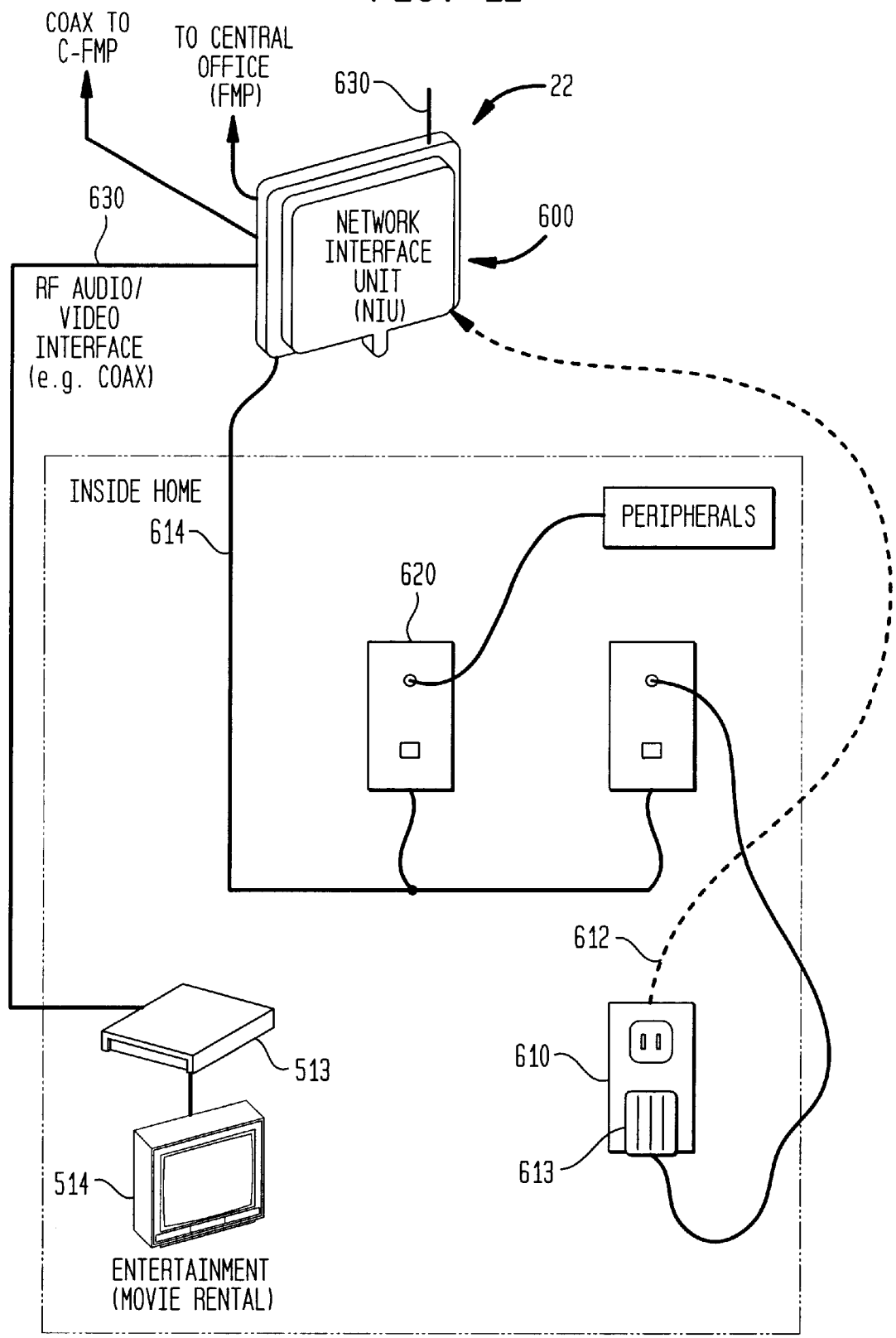
FIG. 12 is a one exemplary embodiment of a form factor for the ISD/IRG.

Referring to FIG. 12, the ISD/IRG 22, 22-1 may be included in a network interface unit. The network interface unit may be variously mounted either inside and/or outside of the house. Where an xDSL/cable modem and/or ISD/IRG 22, 22-1 is incorporated in the NIU 600, it may be desirable to mount the unit external to the home to allow access for service and to upgrade the ISD/IRG 22, 22-1 without entering the user's home. Alternatively, the NIU 600 may be provided within the home where power is more readily available and where temperature is more stable. Auxiliary power may be provided via an outlet within the house via a direct power link 612 and/or via a step-down transformer 613 connected to the ISD/IRG 22, 22-1 via one or more twisted pair phone lines from within the house to outside of the house to the NIU via a spare twisted pair 614. The auxiliary link allows easy retrofit of existing NIUs 600. Phone lines and/or other interface lines may be provided from the ISD/IRG 22, 22-1 to the house via lines 620 (for example, twisted pair cabling). The cordless interface 123 of the ISD/IRG 22, 22-1 may include an antenna 630, for example, a 900 MHZ or other unlicensed frequency antenna mounted to the exterior of the NIU 600. The antenna 630 may be used as a cellular base station for other wireless devices associated with other customer premises. Further, a cable 630 may be associated with RF audio/video interface 120 in the ISD/IRG 22, 22-1. The cable 630 may be coupled to a set-top 513 and/or a TV 514.

Figure 13:
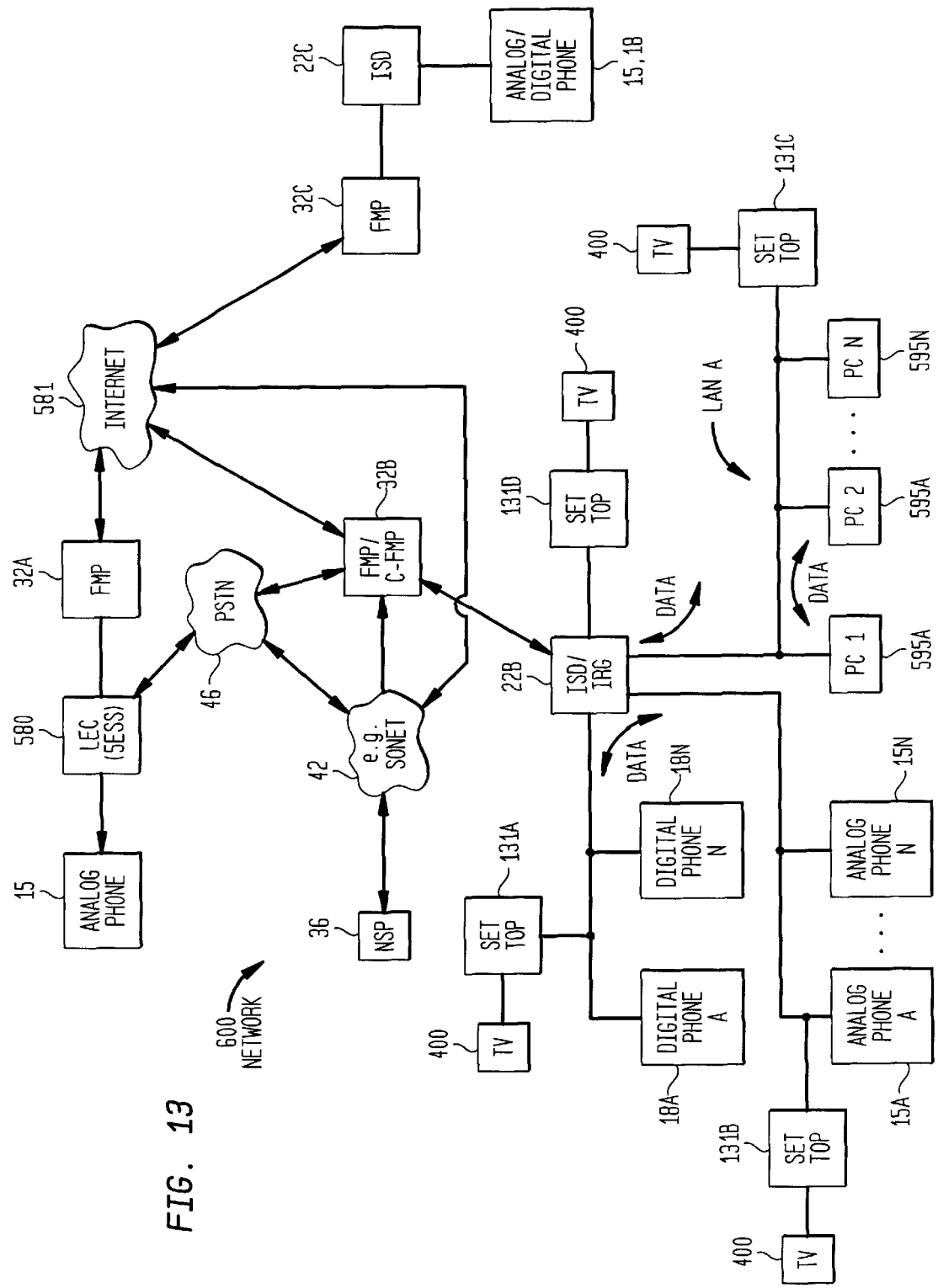
FIG. 13 is an exemplary embodiment of a local house network using the ISD/IRG.

In operation, the ISD/IRG 22, 22-1 may be variously configured. For example, the ISD/IRG 22, 22-1 may be utilized as a local house network. For example, referring to FIG. 13, an overall network 600 showing the ISD/IRG 22, 22-1 functioning in one embodiment of an overall house network. For example, a first ISD/IRG 22B may have associated digital phones 18A–18N, analog phones 15A–15N, and computers (for example, personal computers) PC 1–PC N. The ISD/IRG 22B may be coupled to a FMP/C-FMP 32B. The FMP/C-FMP 32B may in turn be coupled to a plurality of FMPs 32A, 32C, and one or more networks such as the Internet 581, the PSTN 46, and/or a private network such as a SONET network 42. The FMP/C-FMP 32B may also be interconnected with a NSP 36 as discussed in detail above. The FMP 32A may be connected to a local equipment company's network 580, which may in turn be coupled to the PSTN 46. The LEC network may, for example, comprise a 5ESS switch. The LEC 580 may have a plurality of associated analog 15 and/or digital phones (not shown). Similarly, the FMP 32C may have an associated ISD 22C, coupled to one or more analog and/or digital phones 15, 18.

In operation, the network 600 may include a local area network formed using ISD/IRG 22B as a server. ISD/IRG 22B may act as a server/network controller for local area network LAN A having a plurality of attached PCs. For example, many homes today have a plurality of PCs disposed in different rooms of the house, but not interconnected. By using the ISD/IRG 22, 22-1 and standard Ethernet software protocol drivers and associated Ethernet cards, the ISD/IRG 22, 22-1 may function as a network server and/or controller. In this manner, by simply plugging into an existing phone connection, PCs in the house may share date among themselves, among one or more PCs and the Internet 581, between one or more PCs and one of the digital phones 18A–18N (including a video phone). In this manner, the common household problem of how to share information among computers is solved.

Additionally, the problem of obsolete software is also solved. For example, the ISD/IRG 22, 22-1 may be configured to download data from the NSP 36 via any suitable protocol such as the use of a proprietary protocol and/or a tunneling protocol (for example, PPTP) to have direct access to information on the NSP 36.

Figure 39:
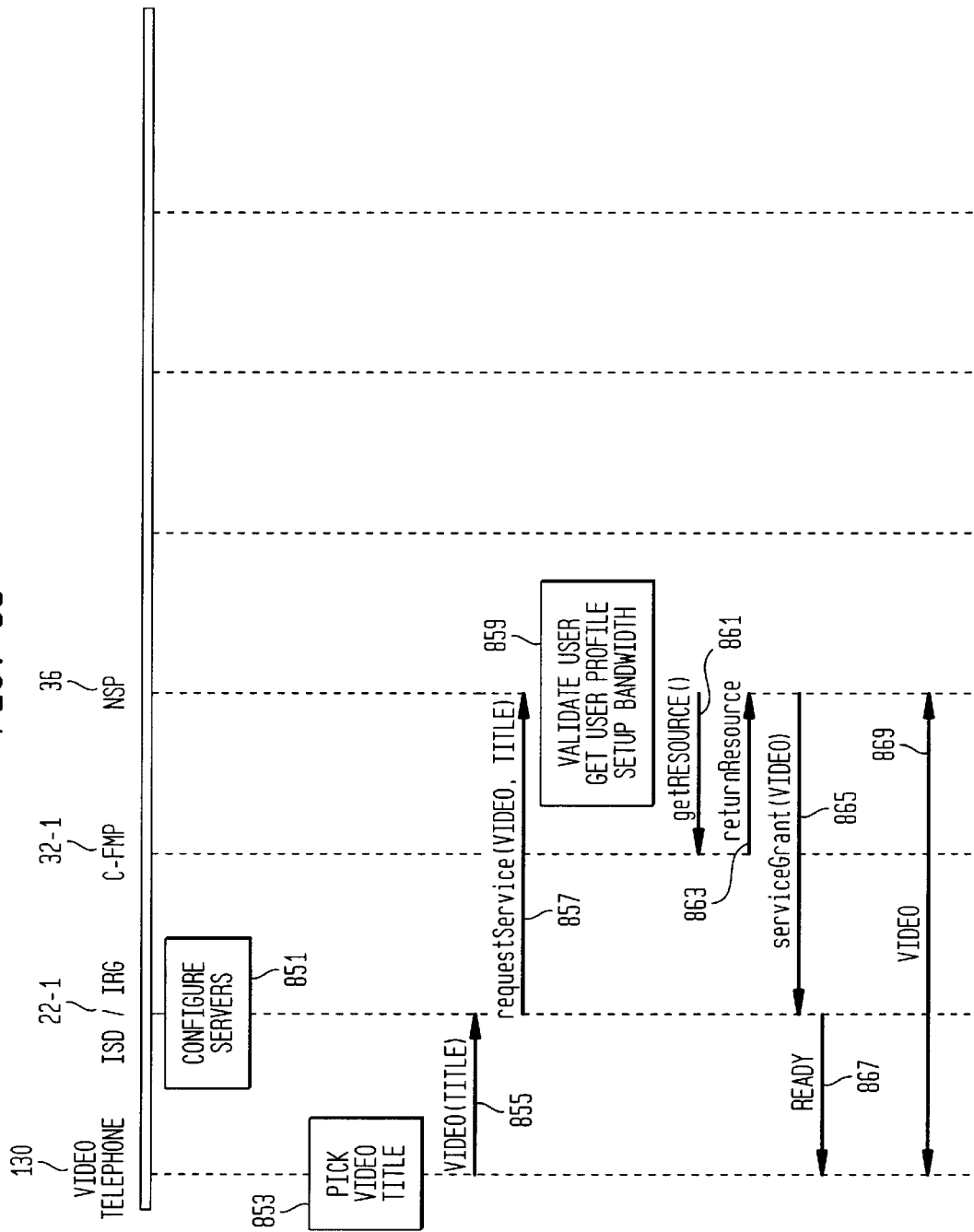
FIG. 39 is a service process flow diagram for showing how the NSP in concert with an ISD/IRG at a user's home and via a C-FMP serving that user provides multicast audio and/or video program services or software, game and other program or information delivery services.

FIG. 39 illustrates a video(television/movie) delivery service but the present invention is not limited thereto. Referring now to FIG. 39, there is shown a further example of service connectivity by an NSP 36. The present service is indicated in shorthand by the suggestion that the present service is like BlockBuster Video™, being able to receive movies or video games at home without having to go to the store to bring home the video or other program for play on a player. In the application shown in FIG. 39, any user may directly access multicast program services at required bandwidth (bit rate) without having to connect via a local exchange carrier (LEC). Pay-per-view, pay-per-listen, pay-per-play and other program delivery services may be provided from one or distributed sites from which the programs are multicast. Referring to FIG. 1C, briefly, the multicast programs are receivable at any NSP 36 within reach of the SONET ring network 42. Moreover, the NSP 36 comprises a database with program availability and routing information.

Components of the system and service architecture are shown at the top including a video telephone 130, ISD/IRG 22, 22-1, C-FMP 32, 32-1 and NSP 36.

As already described, bandwidth to the home or premises of a business may vary according to factors such as cable quality, distance from the Central office, etc., but typically may be in excess of 1 megahertz according to bandwidth allocation procedures followed by the ISD/IRG 22, 22-1 and C-FMP 32-1. Thus, there is a great advantage in a user having access to the multicast program services feature shown in FIG. 39 because 1) the user has greater bandwidth availability and 2) the user may immediately access multicast program services, for example, via NSP 36 bypassing the LEC.

Initially, the OAM&P server of the NSP 36 provisions the multicast program service availability by signaling and provisioning the C-FMP 32-1 with its address, routing and other data the C-FMP 32-1 needs. The NSP 36 has already been described as comprising a large database of data that may provide according to the present application routing information needed for periodically receiving data from remote multicast server locations regarding availability to the user and routing information for receiving multicast programs. As is well known in the art, multicast audio and video programs may be provided in compressed format such as MPEG compressed format or other compression format. The compressed program is decompressed preferably at the video telephone 130. On the other hand, if the video telephone is not so equipped, decompression algorithms may reside in the ISD/IRG 22, 22-1.

Initial step 851 of the service process flow diagram of FIG. 39 is directed to configuring the C-FMP 32-1 to configure the ISD/IRG 22, 22-1 serving the user of the video telephone 130 for multicast program routing to NSP 36. As a result, the C-FMP 32-1 updates its internal routing table of its memory with provisioned routing data for routing to NSP 36 and for providing multicast program services via ISD/IRG 22, 22-1 to a particular user of video telephone 130.

Now, in step 853, it may be assumed that a user has turned on their video telephone 130 and wants to establish a multicast program session. This does not preclude tailored singlecast transmission to viewers. As already described, one of the services that may be offered the user as a menu display option is a multicast program delivery service connectivity. The user clicks on or otherwise inputs their selection of multicast program service connectivity. The menu screen displayed as a result of the multicast program service can be tables of indicia to be looked up. For example, you know you want to see a movie starring Jimmy Stewart. You also know it is a Christmas movie. Using various selection algorithms within the design skills of one in the art, the selection may be narrowed to the well-known movie "It's a Wonderful Life" starring Jimmy Stewart about Christmas. Also, a second area of the display may provide the desired output which may be directory number or Internet address with information about the movie but may also comprise, for example, directions for driving to a movie theater nearest the user if the user wishes to see the movie at a theater instead of at their home video telephone.

At step 853, the user makes a selection of a video or other program title. As already described the program title may comprise a movie title, an audio album or song title and the like by program, title and artist or a game program or software program for download. At step 855, the program title selection is forwarded to the ISD/IRG 22, 22-1. The ISD/IRG 22, 22-1 then formats a service request message describing the program to be delivered and service identifier data such as data representing a VIDEO service. The message is transmitted from the ISD/IRG 22, 22-1 via the C-FMP 32-1 serving that ISD/IRG 22, 22-1 at step 857 to NSP 36.

At step 859, the NSP 36 validates the user and the requested service and obtains the user's profile from database memory. The user profile may provide the user's home address for locating a movie theater nearest them playing the desired movie or certain predetermined movie or other program preferences that can be used as a guide. Then, the NSP 36 searches its database for movie or other program routing data to access the multicast program source and seek a download of the compressed program data.

Meanwhile, the NSP 36 seeks the needed bandwidth for the program delivery service. Of course, audio program, software and game downloads may require less bandwidth than video. At steps 861 and 863, the NSP 36 seeks to establish the necessary bandwidth at the C-FMP 32-1 for receiving the needed resources. The C-FMP 32-1 needs to assure a channel having the bandwidth required is available from the video telephone 130 to the C-FMP 32-1. The C-FMP 32-1 then returns bandwidth and resource availability ok or not ok data to the NSP 36.

If the movie is available on multicast and the bandwidth is available, then the NSP 36 can issue a serviceGrant message for the desired video service to the ISD/IRG 22, 22-1 at step 865. The ISD/IRG 22, 22-1 then signals the video telephone 130 that it is ready to provide the service at step 867. The final play connection is shown at step 869.

As noted above, the video telephone 130 includes the speaker(s) 155 and the microphone 149. According to one embodiment of the present invention, the video telephone 130 is equipped with a speech recognition system 221 so as to allow the user to operate the video telephone 130 using voice commands. For example, the user could say "Call 555-5555" and the video telephone will recognize the command using the speech recognition system and place a call using the stated phone number. As a result, all of the functions of the video telephone can be initiated through voice commands. Speech recognition systems are known in the art and will not be described further here.

As noted above, the video telephone controller 170 is used to coordinate all of the activities within the video telephone. However, the controller 170 is controlled by a central office located in the telephone network. For example, the central office controls when and what type of commercial advertisements are displayed on the video telephone and when the video telephone is turned on and off. This control can be provided individually, locally, or regionally. As a result, the user does not have any control over the commercial advertisements being displayed on the video telephone. The central office does however allow the user to select from a plurality of user selectable options for temporarily controlling various operations of the video telephone. Each user selectable option has at least one menu hierarchy, for example, a plurality of menu screens arranged in a hierarchical form which are displayed depending upon the user selections, that are displayed when the user selectable option is selected. For example, the user can make a telephone call, request customer service, Internet access, help in finding a telephone number, receiving television shows or movies on the touch sensitive screen. These and other options will be further described below with reference to FIGS. 14–38.

Figure 14:
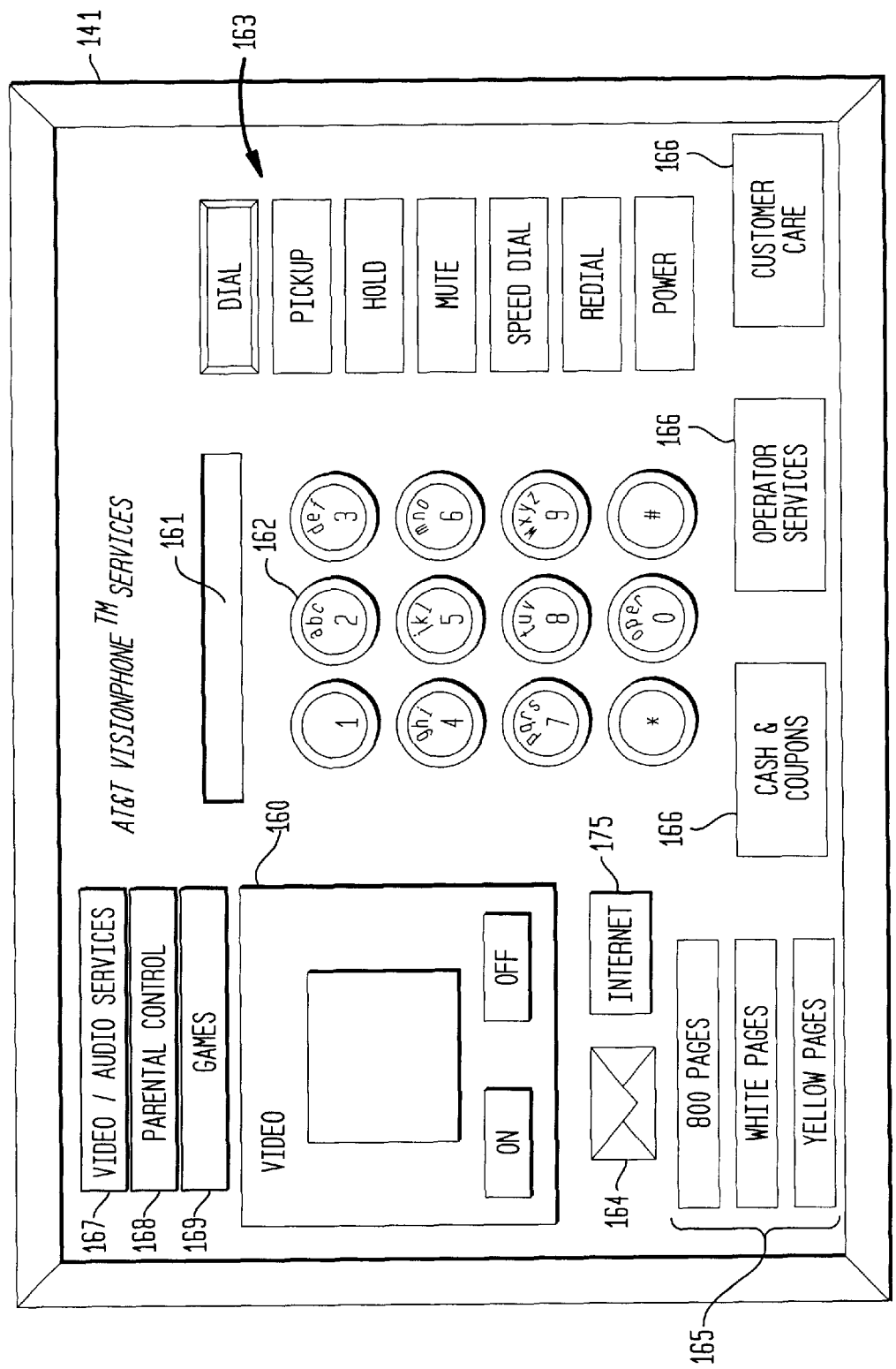
FIG. 14 illustrates a main screen display according to one embodiment of the present invention.

In addition, the central office also controls the video telephone when the video telephone is in the idle and screen saver states. For example, the central office controls the display of the main menu screen. FIG. 14 illustrates the main display screen shown on the touch-sensitive screen 141. Function buttons 163 control the function of the video telephone. Touch button keypad 162 allows the user to make telephone calls. The video screen 160 is used to display the video signals while the main menu screen is being displayed. A plurality of icons 164–169, and 175 are also provided on the main screen. By pressing any of the icon buttons, a new process or operation of the video telephone begins as will be described in more detail below. FIGS. 15–22 illustrate various displays which are displayed on the touch-sensitive screen 141. These screen displays will be described in more detail below.

Figure 23:
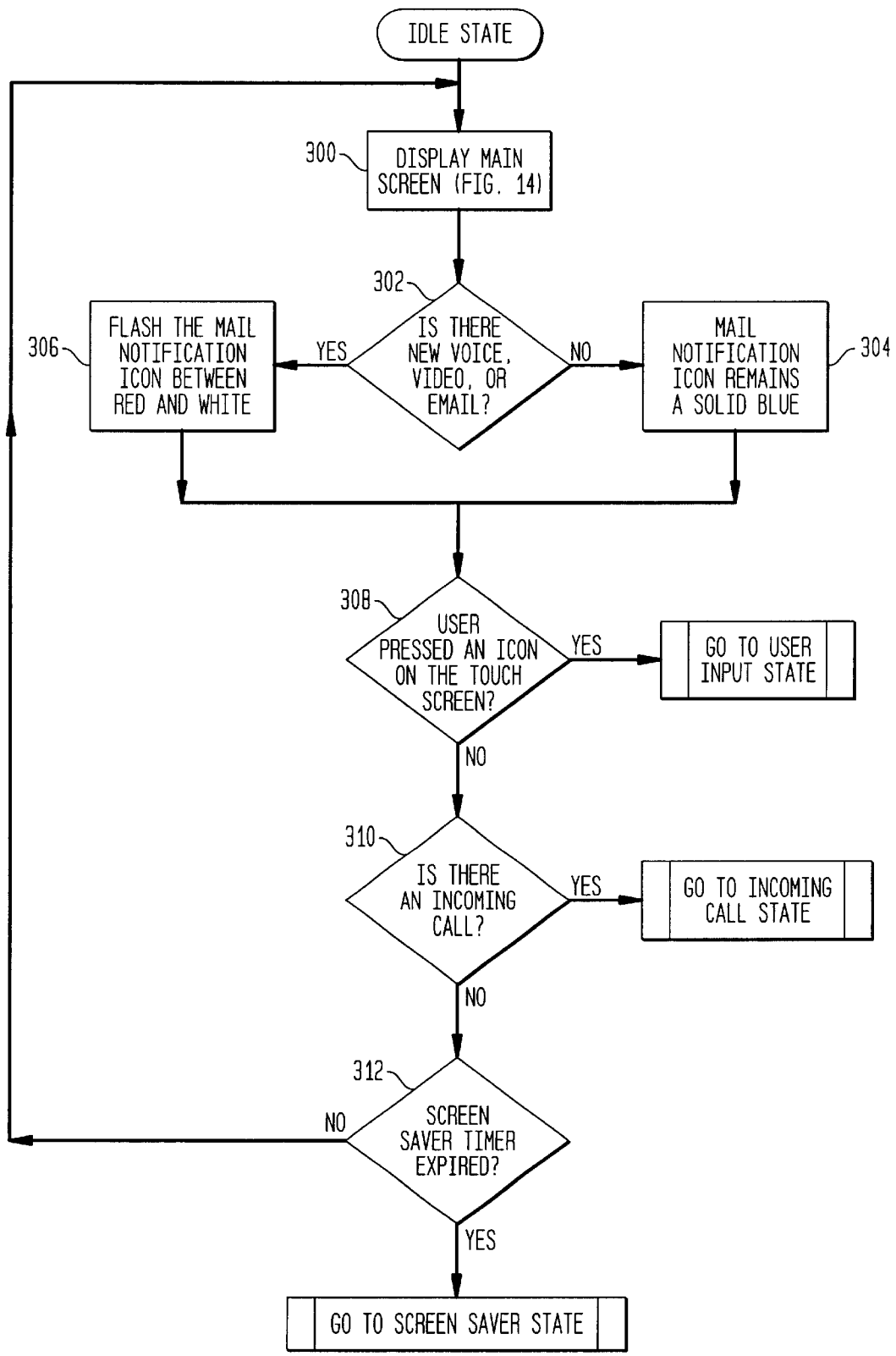
FIG. 23 is a flow chart illustrating an idle state of the video telephone according to one embodiment of the present invention.

FIG. 23 illustrates the operation of the video telephone 130 in the idle state. In step 300, the main screen display (FIG. 14) is displayed on the touch-sensitive screen 141. The controller then determines whether there is new voice, video or e-mail in step 302. If there is no new mail, then the mail notification icon remains a solid blue color, for example, in step 304. However, if new mail has been detected, the mail notification icon flashes between red and white, for example, in step 306. The controller then determines whether the user has pressed an icon on the touch screen in step 308. If the user has pressed a touch screen, the system then goes to the user input state which will be described below with reference to FIGS. 25A–25C. If the controller in step 308 determines that the user has not pressed an icon on the touch screen, the controller determines whether there is an incoming call in step 310. If an incoming call is detected, the system goes to the incoming call state which will be described below with reference to FIG. 38. If an incoming call is not detected, the controller determines whether the screen saver timer has expired in step 312. If the screen saver timer has not expired, the system returns to step 300. However, if the screen saver timer has expired, the system goes to the screen saver state which will be described below with reference to FIG. 24.

Figure 15:
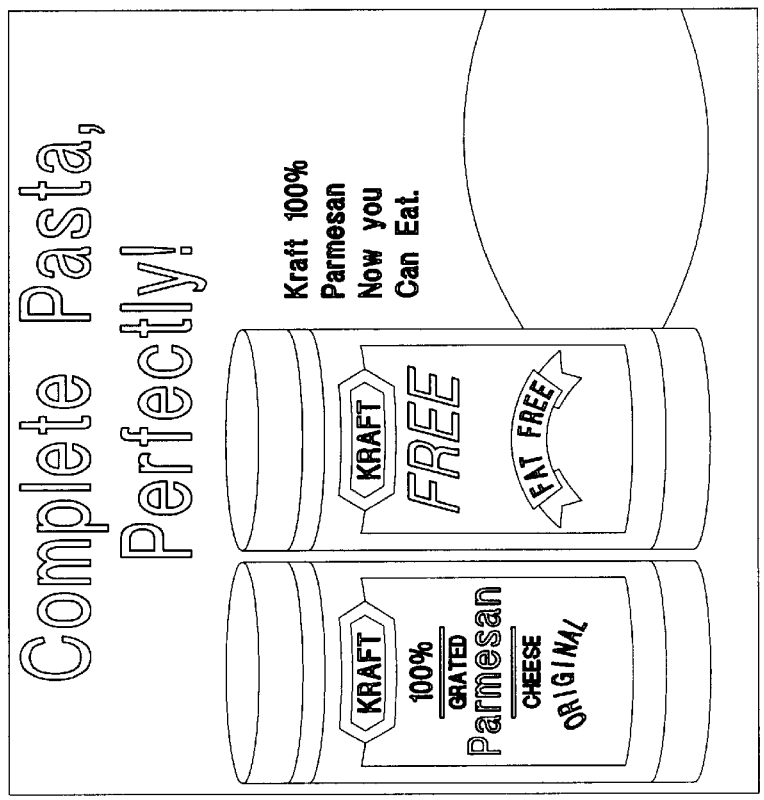
FIGS. 15 and 16 illustrate advertising screens according to one embodiment of the present invention.
Figure 24:
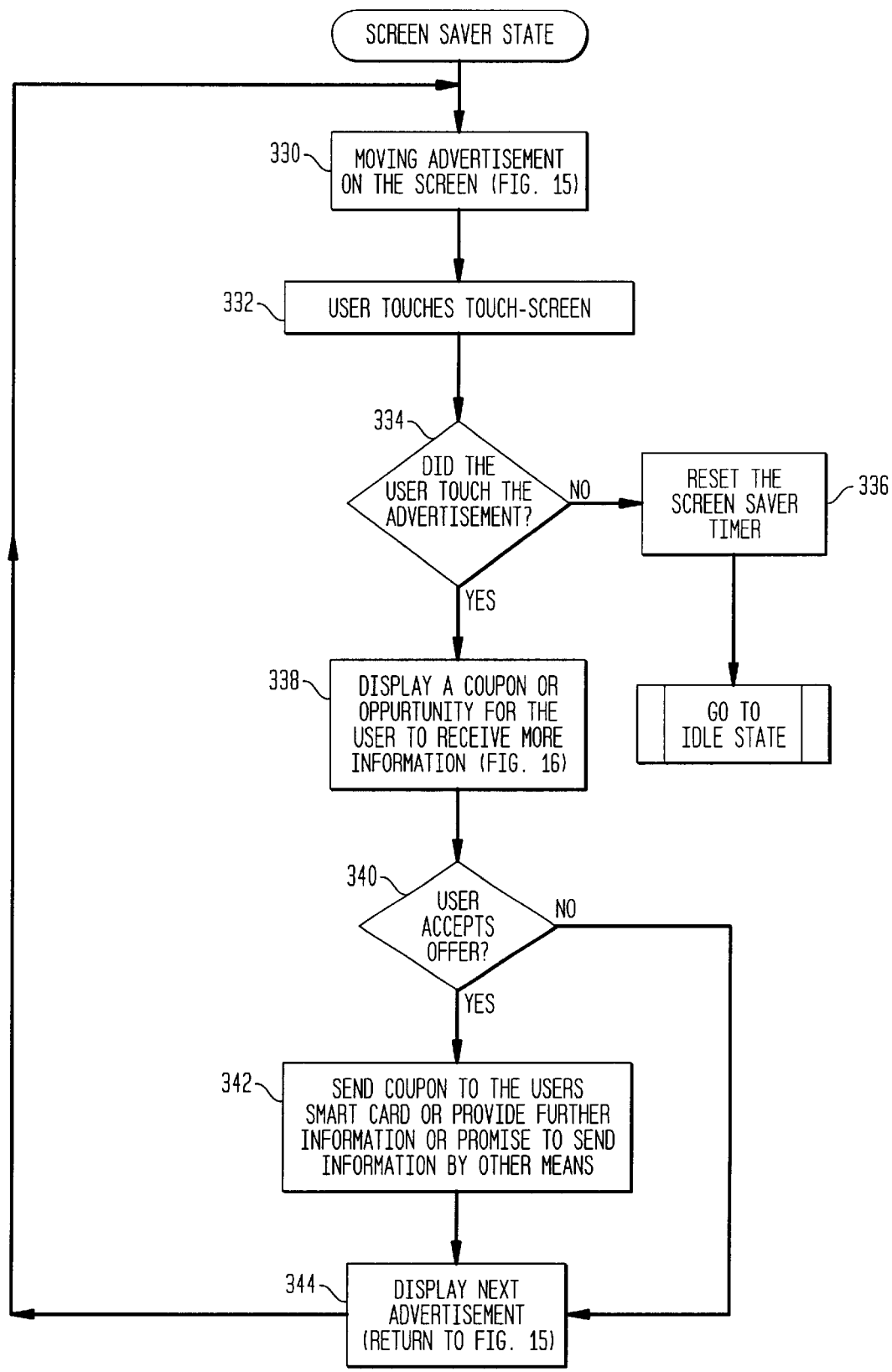
FIG. 24 is a flow chart illustrating a screen saver state of the video telephone according to one embodiment of the present invention.
Figure 44:
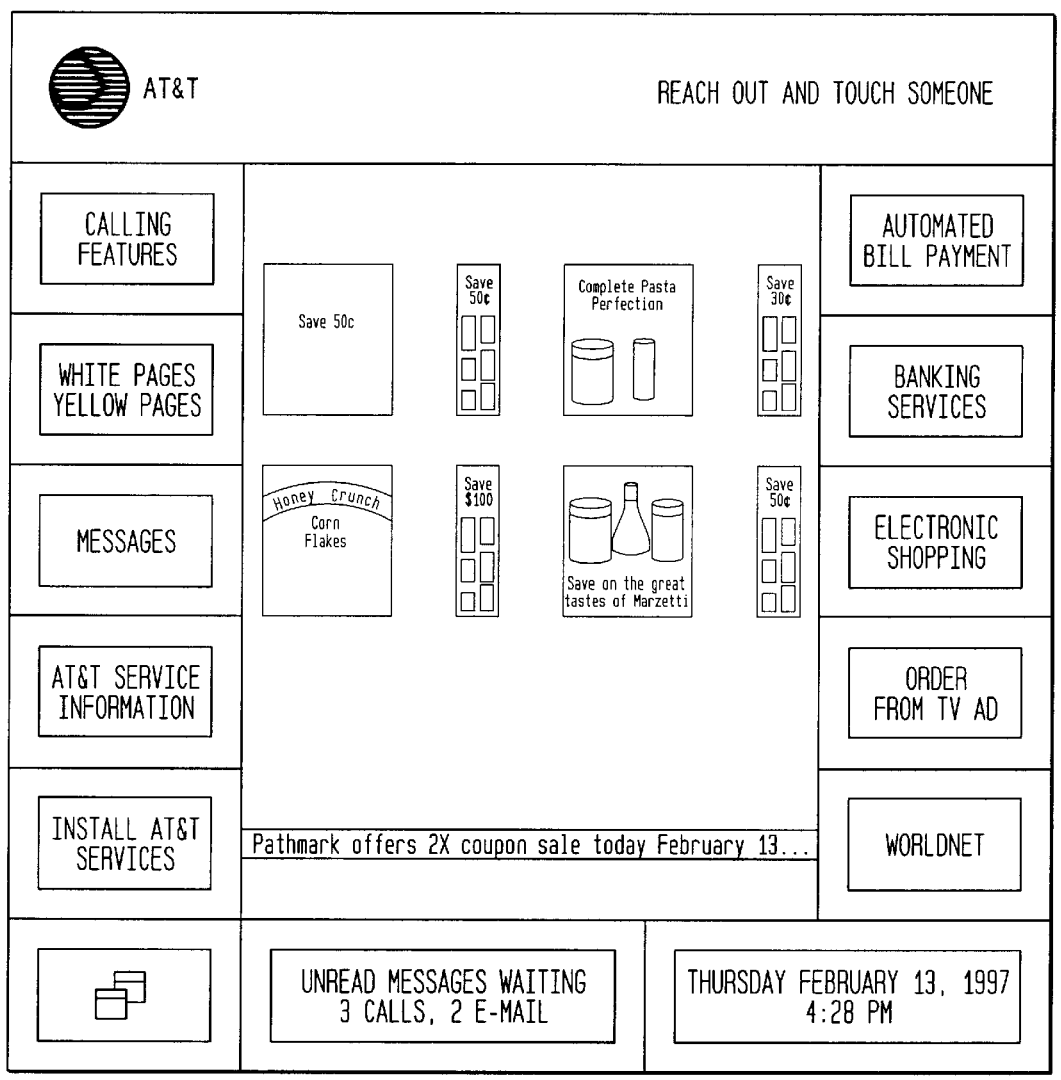
FIGS. 44 and 45 are illustrative display screens according to several embodiments of the present invention.
Figure 45:
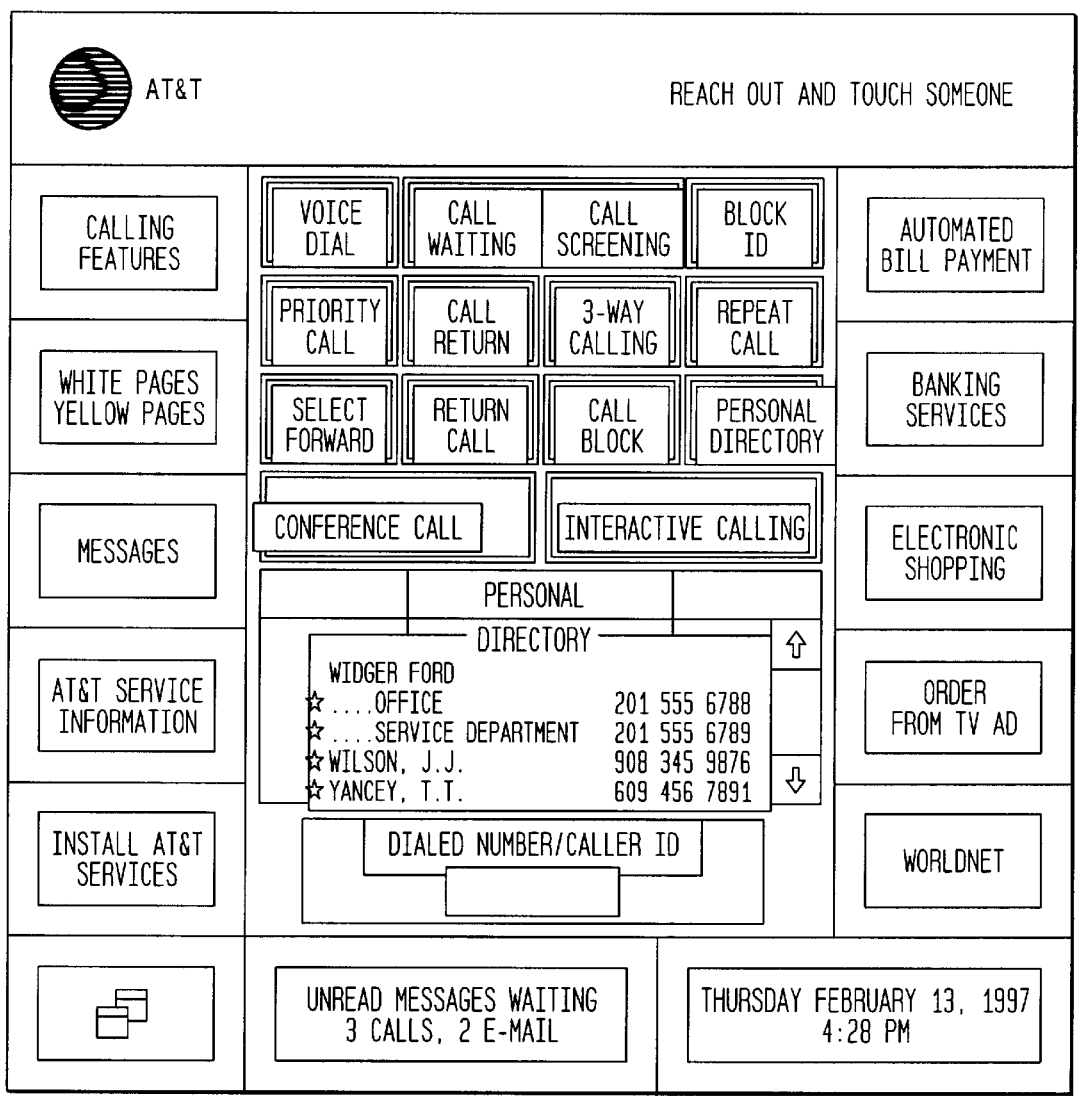

FIG. 24 illustrates the operation of the video telephone system when the video telephone is in the screen saver state. In step 330, a moving advertisement is placed on the touch-sensitive screen as illustrated in FIGS. 15 and 44. When the user touches the touch-sensitive screen, in step 332, the controller then determines whether the user touched the advertisement in step 334. If the user did not touch the advertisement, then the screen saver timer is reset in step 336 and the system goes back to the idle state.

Figure 16:
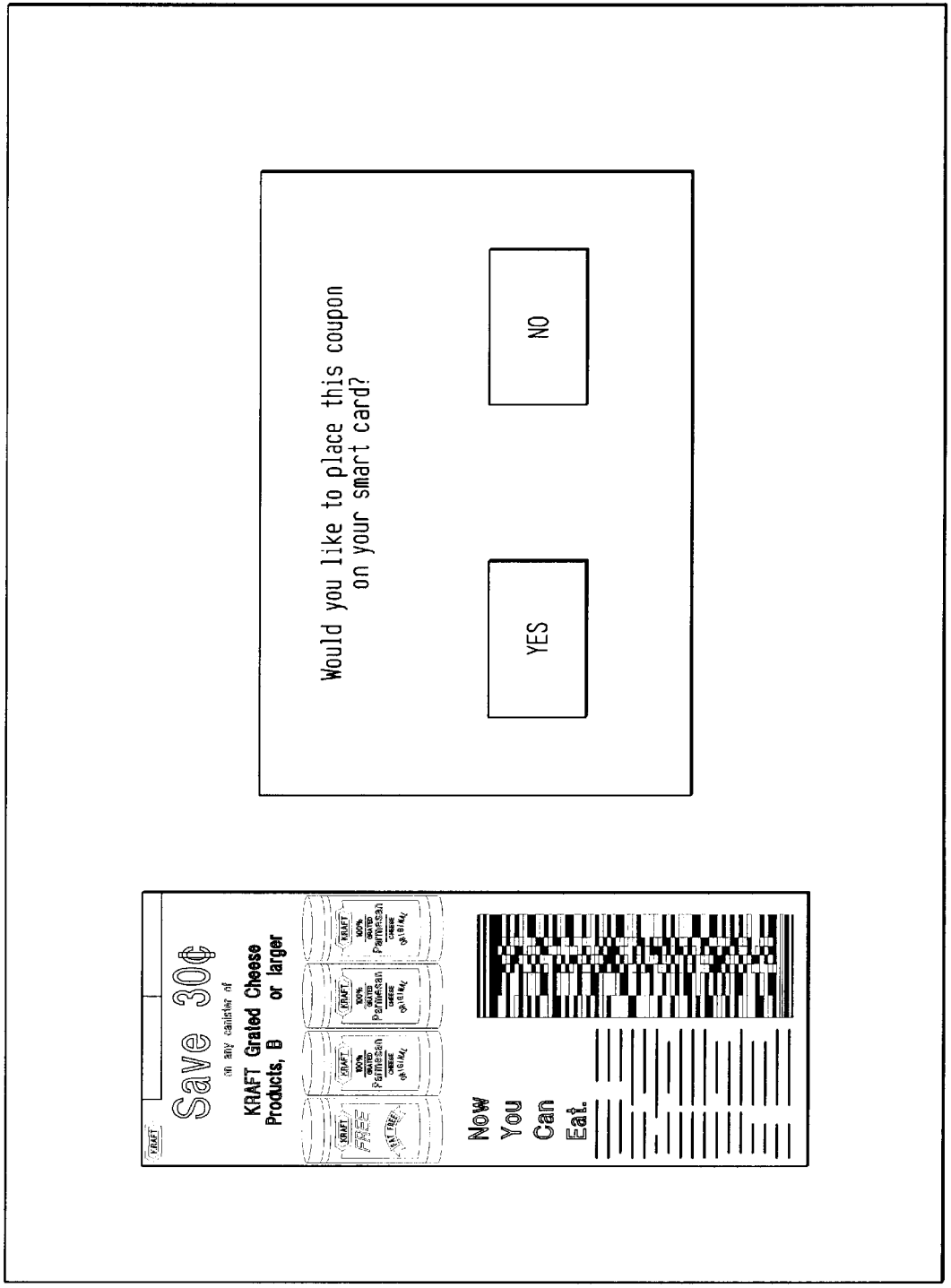

If it is determined that the user did touch the advertisement in step 334, the video telephone displays additional information about the advertisement, if additional information is available, such as a coupon or opportunity for the user to receive more information in step 338 as illustrated in FIG. 16. If the user does not accept the offer in step 340, then the touch-sensitive screen displays the next advertisement in step 344. However, if the user does accept the offer in step 340, the controller sends an electronic coupon received from the central office to the user's smart card or the printer 152 or provides further information or promises to send information by other means in step 342. The touch-sensitive screen then displays a new advertisement in step 344.

Figure 25A:
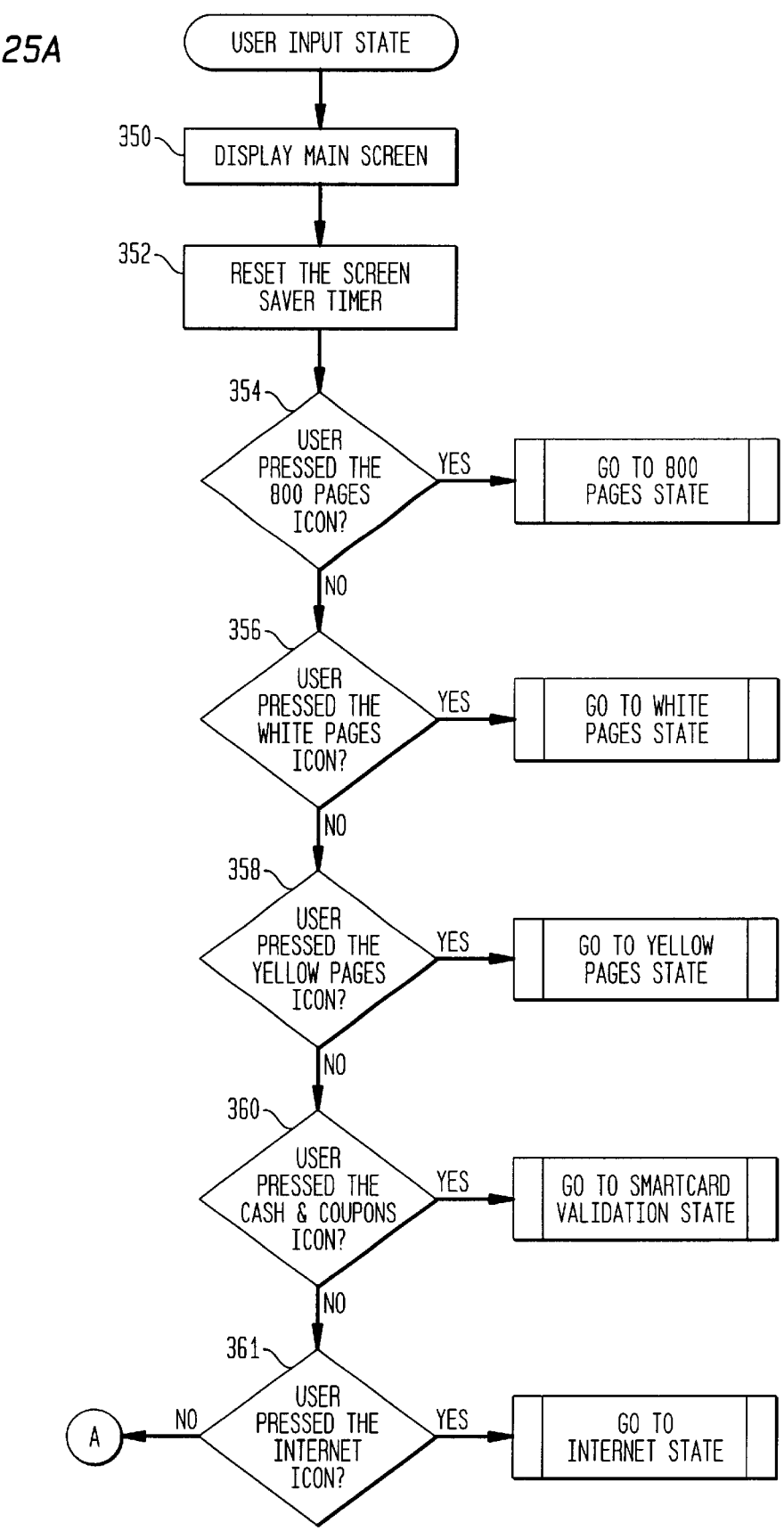
FIGS. 25A–25C are flow charts illustrating a user input state of the video telephone according to one embodiment of the present invention.
Figure 25B:
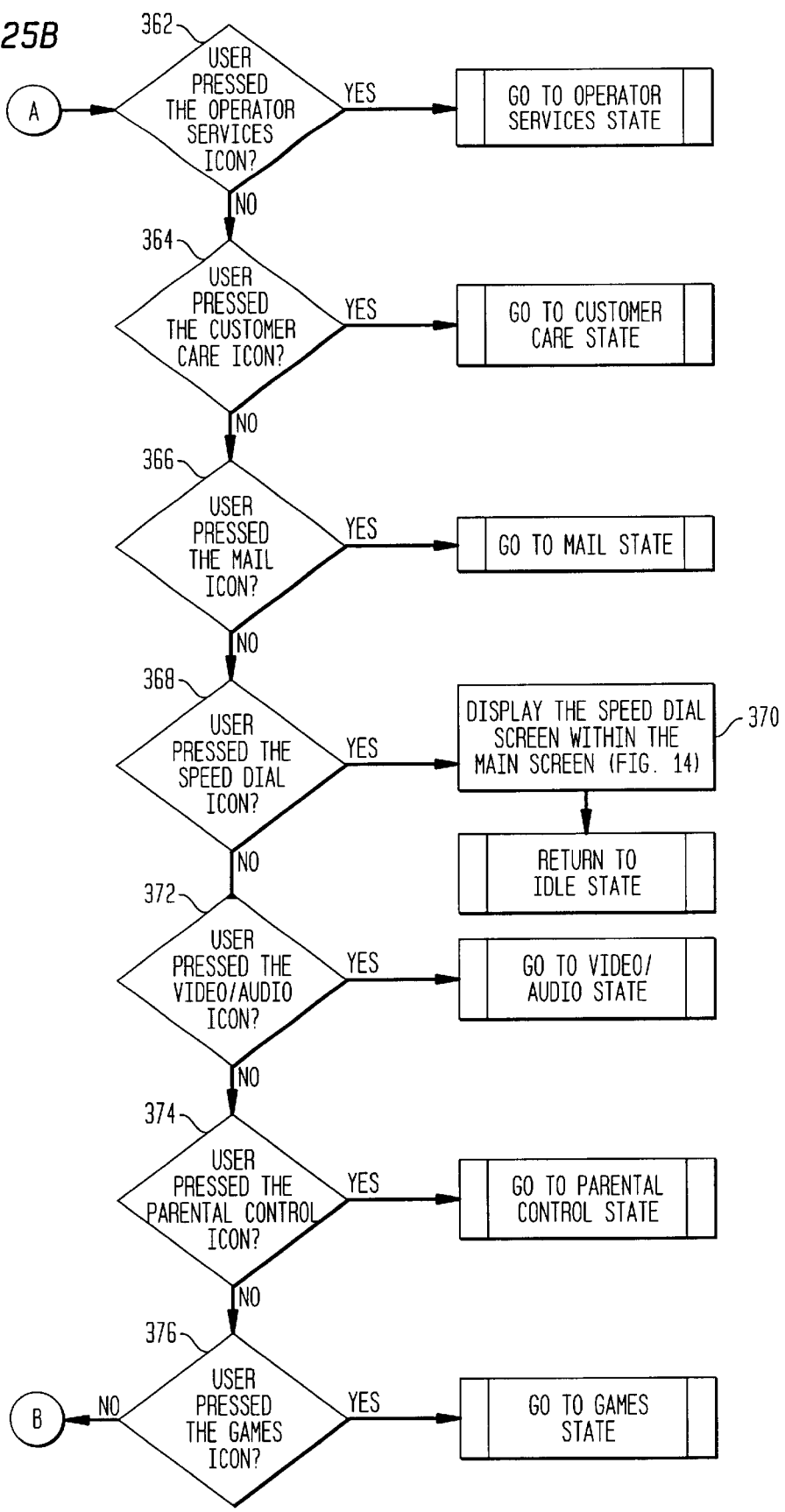
Figure 25C:
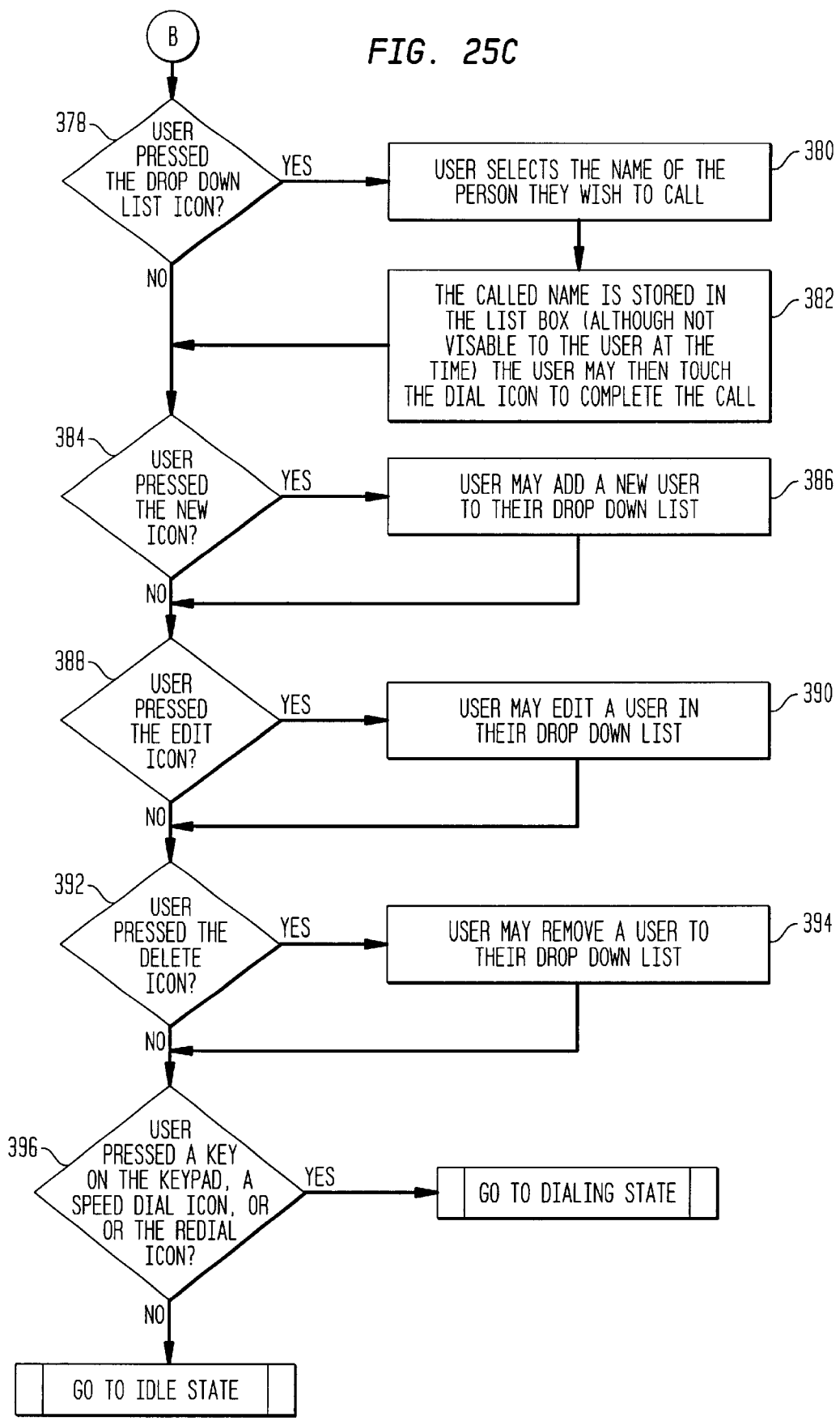

FIGS. 25A–25C illustrate the user input state of the video telephone. First, the main menu display screen is illustrated in step 350 and the screen saver timer is set in step 352. The controller next determines whether the user has pressed the 800 pages icon in step 354. If the user has pressed the 800 pages icon, the system goes to the 800 pages state which will be described below with reference to FIG. 32. If the user has not pressed the 800 pages icon, the controller determines whether the user has pressed the white pages icon in step 356. If the user has pressed the white pages icon, the system goes to the white pages state which will be described below with reference to FIG. 34. If the user has not pressed the white pages icon, the controller determines whether the user has pressed the yellow pages icon in step 358. If the user has pressed the yellow pages icon, the system goes to the yellow pages state which will be described below with reference to FIG. 33. If the user has not pressed the yellow pages icon, the controller determines whether the user has pressed the cash and coupons icon in step 360. If the user has pressed the cash and coupons icon, the system goes to the smart card validation state which will be described below with reference to FIG. 30. If the user has not pressed the cash and coupons icons, the controller determines whether the user has pressed the internet icon in step 361. If the user pressed the internet icon, the system goes to the internet state and displays an internet screen such as the screen illustrated in FIG. 19.

Figure 40:
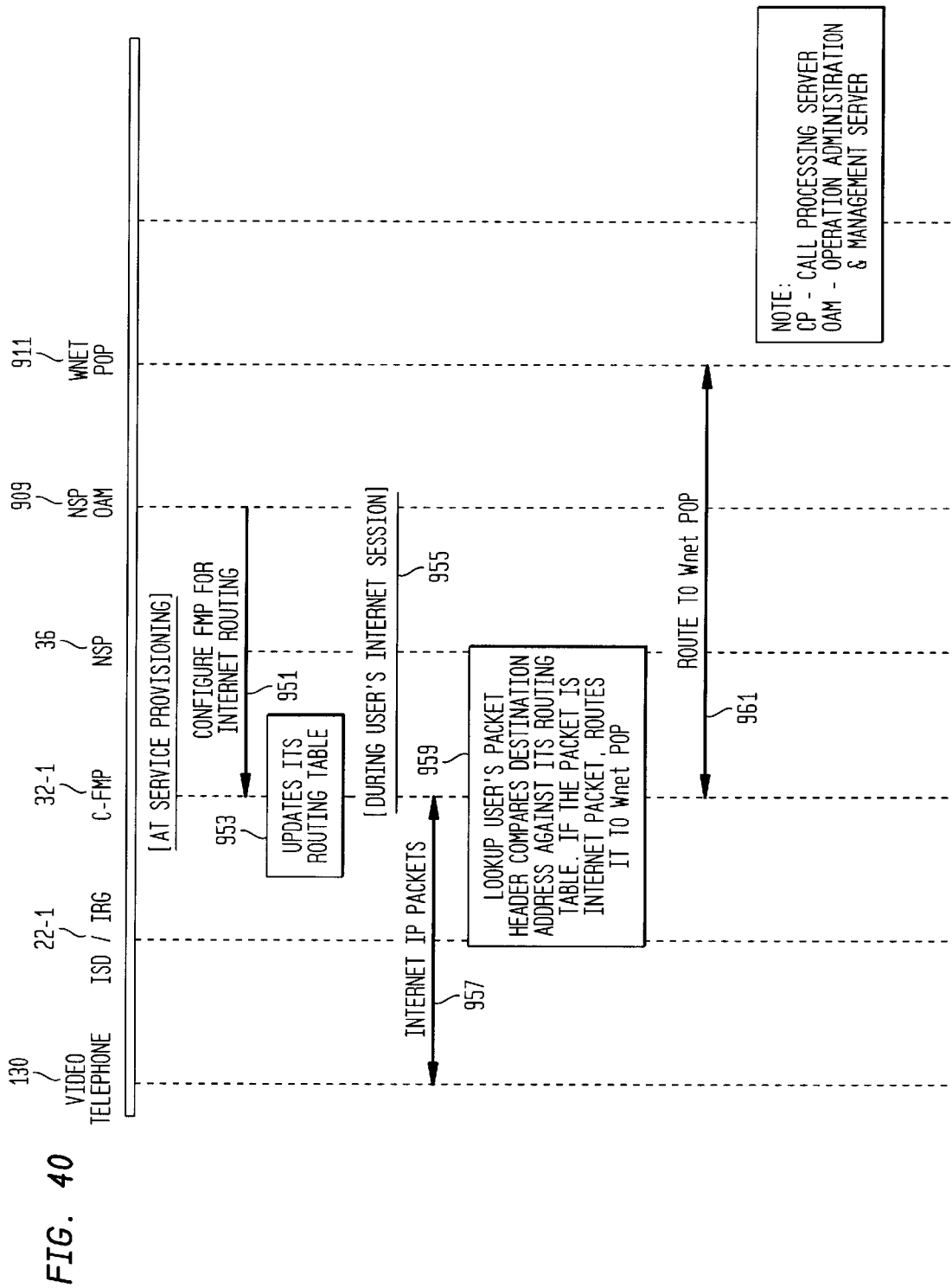
FIG. 40 is a service process flow diagram for showing how the NSP in concert with an ISD/IRG at a user's home and via a C-FMP serving that user provides Internet service connectivity via, for example, an Internet Service Provider's point of presence (POP) using AT&T's WorldNet Internet service as one example.
Figure 41:
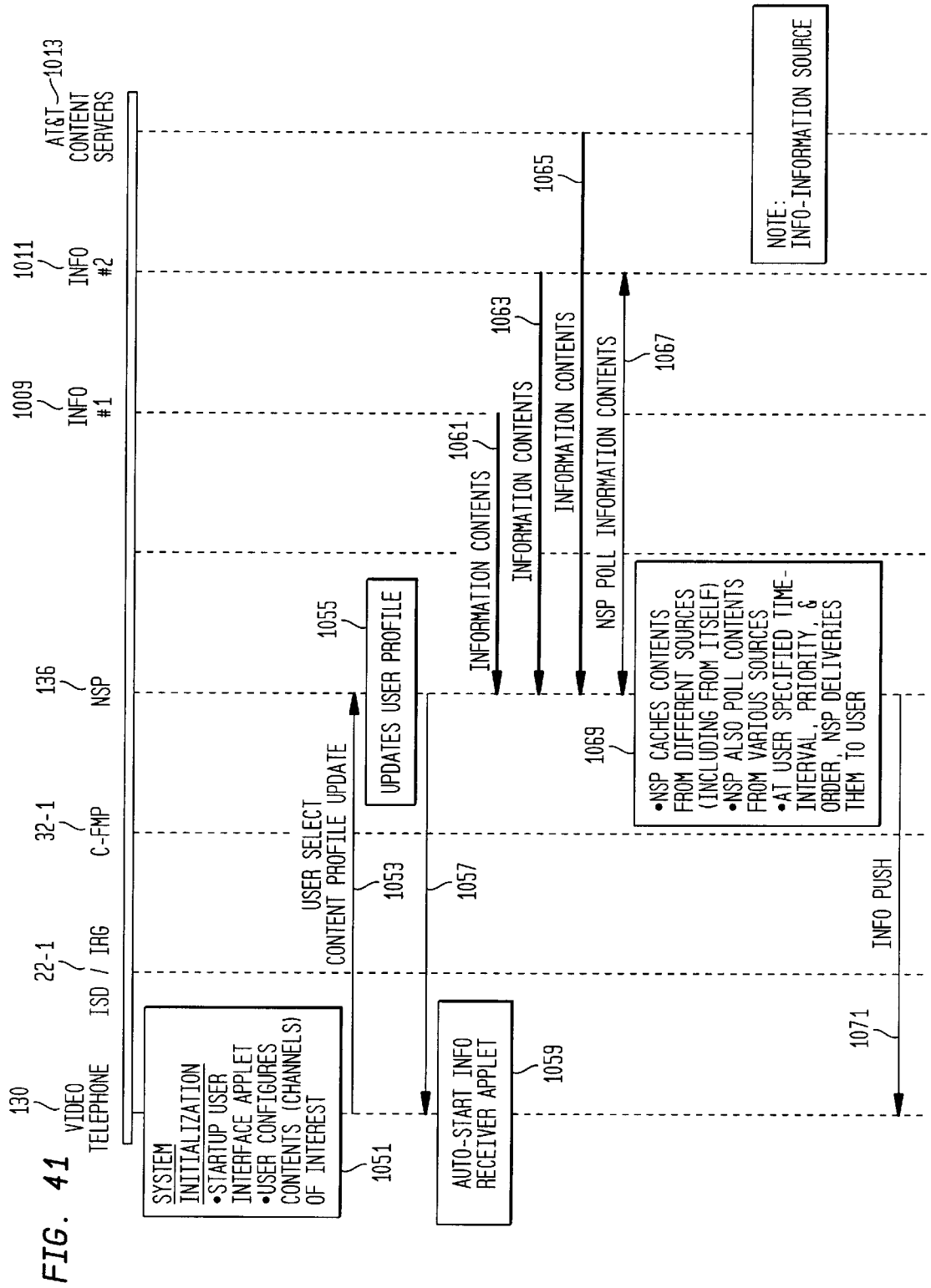
FIG. 41 is a service process flow diagram for showing how the NSP may comprise cache memory and maintain a user profile such that the NSP may obtain information from various information service providers for forwarding and display to a user in accordance with their user profile.

FIGS. 40 and 41 illustrate Internet connectivity according to one embodiment of the present invention. Referring now to FIG. 40, there is shown a further example of service connectivity by an NSP 36. In the application shown in FIG. 40, any user may directly connect to an Internet service provider (ISP) at great bandwidth (bit rate) without having to connect via a local exchange carrier (LEC). Components of the system and service architecture are shown at the top including a video telephone 130, ISD/IRG 22, 22-1, C-FMP 32-1 and NSP 36. The Operations, Administration, Management and Provisioning (OAM&P) server of the NSP 36 is also shown as NSP OAM 909. Finally, by way of example, a point of presence for an Internet service provider, namely AT&T's WorldNet service, is shown as Wnet POP 911.

As already described, bandwidth to the home or premises of a business may vary but typically may be in excess of 1 megahertz according to bandwidth allocation procedures followed by the ISD/IRG 22, 22-1 and C-FMP 32-1. Thus, there is a great advantage in a user having access to the Internet connectivity feature shown in FIG. 40 because 1) the user has greater bandwidth availability and 2) immediate access to AT&T WorldNet, for example, via NSP 36 bypassing the LEC.

Initially, the OAM&P server of the NSP 909 provisions the Internet connectivity service by signaling and provisioning the C-FMP 32-1 with address, routing and other data the C-FMP 32-1 needs. Step 951 is directed to configuring the C-FMP 32-1 serving the user of video telephone 130 for Internet service routing to, for example, AT&T WorldNet Internet Service point of presence 911. As a result, in step 953, the C-FMP 32-1 updates its internal routing table of its memory with provisioned routing data for routing to Wnet POP 911.

Now, instep 955, it may be assumed that a user has turned on their video telephone 130 and wants to establish an Internet session. As already described, one of the services that may be offered the user as a menu display option is Internet service connectivity. The user clicks on or otherwise inputs their selection of Internet service connectivity. The video telephone 130 via the ISD/IRG 22, 22-1 obtains immediate access to the already provisioned C-FMP 32-1 at step 957 as the user's Internet session begins. At step 957, Internet protocol (IP) data packets are forwarded and returned via the C-FMP 32-1. The C-FMP 32-1 now acts as a mini-server and performs steps 959. The C-FMP 32-1 looks up the user's packet header and compares the destination address against the routing table that was provisioned at step 951. The routing table then provides routing data for routing the IP packets to, for example, AT&T WorldNet Internet service at Wnet POP 911. Step 961 suggests the routing of IP packets to the Wnet POP 911 and an exchange of packets that follows via C-FMP 32-1 to the video telephone 130. Note that the local exchange carrier is not involved and the bandwidth and data rate for exchange of Internet IP packets may be the maximum bandwidth permissible by the facility between the C-FMP 32-1 and the video telephone 130. FIG. 40 similarly describes the process of routing to other destinations of a routing table of C-FMP 32-1 that has been provisioned by NSP OAM 909. For example, besides serving as a gateway to the Internet, the NSP may provide a gateway to applets from a JAVA based server for such things as bill paying, utility meter reading, energy management, security services for any connected device.

Referring now to FIG. 41, there is shown yet another example of service connectivity by an NSP 36. In the application shown in FIG. 41, any user may enter and periodically update a user profile showing their interests and preferences. The NSP 36 comprising significant cache memory can search for and obtain information directly related to the user entered preferences. When the user actuates their personal computer, the user may obtain the collected information that the NSP 36 has collected on the user's behalf. Components of the system and service architecture are shown at the top including a video telephone 130, ISD/IRG 22, 22-1, C-FMP 32-1 and NSP 36. Info #1 1009 and Info #2 1011 are shown by way of example as one or more information service providers that the NSP 36 may access for information. Finally, by way of example, AT&T information content servers as a group are shown as AT&T Content Servers 1013.

At step 1051, the personal computer, intelligent terminal, vision phone or other terminal 130 performs system/service initialization. Without a user profile, the service will not be able to retrieve any relevant information. There is a startup via a user interface applet, for example, by clicking on a user profile icon. Then, the user is presented with a user profile display or other input means for inputting information contents of interest to the user. The contents ultimately may refer to channels whereby the information can be obtained, for example, stock market ticker or sports ticker channels. Likewise, the contents may simply define a preference such as to information directed to genealogical research of an ancestor or hobby or scientific interests or pursuits.

At step 1053, the user profile for selected contents (information channels) is transmitted via the ISD/IRG 22, 22-1 and C-FMP 32-1 for storage at the NSP 36. The NSP 36 then updates the user profile at step 1055 that is presently stored in memory or initializes the user profile in memory. The NSP 36 then, once the use profile is known, can begin to search for relevant information at any and all information sources available on SONET ring network 42 (FIG. 1C). The NSP 36 then forwards an auto-start Info Receiver applet to the video telephone 130 for display, for example, as a menu selectable item or an icon or the like. Whenever the user accesses that applet, the collected information for their user profile is pushed to their video telephone at step 1071.

However, prior to an information to terminal dump at step 1071, the NSP 36 collects information from various sources at steps 1061, 1063 and 1065. The access to the information source may be via private line, shared line, Internet or telephony channels. For example, at step 1061 the information contents of Info #1 1009 relevant to the user profile is downloaded and stored in cache memory of NSP 36 for that user to identify themselves and access. At step 1063, the information contents of Info #2 1011 relevant to the user profile is downloaded and stored in cache memory of NSP 36 for the same user. Only two information sources are shown but many information sources may be queried and the query results downloaded to NSP 36. Finally, via AT&T or other Internet service provider, the respective information content servers may be queried for relevant information and or channels (virtual or physical) realized and provided to NSP 36. These may include stock market tickers, sports tickers, new tickers and the like of current interest. At either NSP 36 or video telephone 130, information filters may be used to only retrieve current data with respect to, for example, the stock portfolio or sports teams of interest to the user. Moreover, the NSP 36 must periodically update the cache memory with newly received information relevant to the user's requests. A new information source may appear on the Internet or as a telephone listing or a new sports or other channel may be identified to NSP 36 for polling. This is shown as step 1067.

In summary, then as shown at step 1069, the NSP 36 caches contents from different sources (including from itself—for example—local directory listings and geographical location finding services). The NSP 36 also polls contents from various sources to, for example, obtain updates or new information. At a user specified time interval or according to a user specified schedule as per their user profile, and according to a user specified priority ranking, the information may be ordered and delivered to the user via an information push at step 1071.

Returning to FIGS. 25A–25C, if the user has not pressed the internet icon, the controller determines whether the user pressed the operator services icon in step 362. If the user has pressed the operator service icon, the system goes to the operator services state which will be described below with reference to FIG. 35.

If the user has not pressed the operator services icon, the controller determines whether the user has pressed the customer care icon in step 364. If the user has pressed the customer care icon, the system goes to the customer care state which will be described below with reference to FIGS. 36A and 36B. If the user has not pressed the customer care icon, the controller determines whether the user has pressed the mail icon in step 366. If the customer has pressed the mail icon, the system goes to the mail state which will be described below with reference to FIG. 37.

Figure 17:
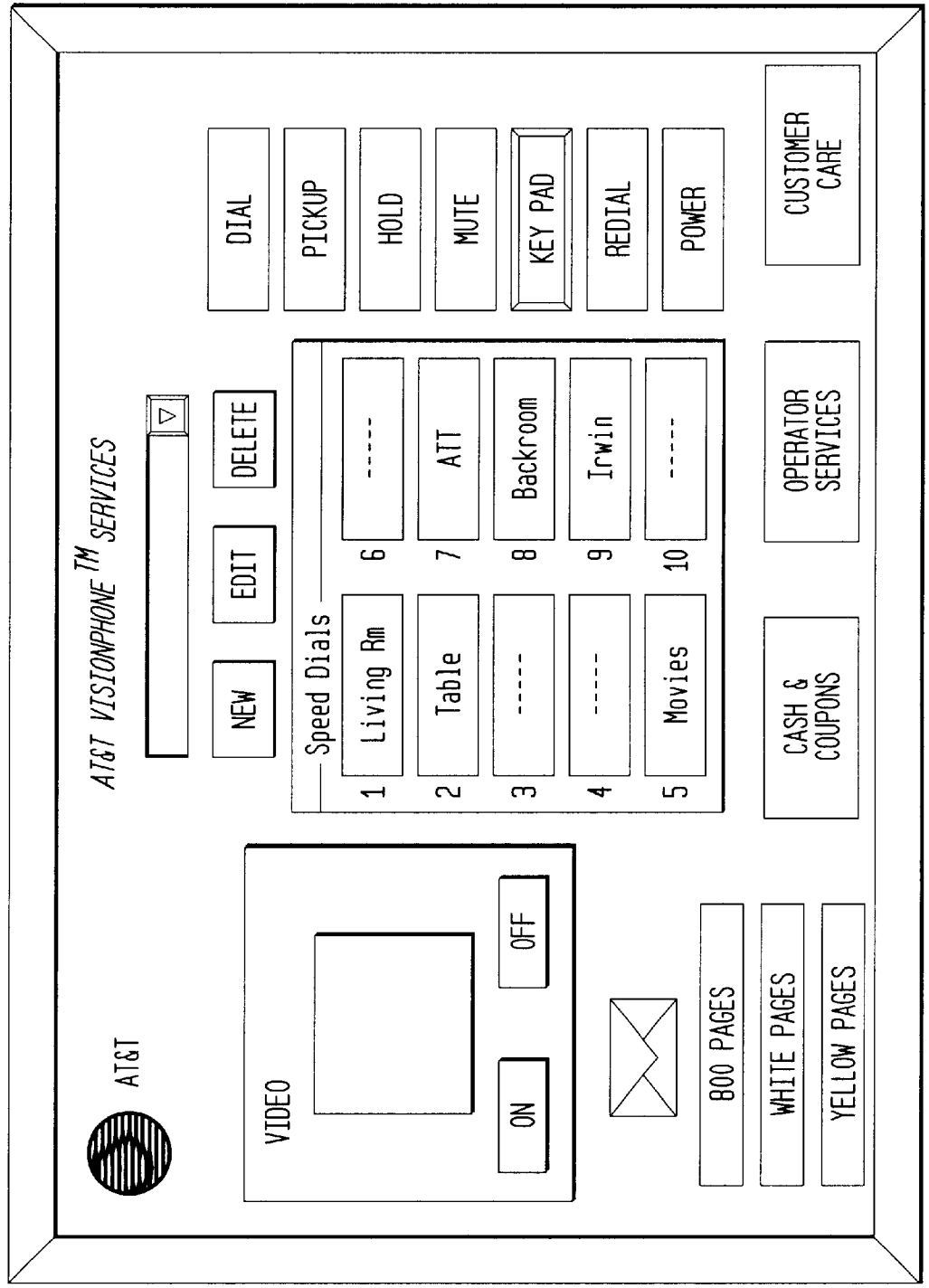
FIG. 17 illustrates a speed-dial screen according to one embodiment of the present invention.

If the user has not pressed the mail icon, the controller determines whether the user pressed the speed dial icon in step 368. If the user has pressed the speed dial icon, the system will display the speed dial screen within the main screen in step 370 as illustrated in FIG. 17. In addition, the controller could display a personal directory as illustrated in FIG. 44. It will be understood that a personal directory icon can be displayed on the main user screen. The system will then return to the idle state.

If the user has not pressed the speed dial icon, the controller determines whether the user has pressed the video/audio icon in step 372. If the user has pressed the video/audio icon, the system goes to the video/audio state which will be described below with reference to FIG. 51. If the user has not pressed the video/audio icon, the controller determines whether the user has pressed the parental control icon in step 374. If the customer has pressed the parental control icon, the system goes to the parental control state which will be described below with reference to FIGS. 51A and 51B.

If the user has not pressed the parental control icon, the controller determines whether the user has pressed the games icon in step 376. If the user has pressed the games icon, the system goes to the games state which will be described below with reference to FIG. 57.

If the user did not press the games icon, the controller determines whether the user pressed the drop down list icon in step 378. If the user did press the drop down list icon, a drop down list appears on the touch-sensitive screen and the user selects the name of the person they wish to call in step 380. The selected name is stored in a list box in step 382. The user may then touch the dial tone icon to complete the call. If the user did not touch the drop down list icon, the controller determines whether the user pressed the new icon in step 384 If the user did press the new icon button, the user is allowed to add a new user to the drop down list in step 386.

If the user did not press the new icon button, the controller determines whether the user pressed the edit icon in step 388. If the user pressed the edit icon, the user can edit the current drop down list in step 390. If the user did not press the edit icon, the controller determines whether the user pressed the delete icon in step 392. If the user pressed the delete icon, the user can remove a name from the drop down list in step 394.

If the user did not press the delete icon, the controller determines whether the user pressed a key on the keypad, a speed dial icon, or the redial icon in step 396. If the user pressed one these keys, then the system goes to the dialing state which will be described below with respect to FIG. 26. If the user did not press a key on the keypad, a speed dial icon, or a redial icon, then the system goes back to the idle state as describe above with reference to FIG. 23. It will be understood by one skilled in the art that the order in which the preceeding and subsequently discussed icons are checked can be modified without changing the scope of the present invention and the present invention is not limited thereto.

Figure 26:
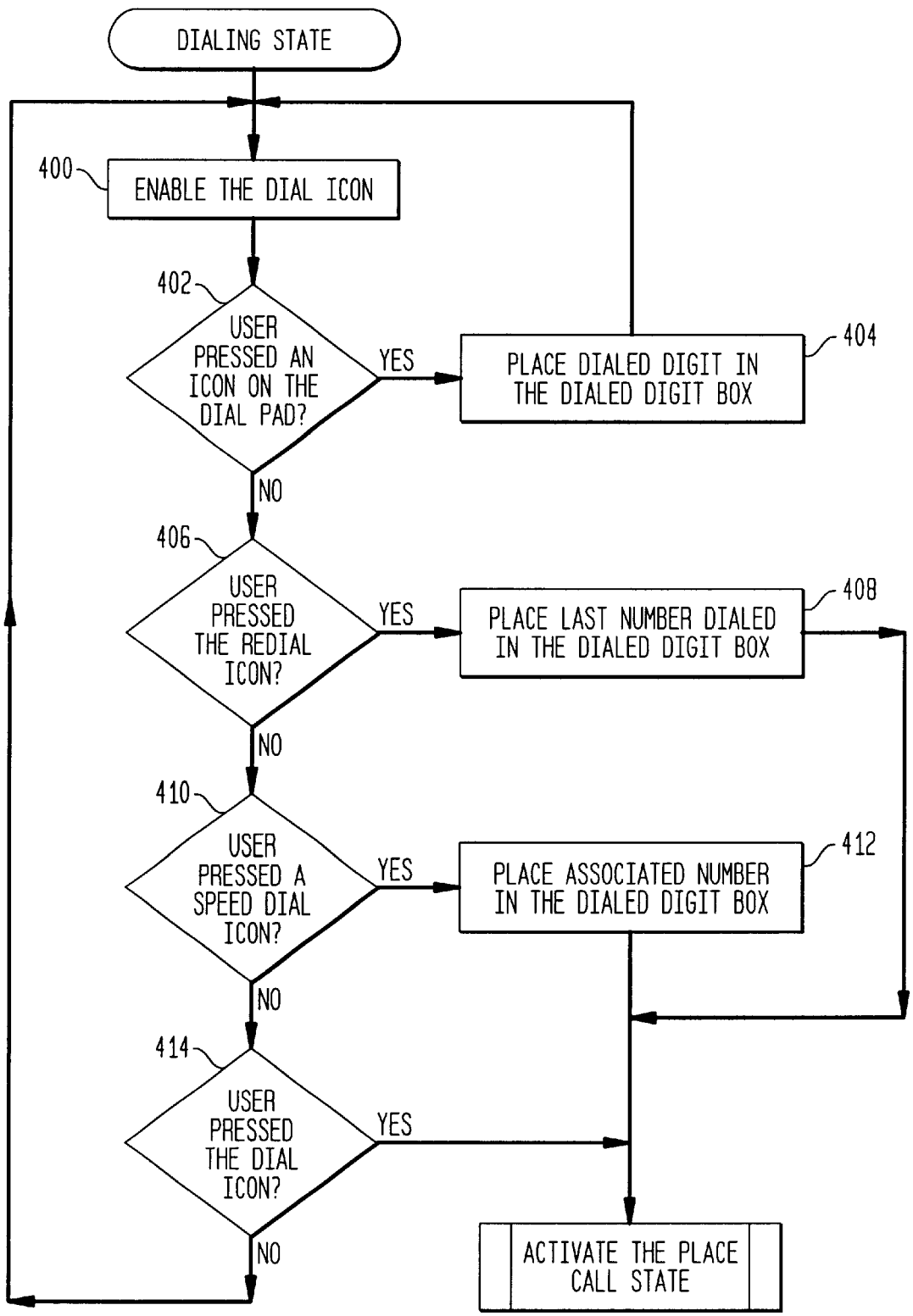
FIG. 26 is a flow chart illustrating a dialing state of the video telephone according to one embodiment of the present invention.

FIG. 26 illustrates the dialing state of the video telephone according to one embodiment of the present invention. The dial icon is enabled in step 400 and the controller determines whether the user pressed an icon on the dial pad in step 402. If the user pressed an icon on the dial pad, the dialed digit is placed in the dialed digit box in step 404 and the system returns the to the dialing state. If the user did not press an icon on the dial pad, then the controller determines whether the user pressed the redial icon in step 406. If the user pressed the redial icon, the last number dialed on the video telephone is placed in the dialed digit box in step 408 and the controller activates the place call state which will be described below with reference to FIG. 27.

If the user did not press the redial icon, the controller determines whether the user pressed the speed dial icon in step 410. If the user pressed the speed dial icon, the number associated with the speed dial selected is placed in the dialed digit box in step 412. The controller then activates the place call state. If the user did not press the speed dial icon, the controller determines whether the user pressed the dial icon in step 414. If the user pressed the dial icon, then the controller activates the place call state. If the user did not press the dial icon, then the controller returns the system to step 400.

Figure 27:
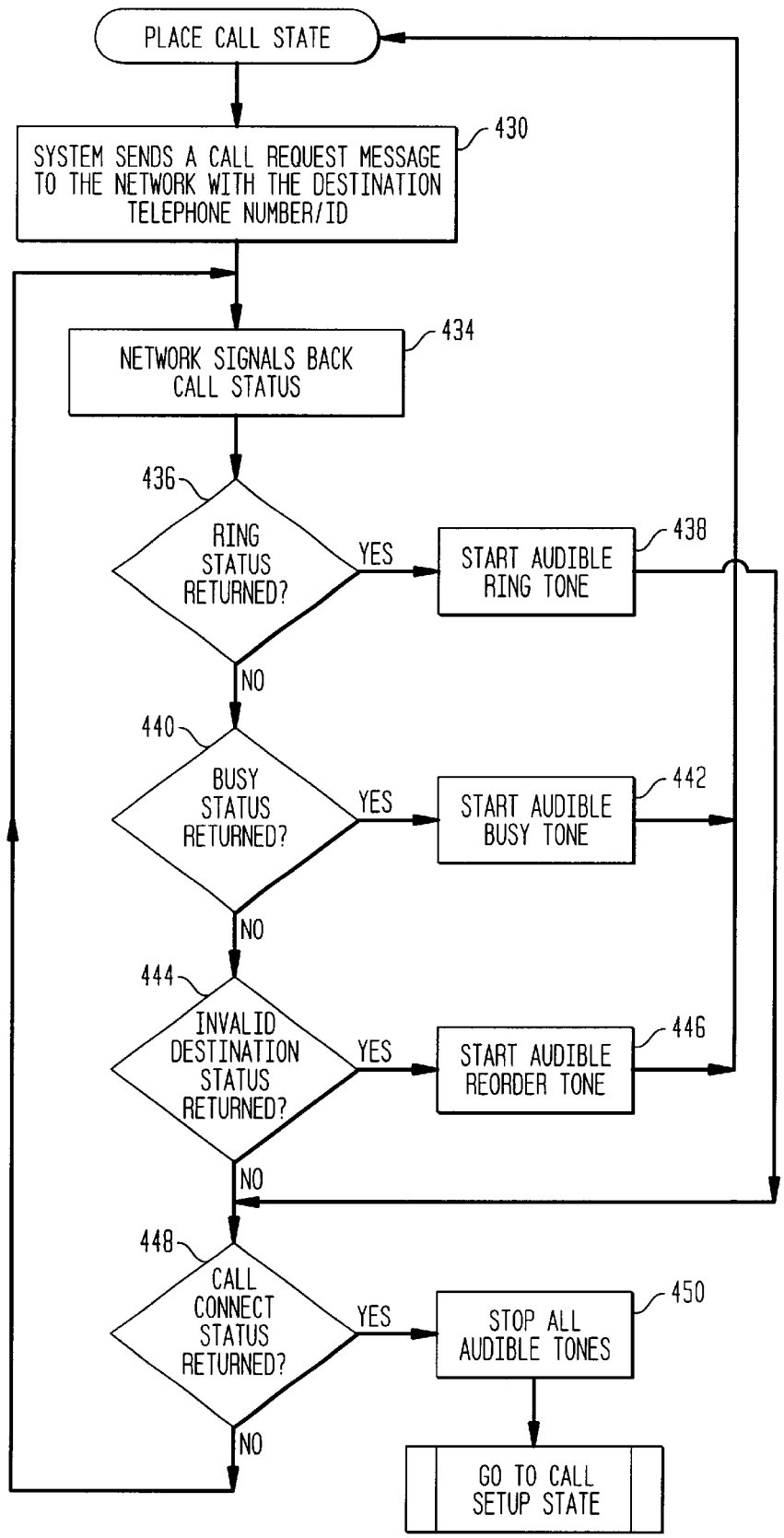
FIG. 27 is a flow chart illustrating a place call state of the video telephone according to one embodiment of the present invention.

FIG. 27 illustrates the place call state according to one embodiment of the present invention. In the place call state, the system sends a call request message to the network with the destination telephone number in step 430. The network then signals back the call status in step 434. If it is determined in step 436 that a ring status has been returned, then the controller starts an audible ring tone in step 438. The controller then sends the system to step 448. However, if a ring status has not been returned, the controller checks to see if a busy status has returned in step 440. If a busy status has been returned, the controller starts an audible busy tone in step 442 and returns the system to the place call state. If it is determined that an invalid destination status has returned in step 444, then the controller starts an audible reorder tone in step 446 and returns the system to the place call state. If the system receives a call connect status in step 448, then all audible tones are stopped in step 450 and the system goes to the call setup state.

Figure 28:
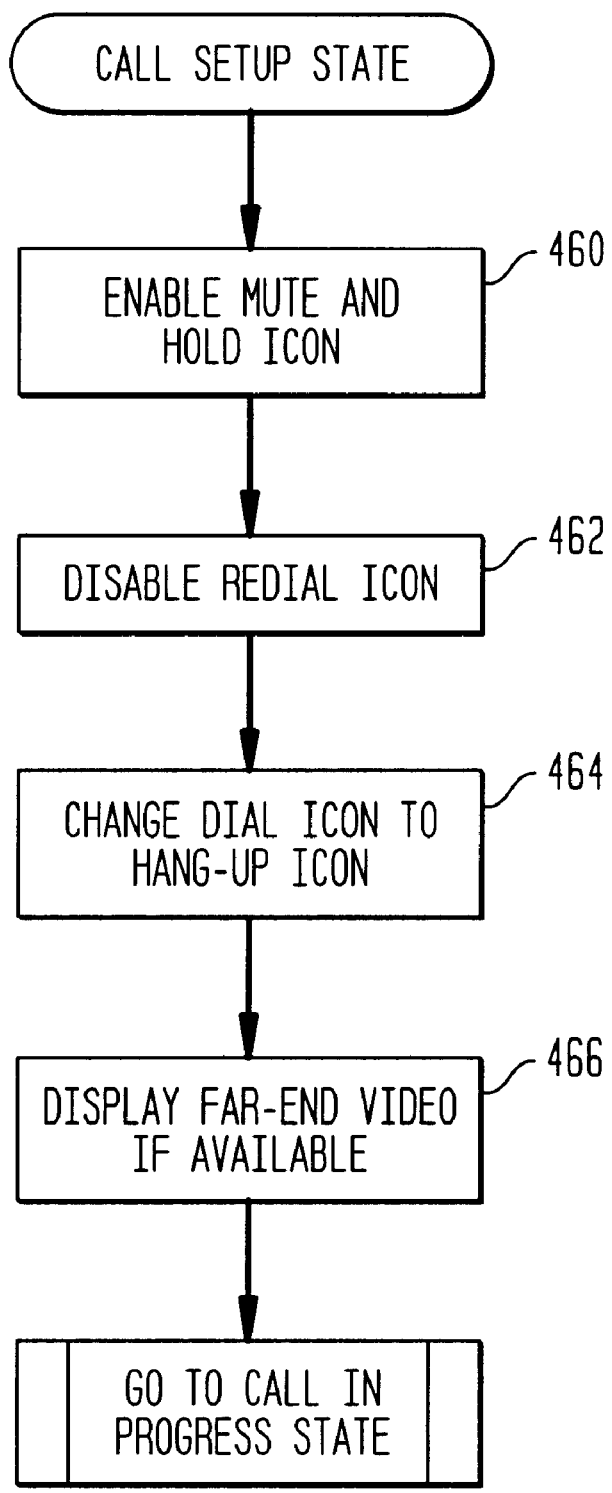
FIG. 28 is a flow chart illustrating a call set up state of the video telephone according to one embodiment of the present invention.

FIG. 28 illustrates the call setup state according to one embodiment of the present invention. In the call setup state, the controller enables the mute and hold icons in step 460 and disables the redial icon in step 462. In addition, the dial icon is changed to a hang up icon in step 464 and the touch-sensitive screen displays far end video if it is available in step 466. The system then proceeds to the call in progress state.

Figure 29A:
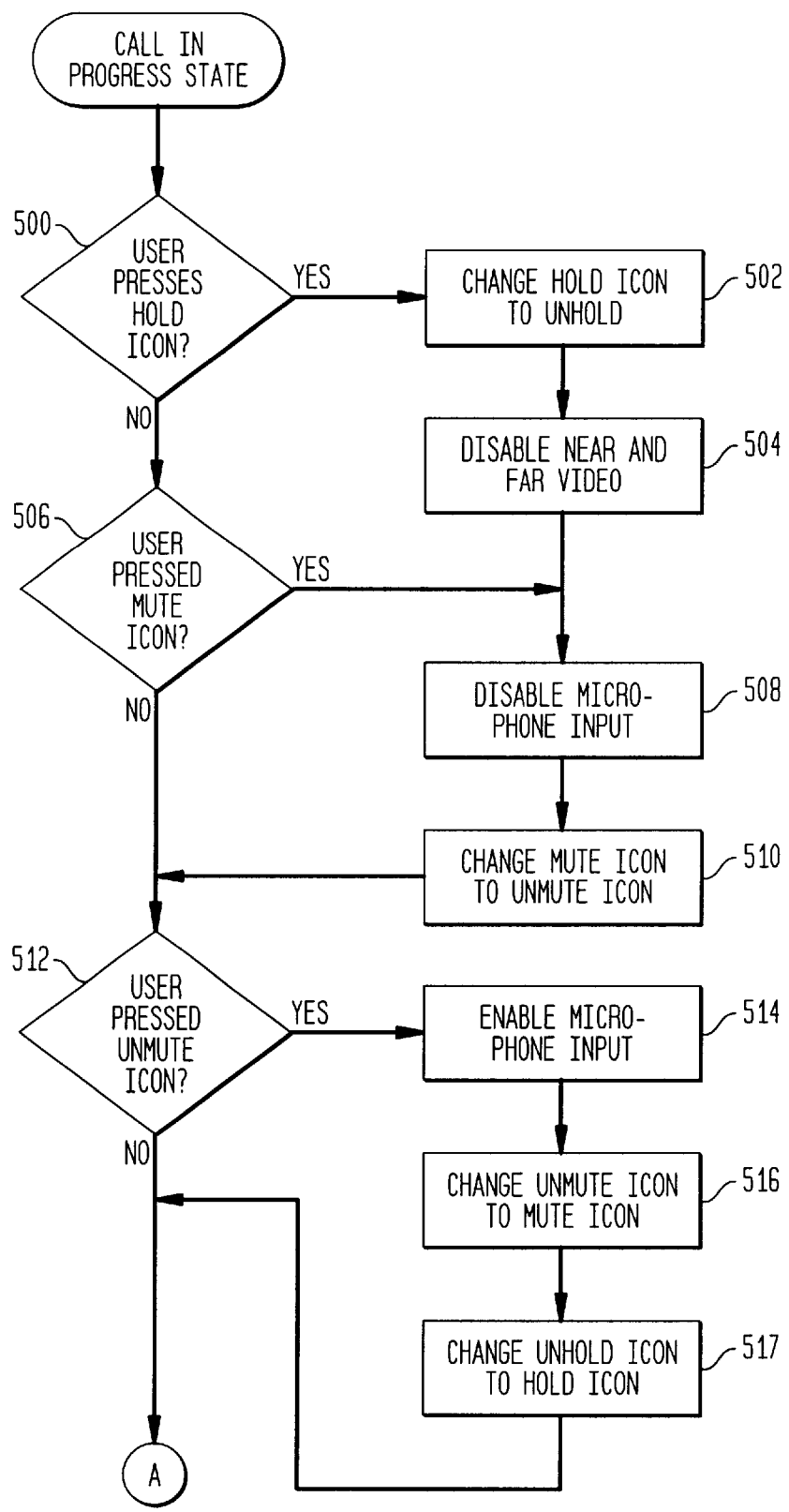
FIGS. 29A and 29B are flow charts illustrating a call in progress state of the video telephone according to one embodiment of the present invention.
Figure 29B:
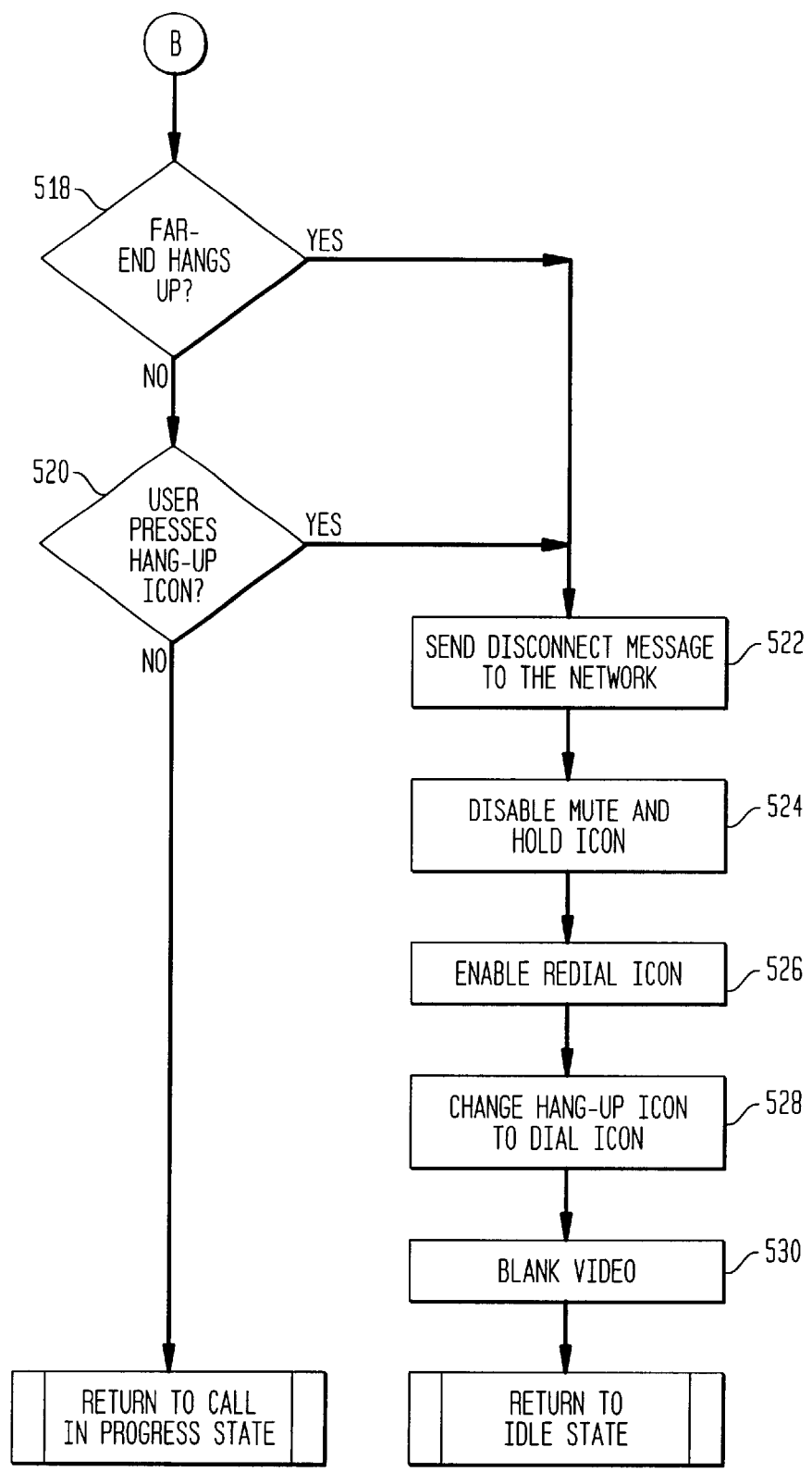

FIGS. 29A and 29B illustrate the call-in-progress state according to one embodiment of the present invention. In the call-in-progress state, the controller determines whether user has pressed the hold icon in step 500. If the user pressed the hold icon, the controller changes the hold icon to an unhold icon in step 502 and disables the near and far video in step 504. The controller also disables the microphone input in step 508 and changes the mute icon to an unmute icon in step 510 and sends the system to step 512.

If the user has not pressed the hold icon, the controller determines whether the user has pressed the mute icon in step 506. If the user pressed the mute icon, the controller disables the microphone input in step 508 and changes the mute icon to an unmute icon in step 510 and sends the system to step 512.

If the user has not pressed the mute icon, the controller determines whether the user has pressed the unmute icon in step 512. If the user has pressed the unmute icon, the controller enables the microphone input in step 514 and changes the unmute icon to the mute icon in step 516 and the unhold icon is changed to the hold icon in step 517. The controller then determines whether or not the far end user has hung up in step 518 or whether the user pressed the hang up icon in step 520. If either answer is yes, then the controller sends a disconnect message to the network in step 522. In addition, the mute and hold icons are disabled in step 524, the redial icon is enabled in step 526 and the hang up icon is changed to the dial icon in step 528. Finally, the video section of the screen goes blank in step 530. The system then returns to the idle state. However, if the controller determines that the far end user has not hung up and the user has not pressed the hang up icon, the system returns to the beginning of the call-in-progress state.

Figure 30:
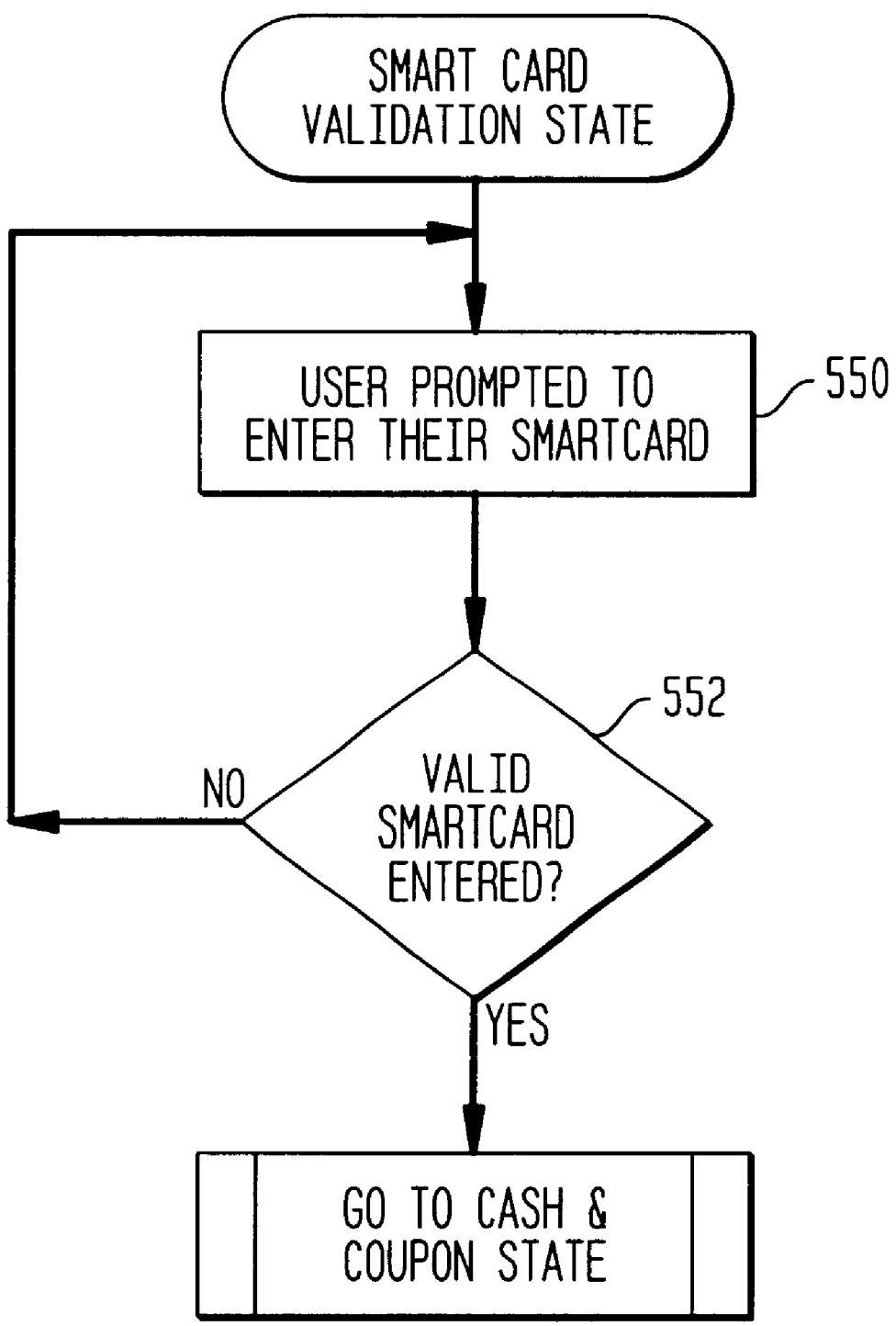
FIG. 30 is a flow chart illustrating a smart card validation state of the video telephone according to one embodiment of the present invention.
Figure 31:
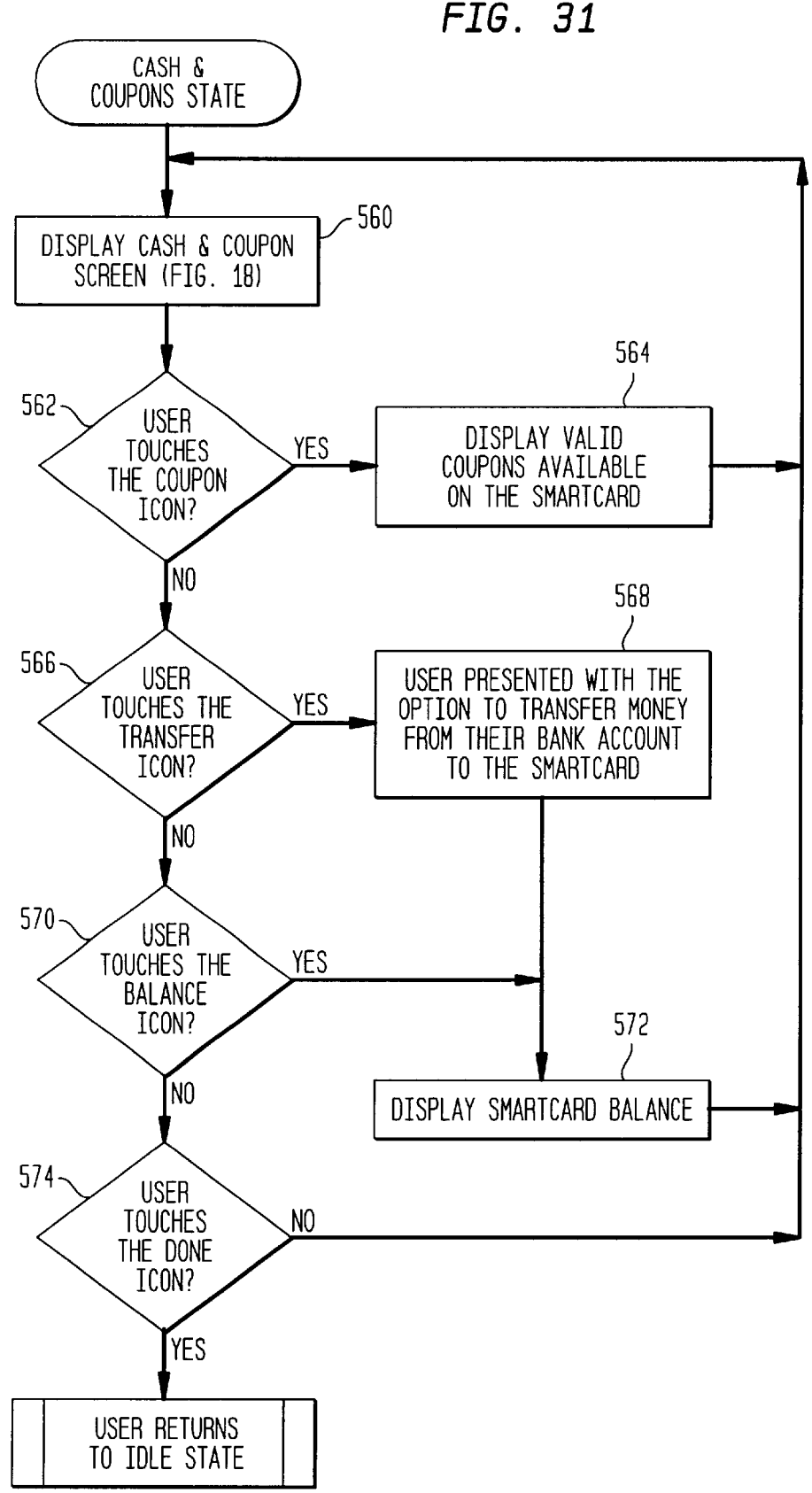
FIG. 31 is a flow chart illustrating a cash and coupon state of the video telephone according to one embodiment of the present invention.

FIG. 30 illustrates the smart card validation state according to one embodiment of the present invention. In the smart card validation state the user is prompted to enter their smart card into the smart card slot 147 in step 550. The controller then determines whether the smart card is valid in step 552. If the smart card is valid, the system goes to the cash and coupon state illustrated in FIG. 31.

Figure 18:
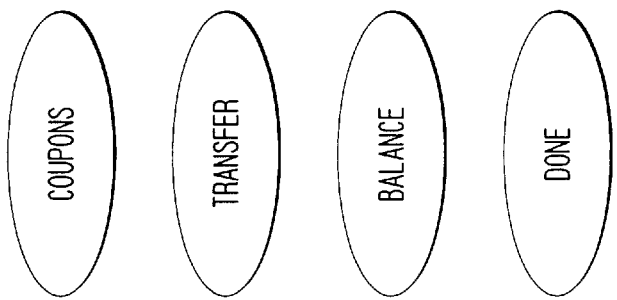
FIG. 18 illustrates a cash and coupon services screen according to one embodiment of the present invention.
Figure 19:
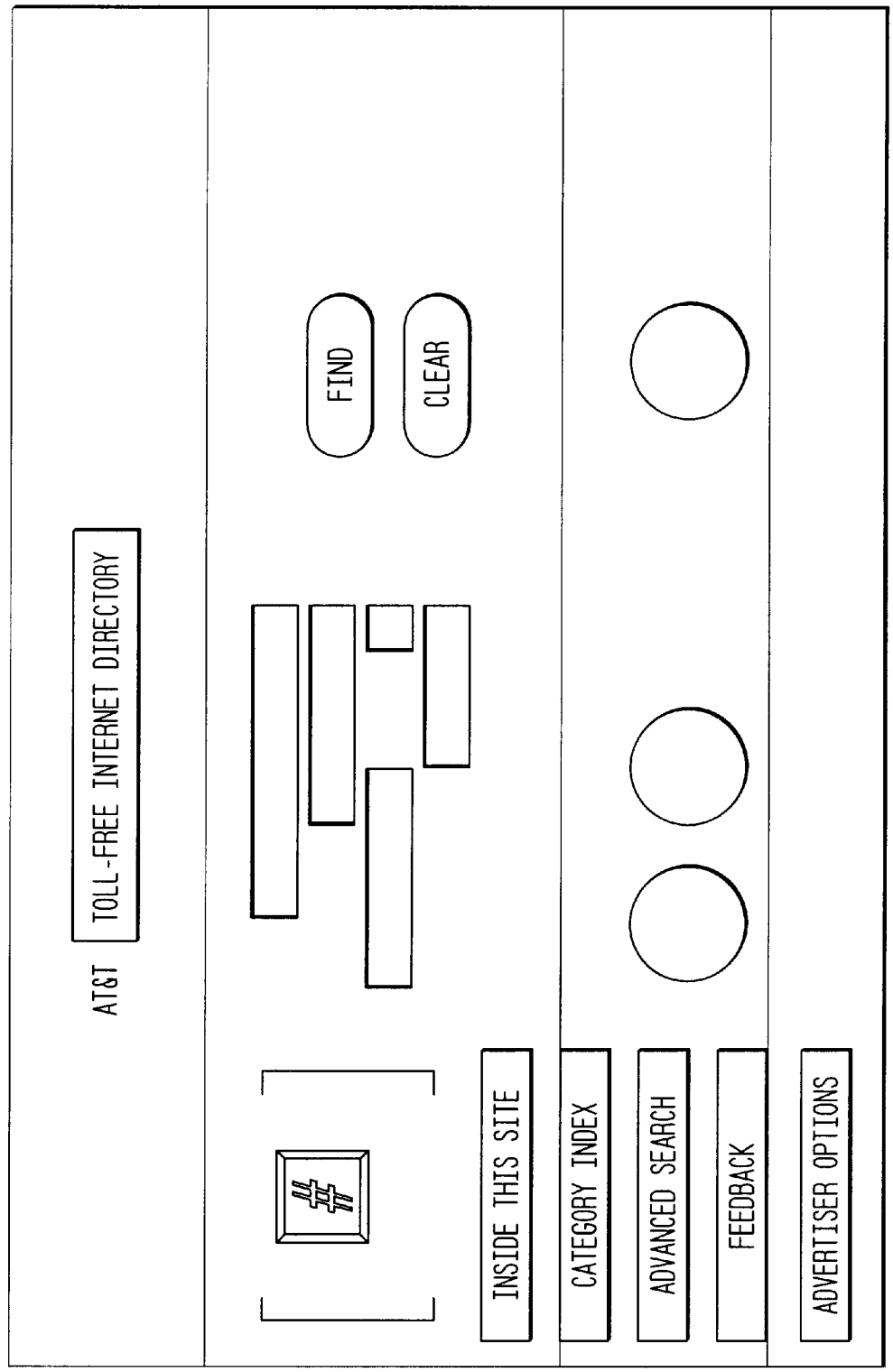
FIG. 19 illustrates an Internet access screen according to one embodiment of the present invention.

In the cash and coupon state, the cash and coupon display screen, as illustrated in FIG. 18, is displayed in step 560. The controller then determines whether the user has touched the coupon icon in step 562. If the user has touched the coupon icon, the touch-sensitive screen displays valid coupons available on the smart card in step 564, and the system returns to the beginning of the cash & coupon state. If the user has not touched the coupon icon, the controller determines whether the user touched the transfer icon in step 566. If the user touched the transfer icon, the controller presents the user with the option to transfer money from their bank account to their smart card in step 568. The touch-sensitive screen then displays the smart card balance in step 572, and the system returns to the beginning of the cash & coupon state. If the user has not touched the transfer icon, the controller determines whether the user touched the balance icon in step 570. If the user has touched the balance icon, the touch-sensitive screen displays the smart card balance in step 572, and the system returns to the beginning of the cash & coupon state. If it is determined that the user touched the done icon, in step 574, the system returns to the idle state, if not, then the system returns to the beginning of the cash & coupon state.

Figure 32:
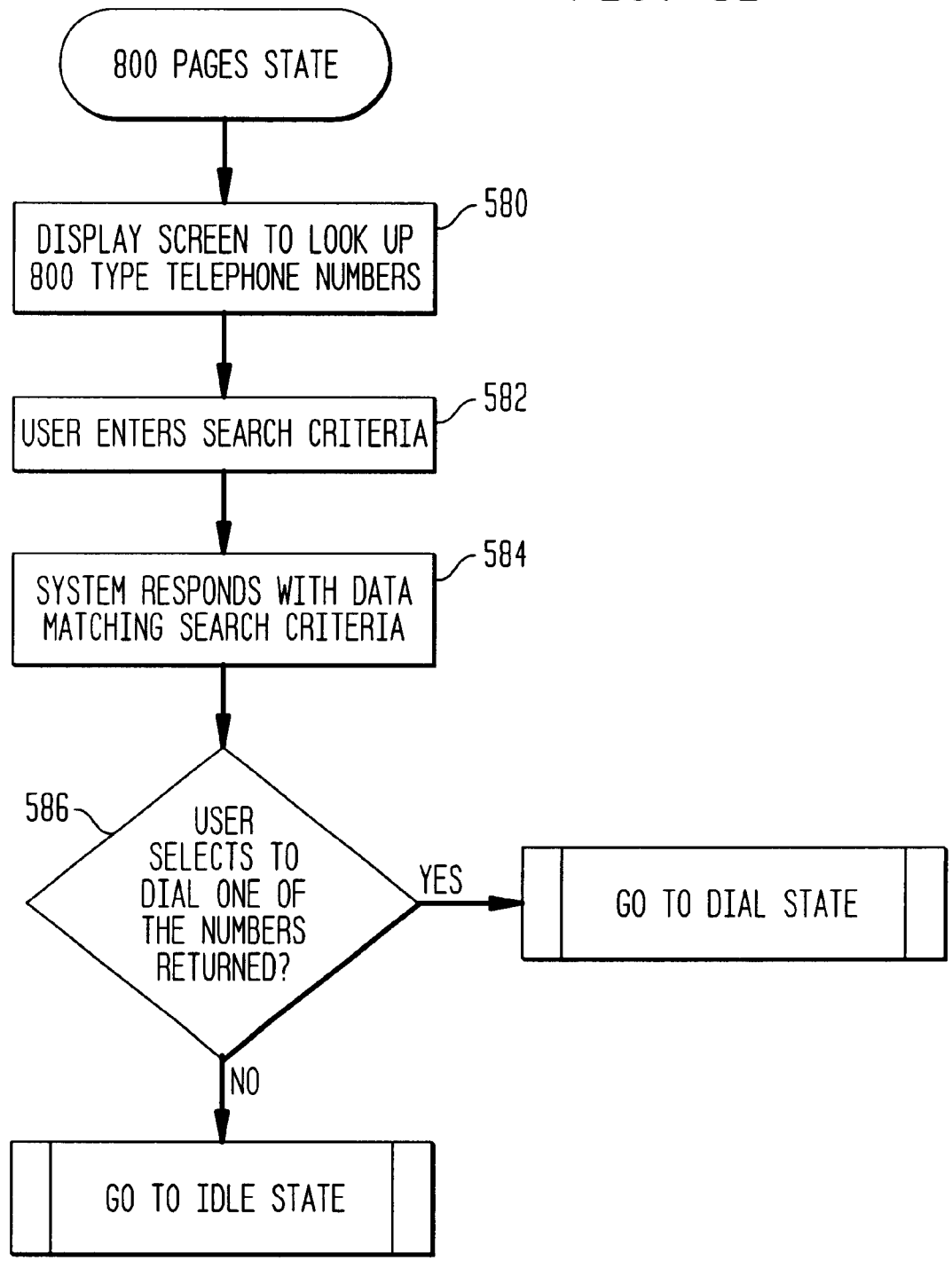
FIG. 32 is a flow chart illustrating an 800 pages state of the video telephone according to one embodiment of the present invention.

If it is determined that the user has touched the 800 pages icon, the system enters the 800 pages state illustrated in FIG. 32. The touch-sensitive screen displays the 800 pages display screen so as to enable the user to look up 800 type telephone numbers in step 580. The user then enters search criteria in step 582 and the controller responds with data matching the search criteria in step 584. The controller then determines in step 586 whether the user wants to dial one of the numbers returned. If the user selects one of the number returned, the system goes to the dial state. However, if the user does not select a number, the system goes back to the idle state.

Figure 33:
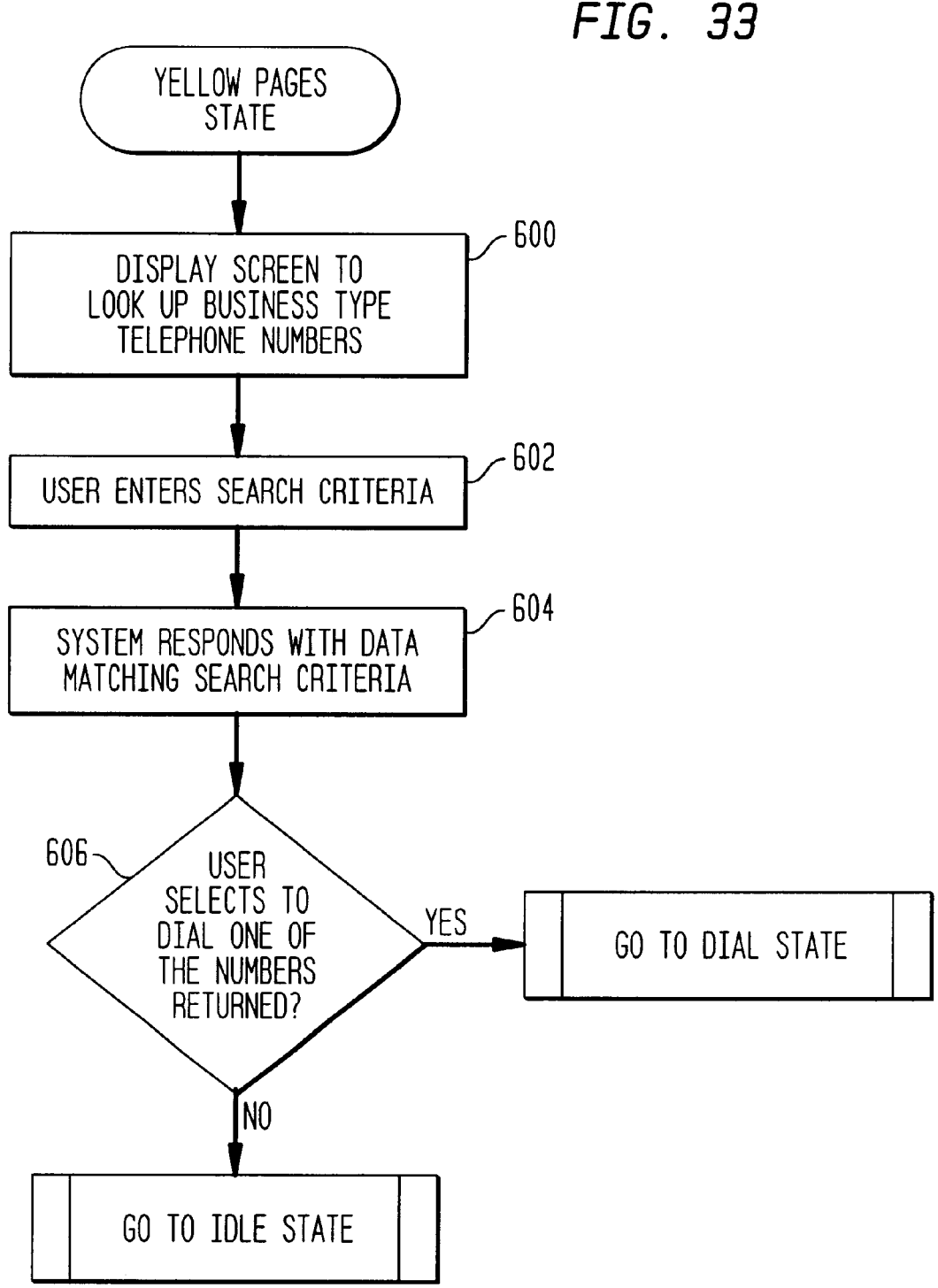
FIG. 33 is a flow chart illustrating a yellow pages state of the video telephone according to one embodiment of the present invention.

If it has been determined that the user has selected the yellow pages icon, the system goes to the yellow pages state illustrated in FIG. 33. In step 600, the touch-sensitive screen displays a display screen which allows the user to enter search criteria in step 602 to look up business type telephone numbers. The controller responds with data matching the search criteria in step 604. The controller then determines whether the user has selected to dial one of the numbers returned in step 606. If the user has selected to dial one of the numbers, the system goes to the dial state. However, if the user has not selected to dial a number, the system returns to the idle state.

Figure 34:
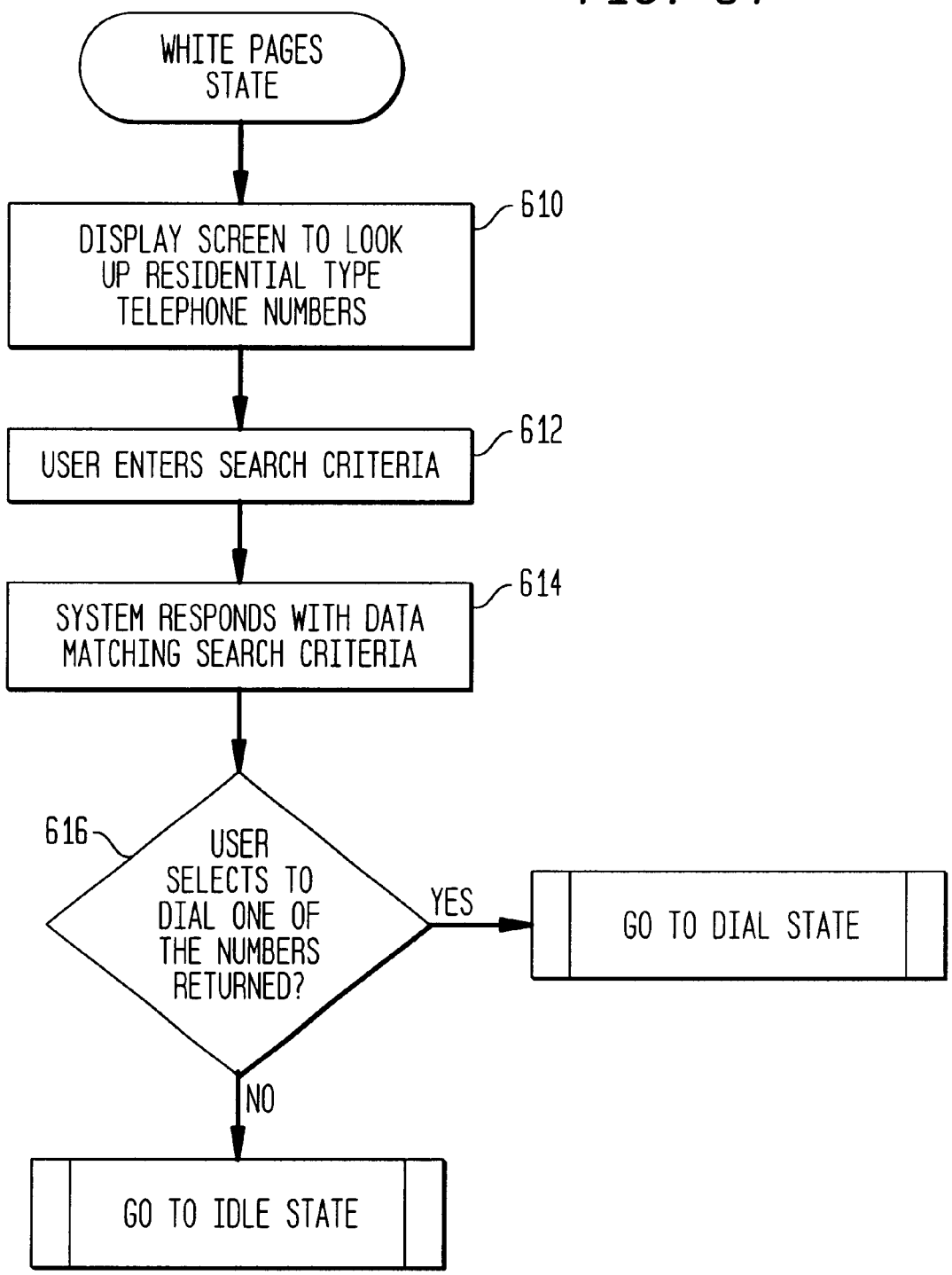
FIG. 34 is a flow chart illustrating a white pages state of the video telephone according to one embodiment of the present invention.

It has been determined that the user has selected the white pages icon, the system goes to the white pages state as illustrated in FIG. 34. In this state, the touch-sensitive screen displays a display screen which allows the user to enter search criteria to look up residential type telephone numbers in steps 610 and 612, respectively. The controller then responds with data matching search criteria in step 614. The controller then determines whether the user has selected to dial one of the numbers returned in step 616. If the user has selected to dial one of the numbers, the system goes to the dial state. However, if the user has not selected to dial one of the numbers, the system returns to the idle state.

Figure 42:
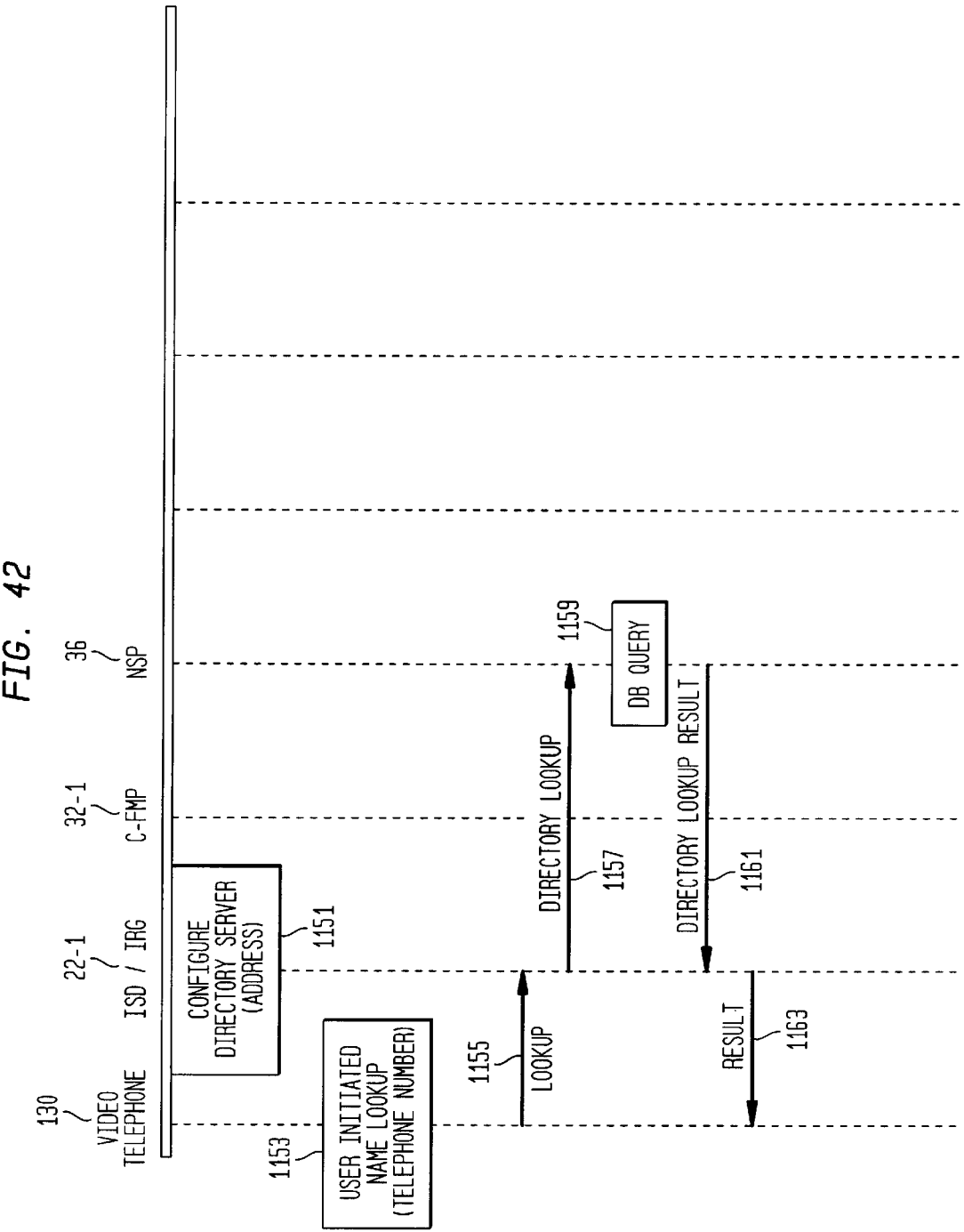
FIG. 42 is a service process flow diagram for showing how the NSP in concert with an ISD/IRG at a user's home and via a C-FMP serving that user provides white and yellow pages directory services including home shopping and dialing services.

FIG. 42 illustrates directory services according to one embodiment of the present invention. Referring now to FIG. 42, there is shown a further example of service connectivity by an NSP 36. In the application shown in FIG. 42, any user may directly access white (residential) or yellow pages (commercial) directory services at required bandwidth (bit rate) without having to connect via a local exchange carrier (LEC). Components of the system and service architecture are shown at the top including a video telephone 130, ISD/IRG 22, 22-1, C-FMP 32-1 and NSP 36.

As already described, bandwidth to the home or premises of a business may vary but typically may be in excess of 1 megahertz according to bandwidth allocation procedures followed by the ISD/IRG 22, 22-1 and C-FMP 32-1. Thus, there is a great advantage in a user having access to the directory services feature shown in FIG. 42 because 1) the user has greater bandwidth availability and 2) the user may immediately access directory services, for example, via NSP 36 bypassing the LEC and 3) additional services and connections may be provided via the NSP 36 (also bypassing the LEC) for home shopping, banking, obtaining directions to a destination and the like as will be further discussed below.

Initially, the OAM&P server of the NSP 36 provisions the directory service availability by signaling and provisioning the C-FMP 32-1 with its address, routing and other data the C-FMP 32-1 needs. The NSP 36 has already been described as comprising a large database of data that may provide according to the present application at least local directory (both telephony and Internet) address/directory number services. Moreover, the NSP 36 comprises significant caching memory and access to remote NSP's and other directory databases from which it may obtain further directory data.

Initial step 1151 of the service process flow diagram of FIG. 42 is directed to configuring the C-FMP 32-1 to configure the ISD/IRG 22, 22-1 serving the user of the video telephone 130 for directory service routing to NSP 36. As a result, the C-FMP 32-1 updates its internal routing table of its memory with provisioned routing data for routing to NSP 36 and for providing service via ISD/IRG 22, 22-1 to a particular user of video telephone 130.

Now, in step 1153, it may be assumed that a user has turned on their video telephone 130 and wants to establish a directory session. As already described, one of the services that may be offered the user as a menu display option is directory service connectivity. The user clicks on or otherwise inputs their selection of directory service connectivity. The message forwarded as a result of the directory service can be the name, address or other indicia to be looked up. Also, a second column of the display may provide the desired output which may be directory number or Internet address but may also comprise, for example, directions for driving to a store nearest the user. The video telephone 130 sends a lookup message with one or more of these requests to the ISD/IRG 22, 22-1 at step 1155. The ISD/IRG 22, 22-1 in turn obtains immediate access via the already provisioned C-FMP 32-1 at step 1157 to the NSP 36 where the local directory is located. The NSP 36 now acts as an information database service provider and performs steps 1159. The NSP 36 looks up the user's requested data and determines if it can provide the requested information itself. If NSP 36 cannot provide the requested data look-up itself, it determines routing for a database having the requested information, collects the information and stores the information in cache memory for forwarding to the user along with any locally provided database information requested. Step 1161 suggests the return of the directory lookup result to the ISD/IRG 22, 22-1 for presentation to the user. Depending on the video telephone, for example, the video telephone 130, the ISD/IRG 22, 22-1 causes the result to be displayed at step 1163. Along with the result, the display may provide immediate dialing opportunity for a telephony directory number or immediate access to an Internet addressed web site.

For example, the user may wish to obtain a white pages listing for Tom Jones. The user may not know the city. The NSP 36 may provide a directory service that identifies all individuals named Tom Jones in a geographical area such as the state of New York for possible review and selection. The user may continue to provide information until the selection process is narrowed to the Tom Jones that the user wishes to locate. Once the result of the search is narrowed sufficiently to where the user may make a choice, the choice may include a hot spot for an immediate connection. Moreover, Tom Jones may be located, not only at home, but at his work phone, cellular phone, pager, personal computer, facsimile machine or other number or web site.

In another application, the user may be trying to locate a drug store nearest them. The user inputs the request. Because the NSP 36 receives data regarding the user's identity, the NSP 36 further has access to a user profile including a home address. Consequently, using appropriate algorithms known in the art, the NSP 36 locates the nearest drug store, the next nearest and so on for the user to chose one. Moreover, the display may provide essential information input by the drug store such as hours of operation. The hours of operation may be used as a filter to eliminate possible drug stores that in fact are not presently open at the user's request. The user may select to call the drug store of their choice and/or obtain directions from their home to the drug store.

In accordance with the directory look-up feature, the user may make repeated requests for the same or additional information. Moreover, once the user receives the directory look-up result, the result may provide hot spots or clicking selection opportunity to directly access the directory look-up result, for example, by telephony or the Internet at the highest bandwidth permissible or desirable. Thus, the directory look-up may be the first step toward home shopping, bank from home and other services. Note that the local exchange carrier is not involved and the bandwidth and data rate for exchange of Internet IP packets may be the maximum bandwidth permissible by the facility between the C-FMP 32-1 and the video telephone 130.

Figure 20:
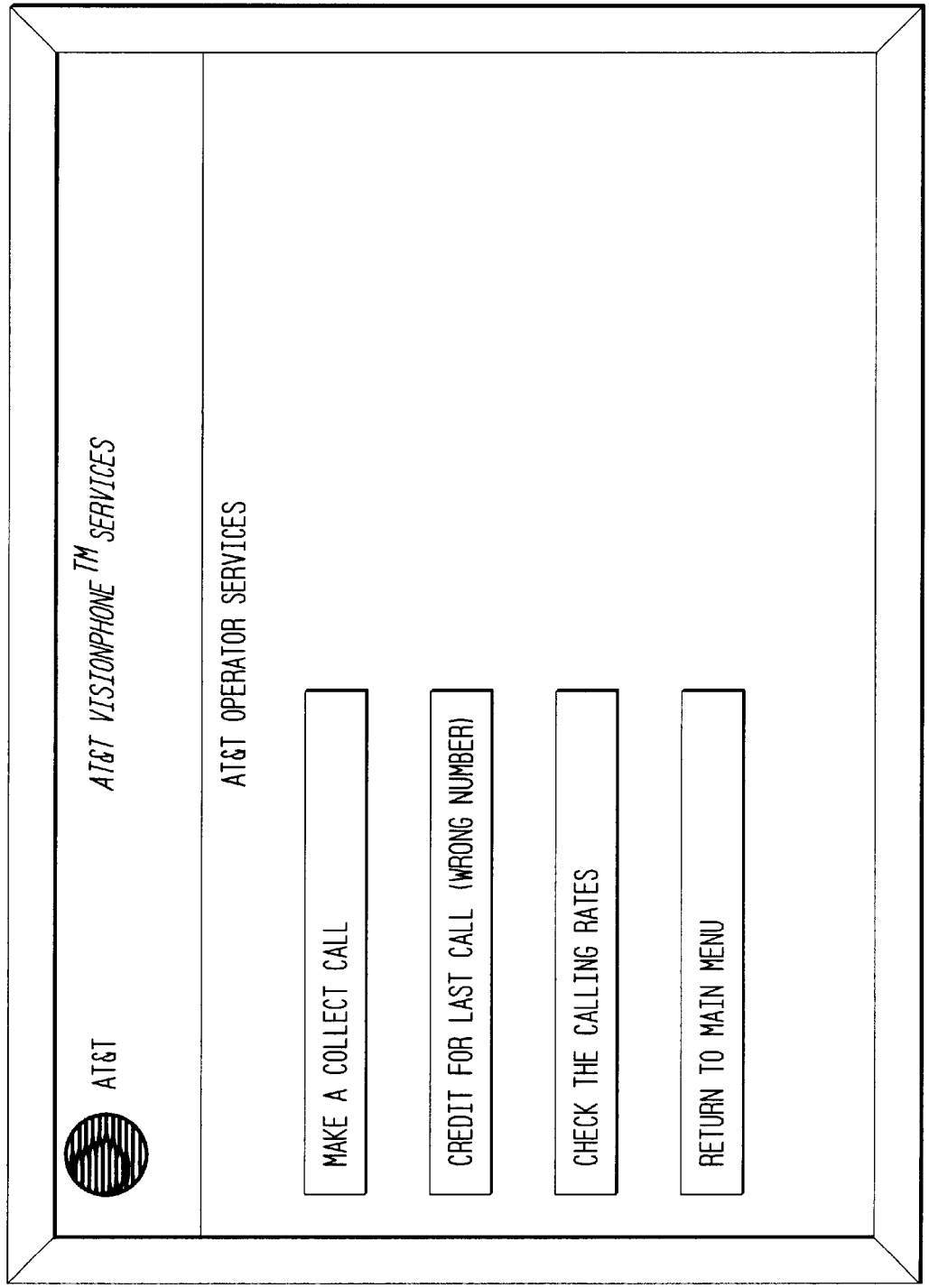
FIG. 20 illustrates an operator services screen according to one embodiment of the present invention.
Figure 35:
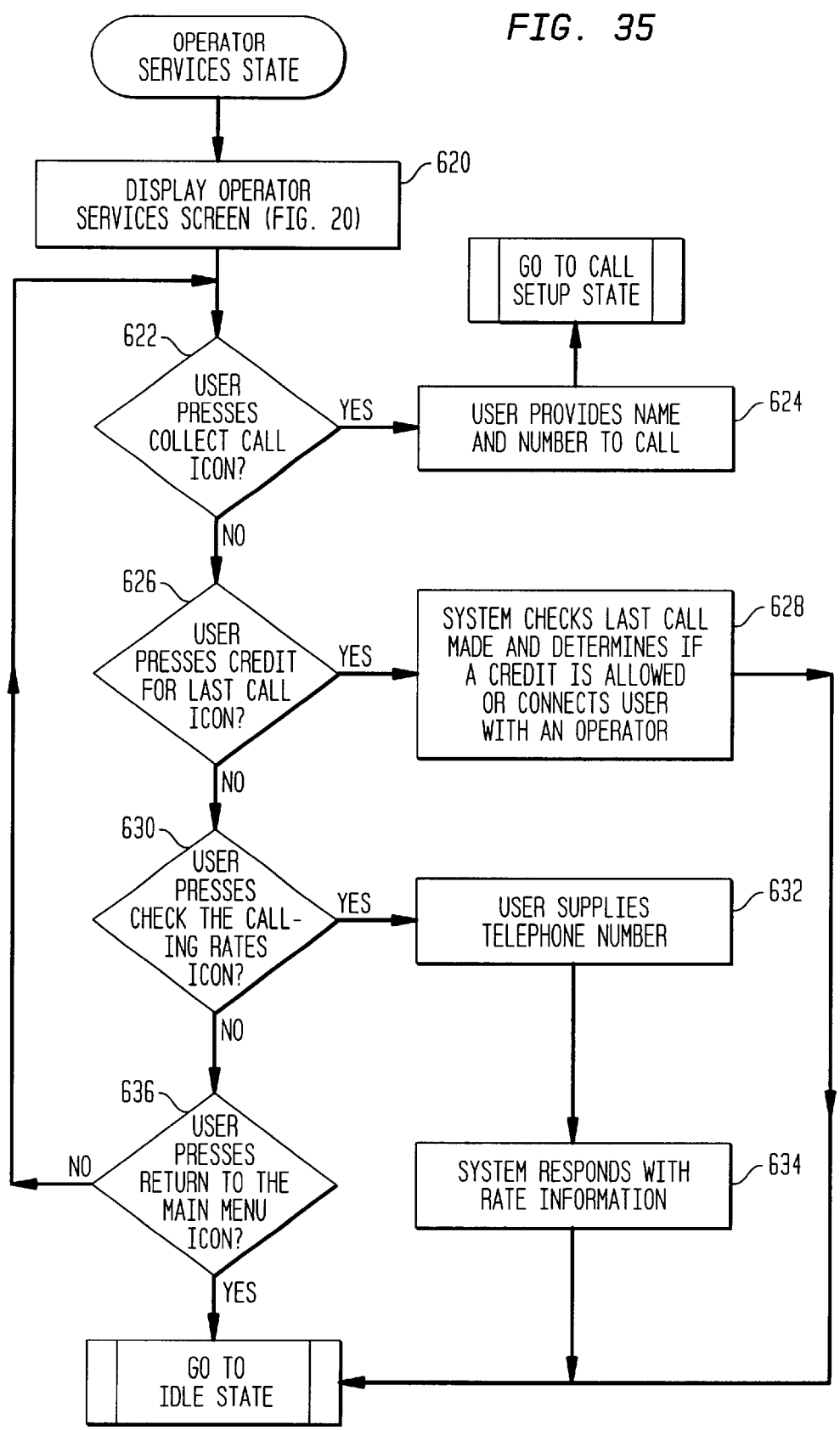
FIG. 35 is a flow chart illustrating an operator services state of the video telephone according to one embodiment of the present invention.

If it is determined that the operator services icon has been selected by the user, the system goes to the operator services state illustrated in FIG. 35. First, the touch-sensitive screen displays the operator services screen in step 620 as illustrated in FIG. 20. The controller then determines whether the user has pressed the collect call icon in step 622. If it is determined that the collect call icon has been pressed, the user provides the name and number to call to the system in step 624 and the system goes to the call setup state.

If the call collect icon has not been pressed, the controller determines whether the user has pressed the credit for last call icon in step 626. If the user has pressed the credit for last call icon, the controller checks the last call made and determines if a credit is allowed or connects the user with an operator in step 628 and, then the system returns to the idle state.

If the credit for last call icon was not selected, the controller checks to see whether the user has pressed the check the calling rates icon in step 630. If the user has selected the check the calling rates icon, the controller prompts the user to enter the telephone number that the user wishes to call in step 632 and the controller responds with rate information in step 634 and, then the system returns to the idle state. If the user does not press the check the calling rate icon, the controller determines whether the user pressed the return to main menu icon in step 636. If the user has not pressed the return to main menu icon, the system stays in the operator services state and returns to step 622. However, if the user has selected the return to main menu icon, the system goes to the idle state.

Figure 21:
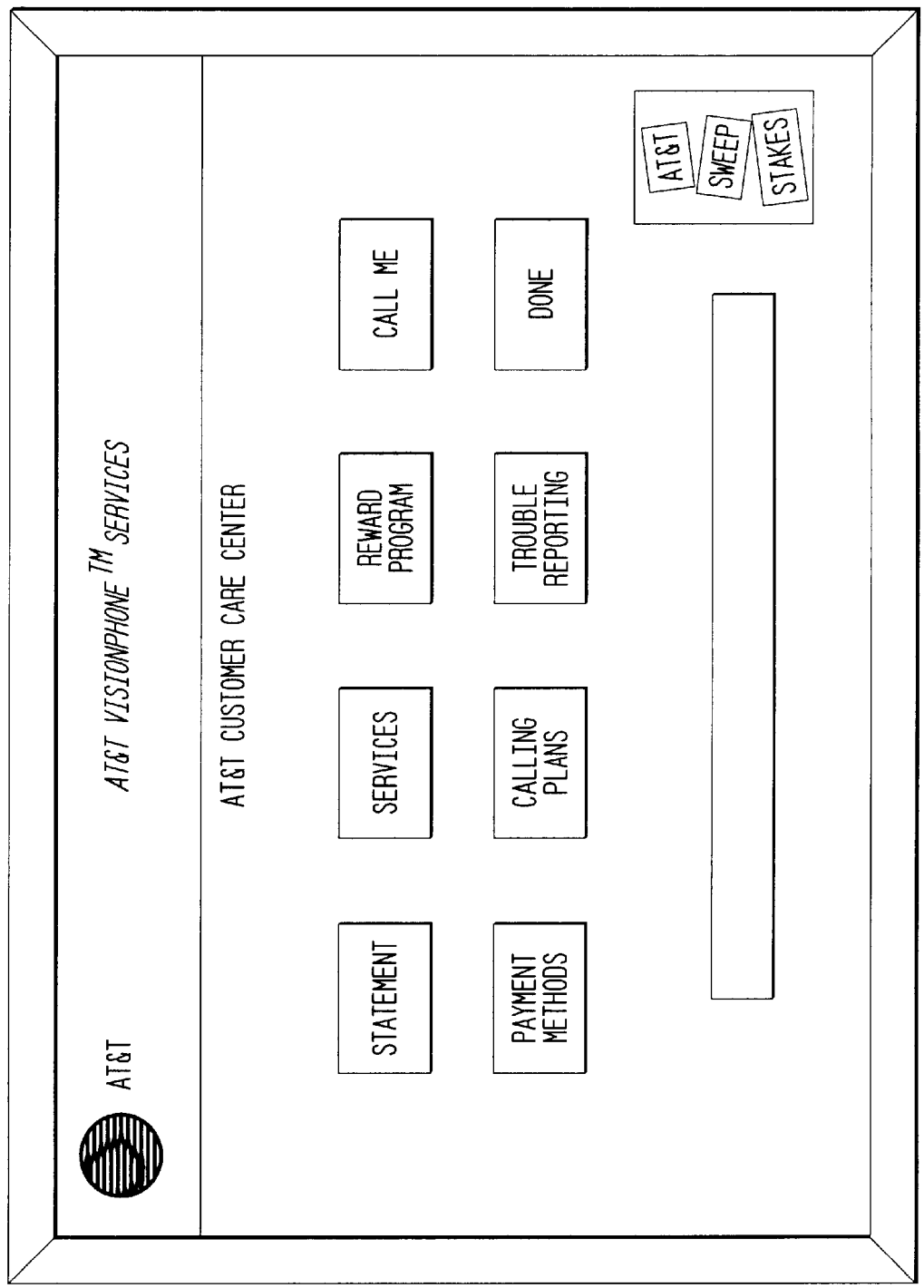
FIG. 21 illustrates a customer care screen according to one embodiment of the present invention.
Figure 36A:
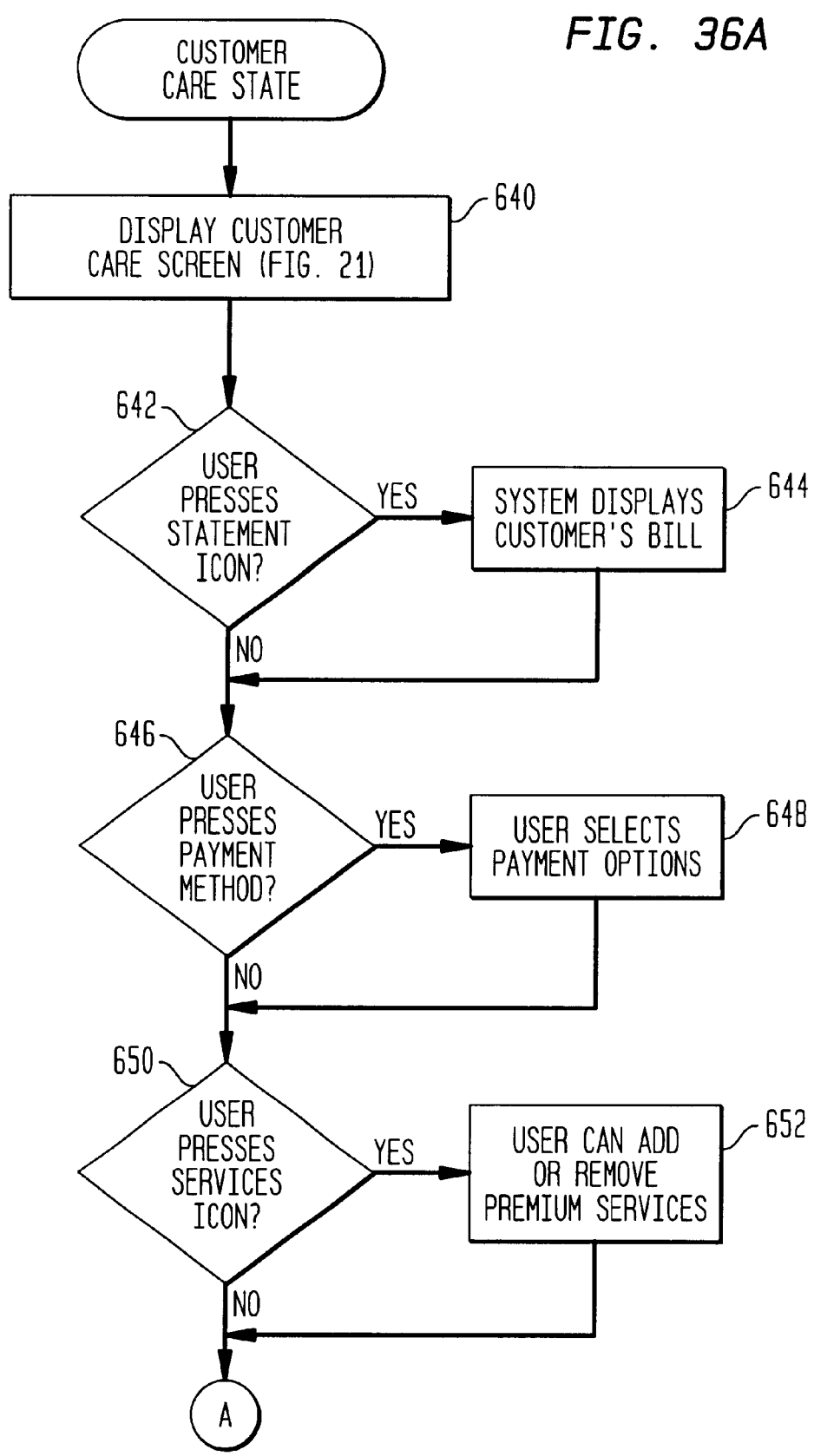
FIGS. 36A and 36B are flow charts illustrating a customer care state of the video telephone according to one embodiment of the present invention.
Figure 36B:
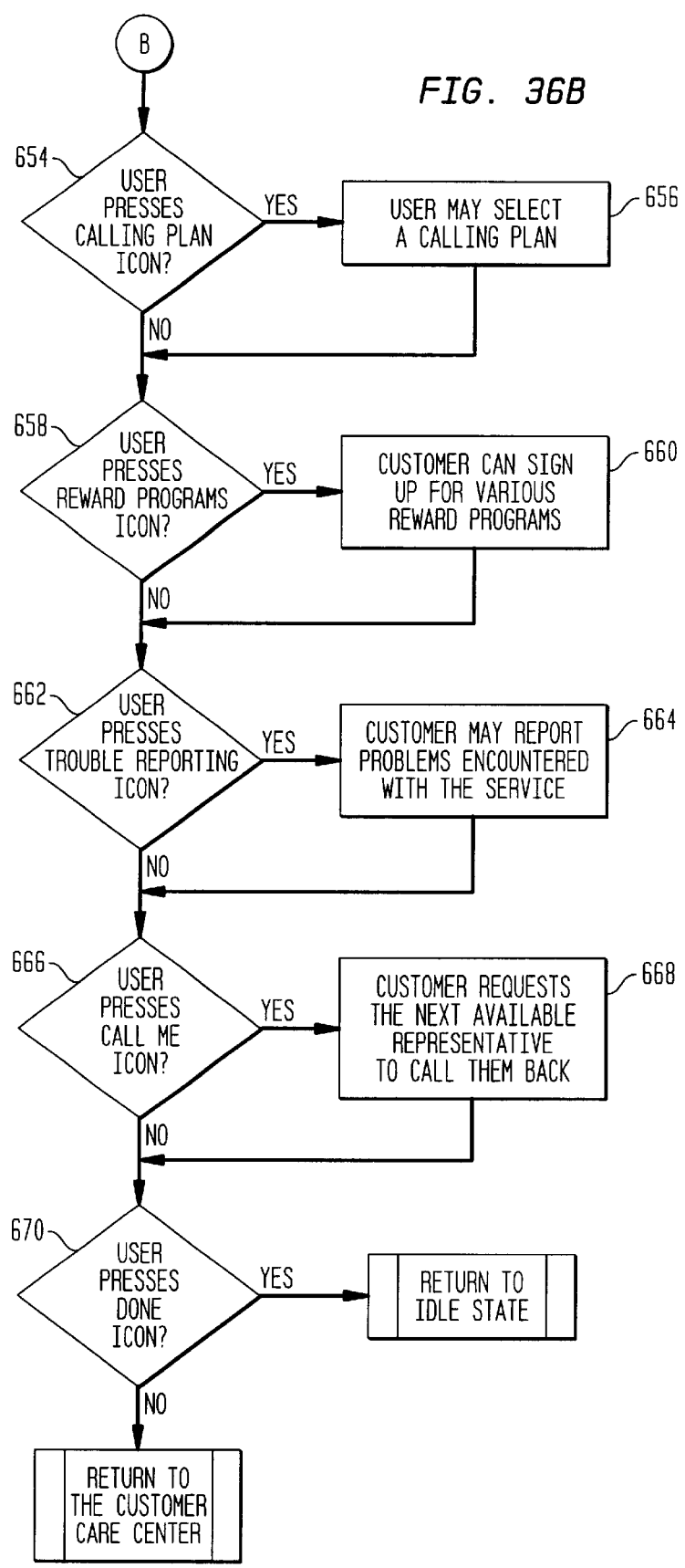
Figure 37:
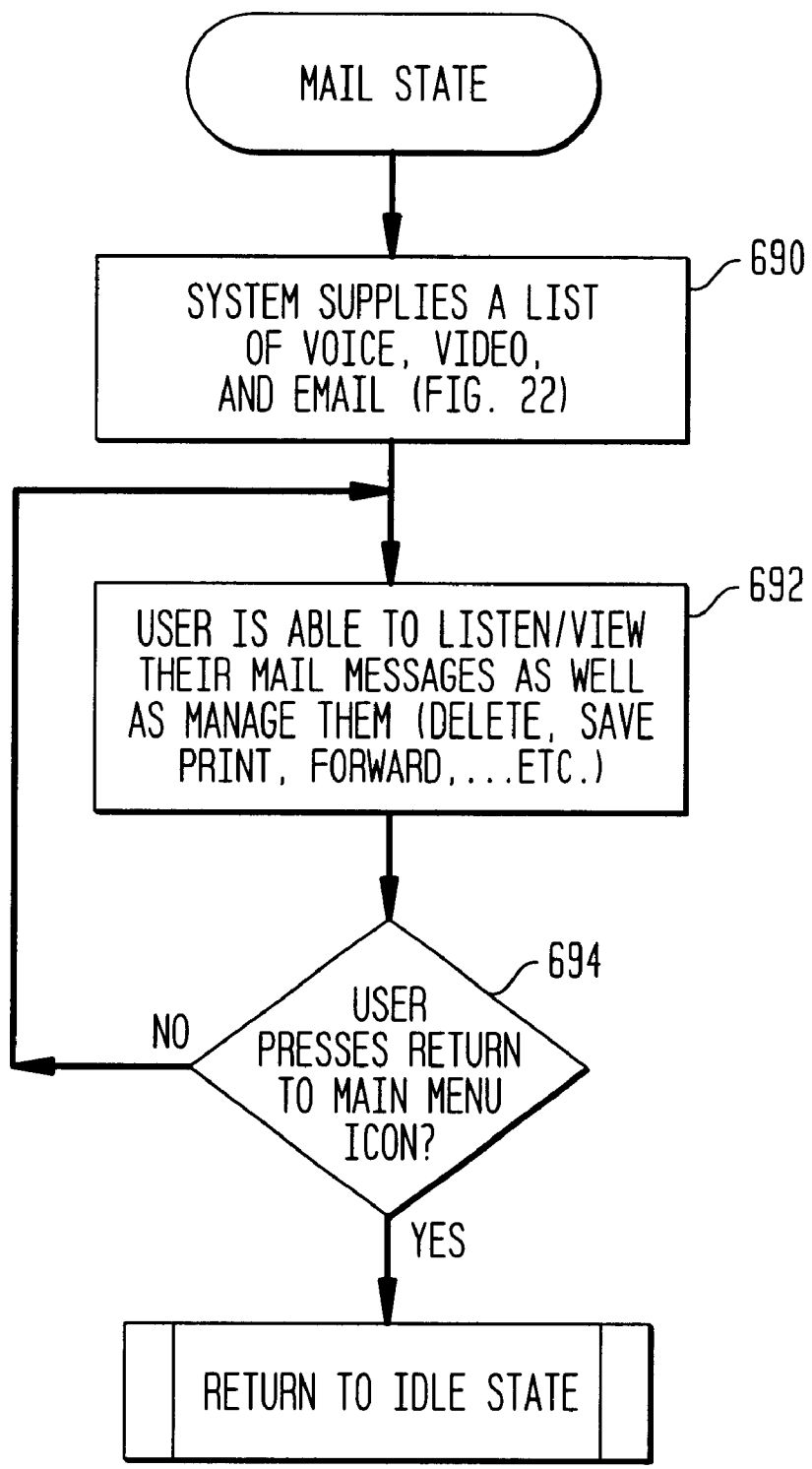
FIG. 37 is a flow chart illustrating a mail state of the video telephone according to one embodiment of the present invention.

If it is determined that the user has selected the customer care icon, the system goes to the customer care state as described in FIGS. 36A and 36B. The touch-sensitive screen first displays the consumer care screen in step 640 as illustrated in FIG. 21. The controller then determines whether the user has pressed the statement icon in step 642. If the user has selected the statement icon, the system displays the customer's bill in step 644.

Figure 43:
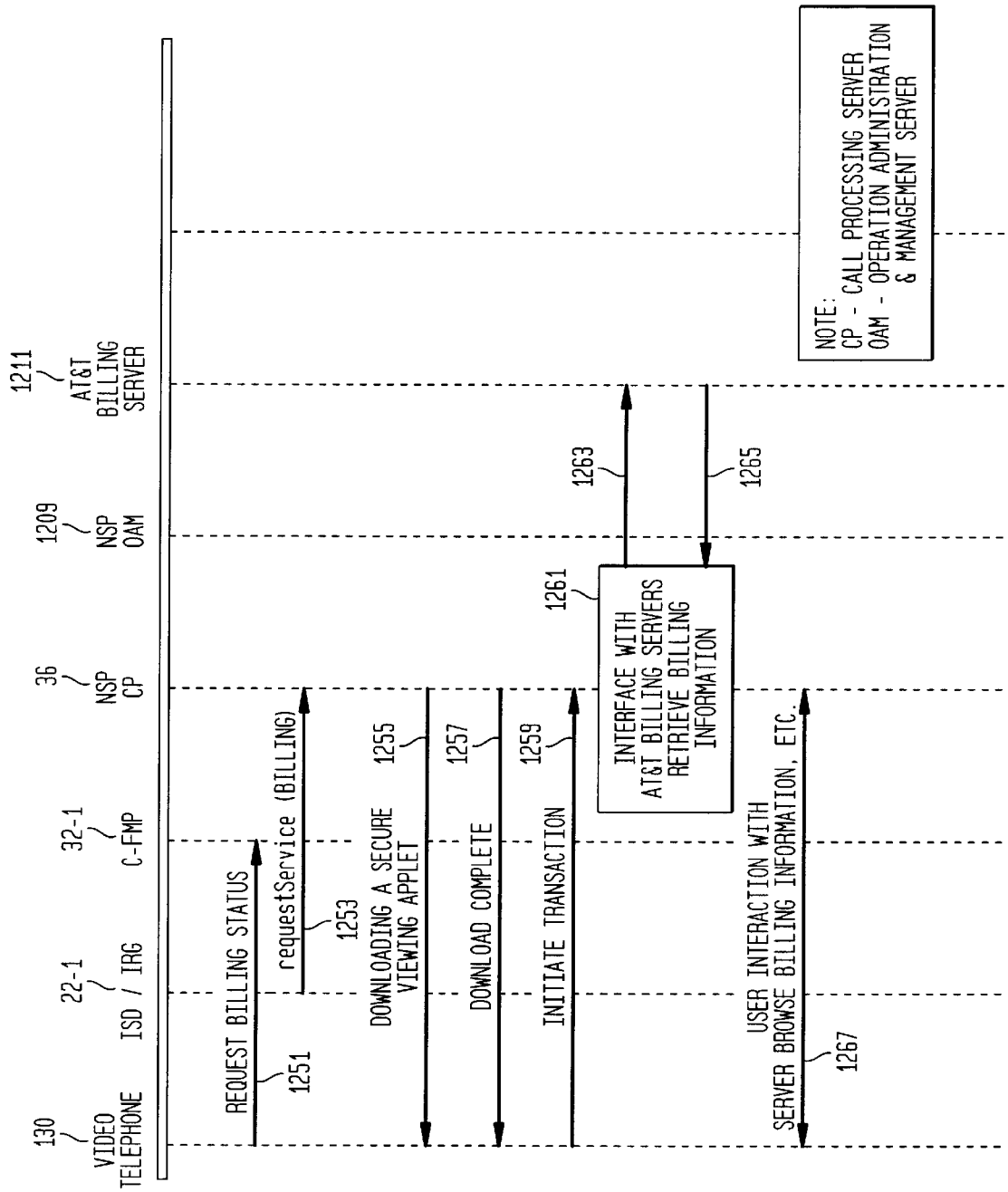
FIG. 43 is a service process flow diagram for showing how the NSP in concert with an ISD/IRG provides a bill viewing and paying service via, for example, a billing server such as an AT&T billing server as one example.

FIG. 43 illustrates a bill viewing service but the present invention is not limited thereto. Referring now to FIG. 43, there is shown a further example of service connectivity by an NSP 36. In the application shown in FIG. 43, any user may directly connect to a billing server that may be one for a utility, a bank, a credit card company or other creditor where an AT&T billing server is shown by way of example without having to connect via a local exchange carrier (LEC). Components of the system and service architecture are shown at the top including video telephone 130, ISD/IRG 22, 22-1, C-FMP 32-1 and NSP call processing server 36. The Operations, Administration, Management and Provisioning server of the NSP is also shown as NSP OAM 1209 but is not otherwise described below. Finally, by way of example, a billing server is shown by way of example, namely an AT&T billing server 1211. One advantage of the present invention is that a billing server may comprise a clearing house for a plurality of bills. For example, an AT&T billing server 1211 may provide a bill viewing and payment opportunity for local phone service, toll phone service, Internet (for example, AT&T WorldNet service), digital audio and video program delivery services and other information and communication services.

As already described, bandwidth to the home or premises of a business may vary but may be in excess of 1 megahertz according to bandwidth allocation procedures followed by the ISD/IRG 22, 22-1 and C-FMP 32-1. Nevertheless, a bill viewing and paying service does not require the maximum bandwidth in either direction of data transmission as, for example, would be required for providing video conferencing. Referring to FIG. 43, the user from their video telephone 130 requests a billing viewing and paying service at step 1251. Typically the user has selected an icon (for bill viewing and paying services) on a display screen by clicking on the icon. The ISD/IRG 22, 22-1 in response transmits a request message for the service to the NSP 36 at step 1253. The message as already described must contain a service identifier, for example, BILLING. The NSP call process server 36 responds to the message by looking to internal algorithms for billing services. In the internal algorithms it may be determined that a secure billing channel is required. As a result of the billing service look-up, then, the NSP CP 36 downloads a secure viewing applet at step 1255 to the video telephone 130. The video telephone then may recognize that security is required for the service and may choose to secure, for example, by encryption or other means any future communications. The NSP 36 and the video telephone 130 must be sure that each other understands the security provisions put in place by each. Each device must know how to decrypt each other's communications by exchange any security keys and the like. Once the download is complete at step 1257, a transaction may be initiated. It may be assumed that communications within the AT&T network are secure, but communications over the local loop or other facility connecting the video telephone 130 with the NSP 36 remote from the PC may not be as secure.

It may be assumed, by way of example, that a user has requested AT&T bill viewing and payment service. The transaction with the AT&T billing server then is initiated at step 1259 by the video telephone 130 signaling the NSP CP 36. The interface with the AT&T billing server 1211 may be by any convenient method to the toll carrier service provider. Again, the channel is secure, within or outside the toll carrier network and may be provided with or without encryption security. At step 1263, the bill is requested and data returned at step 1265 to the NSP 36 which converts the received data as necessary for eventual display or other use by the user. Preferably, at step 1267, the user will be able to interact with the bill viewing service by viewing any portion of the bill the user wants and may communicate and question any billing item of any service provider. Also, the user may arrange to pay the bill by providing, for example, AT&T universal or other credit card information or other payment option such as direct debit from a bank account.

Referring back to FIGS. 36A and 36B, if the user has not pressed the statement icon, the controller determines whether the user pressed the payment method icon in step 646. If the user has pressed the payment method icon, the controller presents the user with a list of possible payment options from which the user can select an option in step 648.

If the user has not pressed the payment method icon, the controller determines whether the user has pressed the services icon in step 650. If the user has pressed the services icon, the controller allows the user to add or remove premium services in step 652.

If the user has not pressed the services icon, the controller determines whether the user has pressed the calling plan icon in step 654. If it is determined that the user has selected the calling plan icon, the touch-sensitive screen displays various calling plans that the user may select in step 656. If the controller determines that the user did not press the calling plan icon, the controller determines whether the user pressed the reward programs icon in step 658. If the user did press the reward programs icon, the controller presents various reward programs that the customer can sign up for in step 660.

If the user did not press the reward programs icon, the system determines whether the user pressed the trouble reporting icon in step 662. If the user pressed the trouble reporting icon, the customer may report problems encountered with the service in step 664.

If the user did not press the trouble reporting icon, the controller determines whether the user pressed the call me icon in step 666. If it is determined that the user pressed the call me icon, the controller leaves a message for the next available representative to call the customer back in step 668.

If it is determined that the user has pressed the done icon in step 670, the system returns to the idle state. However, if the user has not pressed the done icon in step 670, the system remains in the customer care state.

Figure 22:
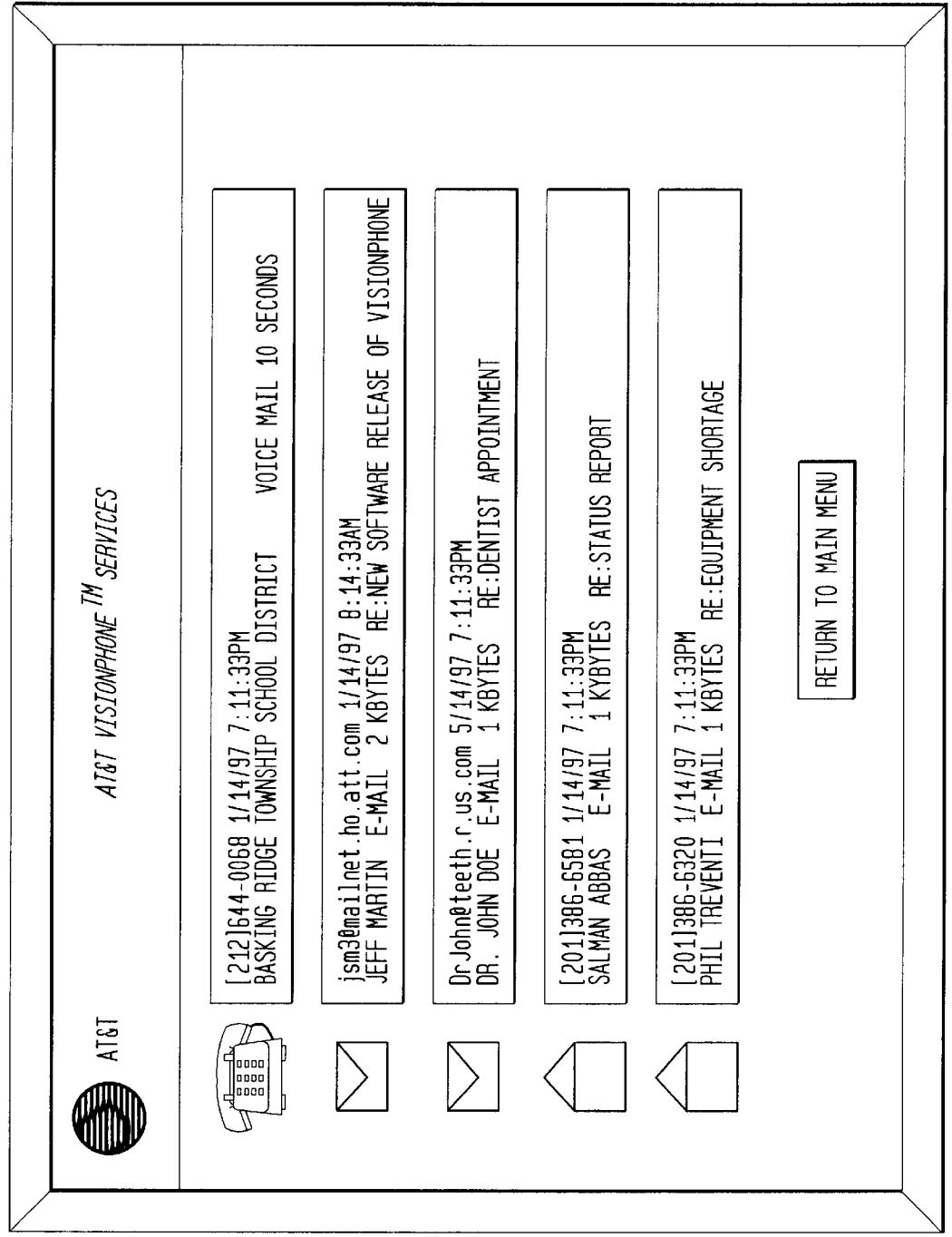
FIG. 22 illustrates a voice, video, and e-mail screen according to one embodiment of the present invention.

If it is determined that the user has selected the mail icon, the touch-sensitive screen 141 displays a list of voice, video, and e-mail messages as illustrated in FIG. 22. In step 692, the user is able to listen/view their mail messages as well as perform various operations such as delete, save, print, forward, etc. The system then waits for the user to press the return to main menu icon in step 694 and returns to the idle state when the main menu icon is pressed.

Figure 38:
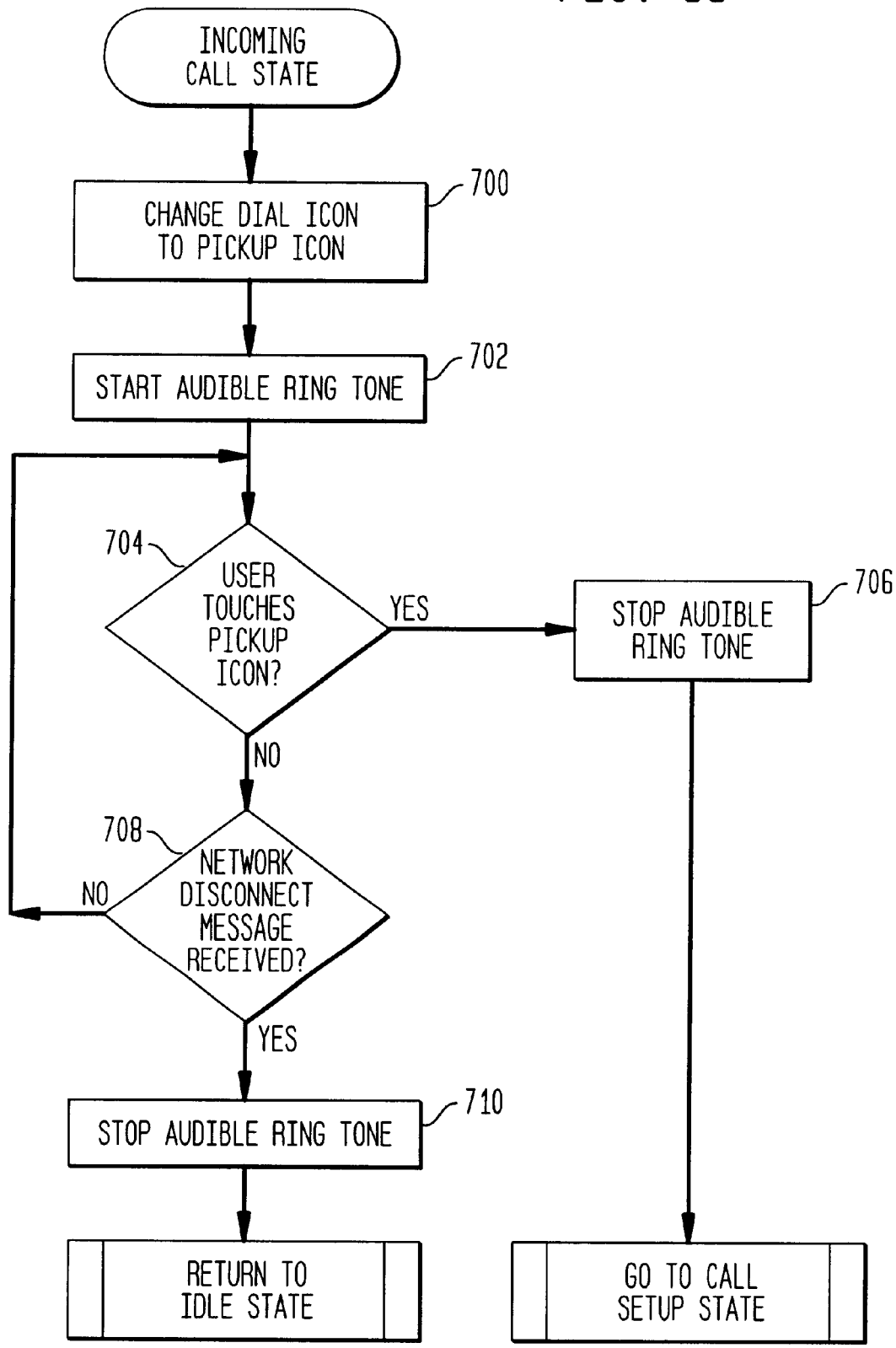
FIG. 38 is a flow chart illustrating an incoming call state of the video telephone according to one embodiment of the present invention.

If it is determined that the system has detected an incoming call, the system goes to the incoming call state as illustrated in FIG. 38. In step 700, the controller changes the dial icon to pick up icon, and starts an audible ring tone in step 702. The controller then determines whether the user touches the pick up icon in step 704. If the user touches the pick up icon, the controller stops the audible ring tone in step 706 and the system goes to the call set up state. However, if the user does not touch the pick up icon, the system waits for the network disconnect message in step 708. When the network disconnect message is received, the audible ring tone is stopped in step 710 and the system is returned to the idle state.

Figure 46:
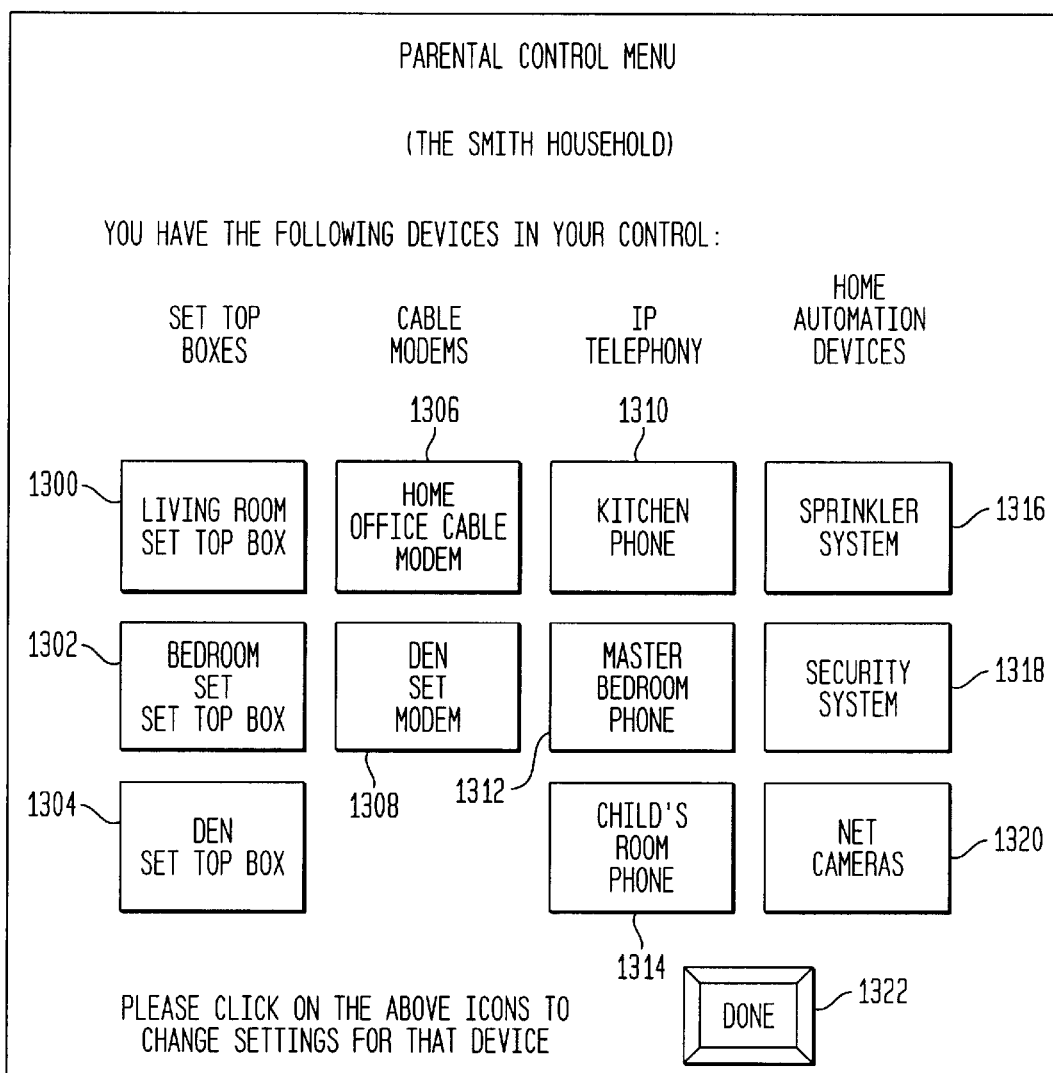
FIG. 46 illustrates a parental control menu screen according to one embodiment of the present invention.

FIG. 46 illustrates the parental control menu display screen shown on the touch-sensitive screen 141 when the parental control icon 168 is selected according to one embodiment of the present invention. A plurality of icons 1300–1322 are provided on the menu screen. By pressing any of the icon buttons, a new process or operation of the video telephone begins as will be described in more detail below. FIGS. 47–50 illustrate various displays which are displayed on the touch-sensitive screen 141. These screen displays will be described in more detail below.

Figure 51A:
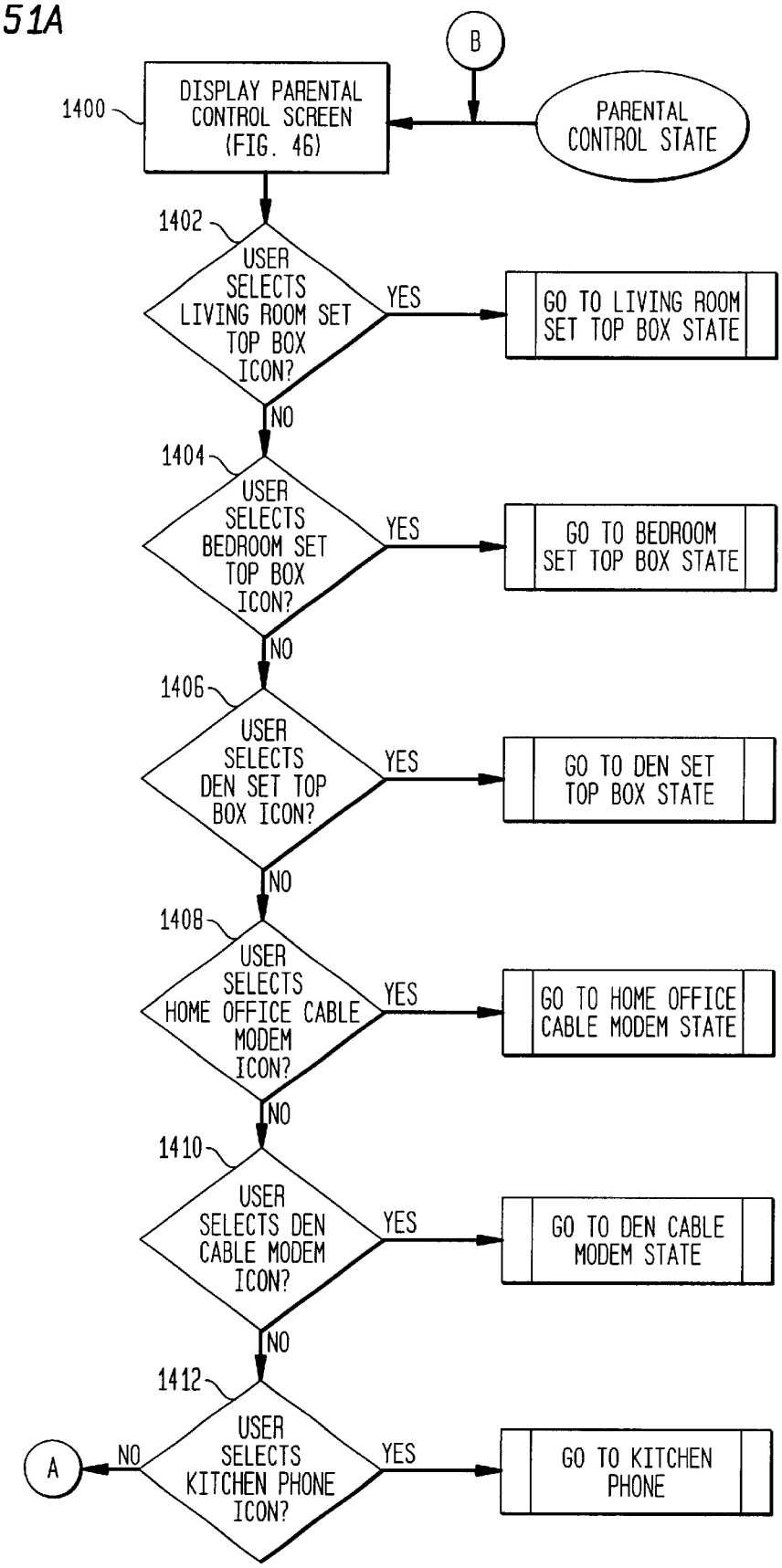
FIGS. 51A and 51B are flow charts illustrating a parental control state of the video telephone according to one embodiment of the present invention.
Figure 51B:
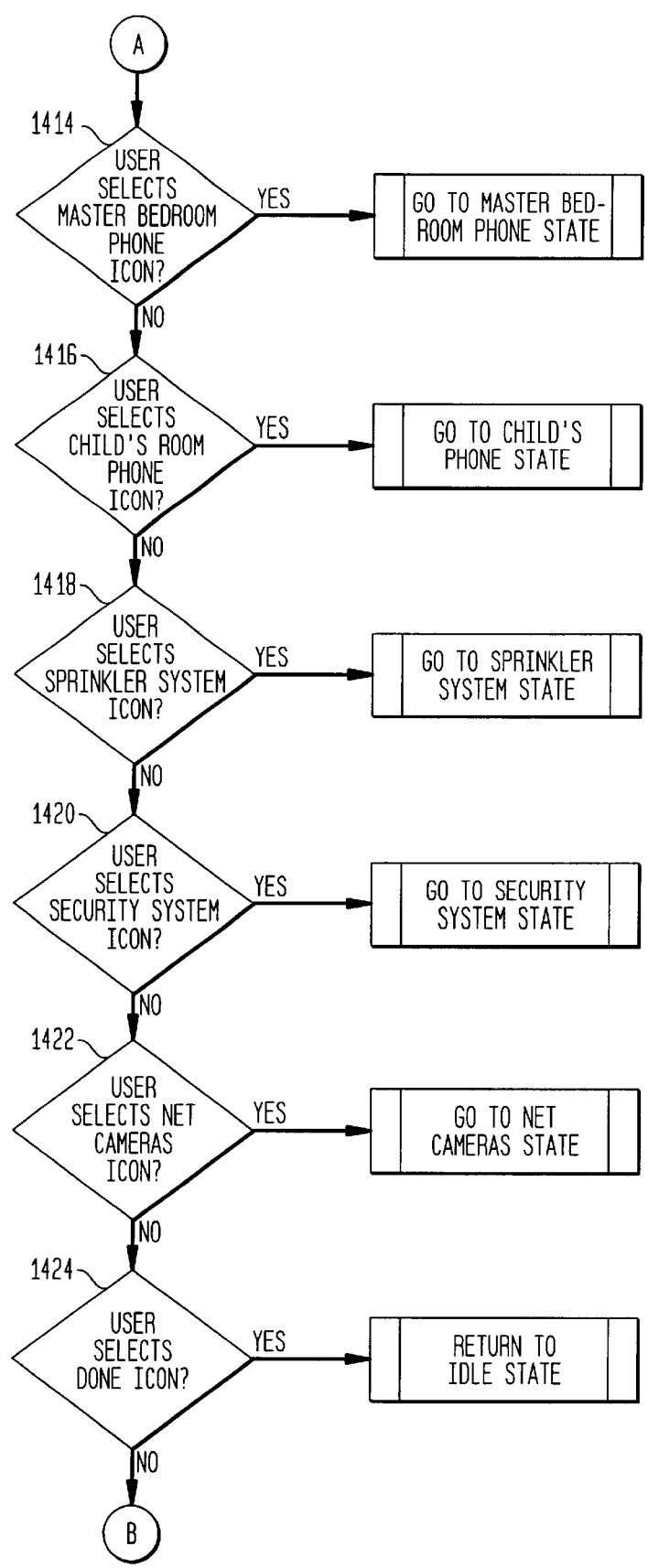

FIGS. 51A and 51B illustrate the operation of the video telephone 130 in the parental control state according to one embodiment of the present invention. In step 1400, the parental control menu (FIG. 46) is displayed on the touch-sensitive screen 141. The controller then determines whether the user has selected the living room set top box icon 1300 in step 1402. If the user has selected the living room set top box icon 1300, the system goes to the living room set top box state which will be described below with reference to FIG. 47. If the user has not selected the living room set top box icon 1300, then the controller determines whether the user has pressed the bedroom set top box icon 1302 in step 1404. If the user has selected the bedroom set top box icon 1302, the system goes to the bedroom set top box state which is not described below, but is implemented in a manner similar to the living room set top box state illustrated in FIG. 47. If the user has not selected the bedroom set top box icon 1302, then the controller determines whether the user has pressed the den set top box icon 1304 in step 1406.

If the user has selected the den set top box icon 1304, the system goes to the den set top box state which is not described below, but is implemented in a manner similar to the living room set top box state illustrated in FIG. 47. If the user has not selected the den set top box icon 1304, then the controller determines whether the user has pressed the home office cable modem icon 1306 in step 1408. If the user has selected the home office cable modem icon 1306, the system goes to the home office cable modem state which will be described below with reference to FIG. 48. If the user has not selected the home office cable modem icon 1306, then the controller determines whether the user has pressed the den cable modem icon 1308 in step 1410.

If the user has selected the den cable modem icon 1308, the system goes to the den cable modem state which is not described below, but is implemented in a manner similar to the home office cable modem state illustrated in FIG. 48. If the user has not selected the den cable modem icon 1308, then the controller determines whether the user has pressed the kitchen phone icon 1310 in step 1412. If the user has selected the kitchen phone icon 1310, the system goes to the kitchen phone state which will be described below with reference to FIG. 49. If the user has not selected the kitchen phone icon 1310, then the controller determines whether the user has pressed the master bedroom phone icon 1312 in step 1414.

If the user has selected the den master bedroom phone icon 1312, the system goes to the master bedroom phone state which is not described below, but is implemented in a manner similar to the kitchen phone state illustrated in FIG. 48. If the user has not selected the master bedroom phone icon 1312, then the controller determines whether the user has pressed the child's room phone icon 1314 in step 1416. If the user has selected the child's room phone icon 1314, the system goes to the child's room phone state which is not described below, but is implemented in a manner similar to the kitchen phone state illustrated in FIG. 48. If the user has not selected the child's room phone icon 1314, then the controller determines whether the user has pressed the sprinkler system icon 1316 in step 1418.

If the user has selected the sprinkler system icon 1316, the system goes to the sprinkler system state which is not described below, but is implemented in a manner similar to the net cameras state illustrated in FIG. 50. If the user has not selected the sprinkler system icon 1316, then the controller determines whether the user has pressed the security system icon 1318 in step 1420. If the user has selected the security system icon 1318, the system goes to the security system phone state which is not described below, but is implemented in a manner similar to the net cameras state illustrated in FIG. 50. If the user has not selected the security system icon 1318, then the controller determines whether the user has pressed the net cameras icon 1320 in step 1422.

If the user has selected the net cameras icon 1320, the system goes to the net cameras state which will be described below with reference to FIG. 50. If the user has not selected the net cameras icon 1320, then the controller determines whether the user has pressed the done icon 1322 in step 1424. If the user has selected the done icon 1322, the system returns to the idle state. If the user has not selected the done icon 1318, then the system goes to step 1400 and displays the parental control menu screen (FIG. 46).

Figure 47:
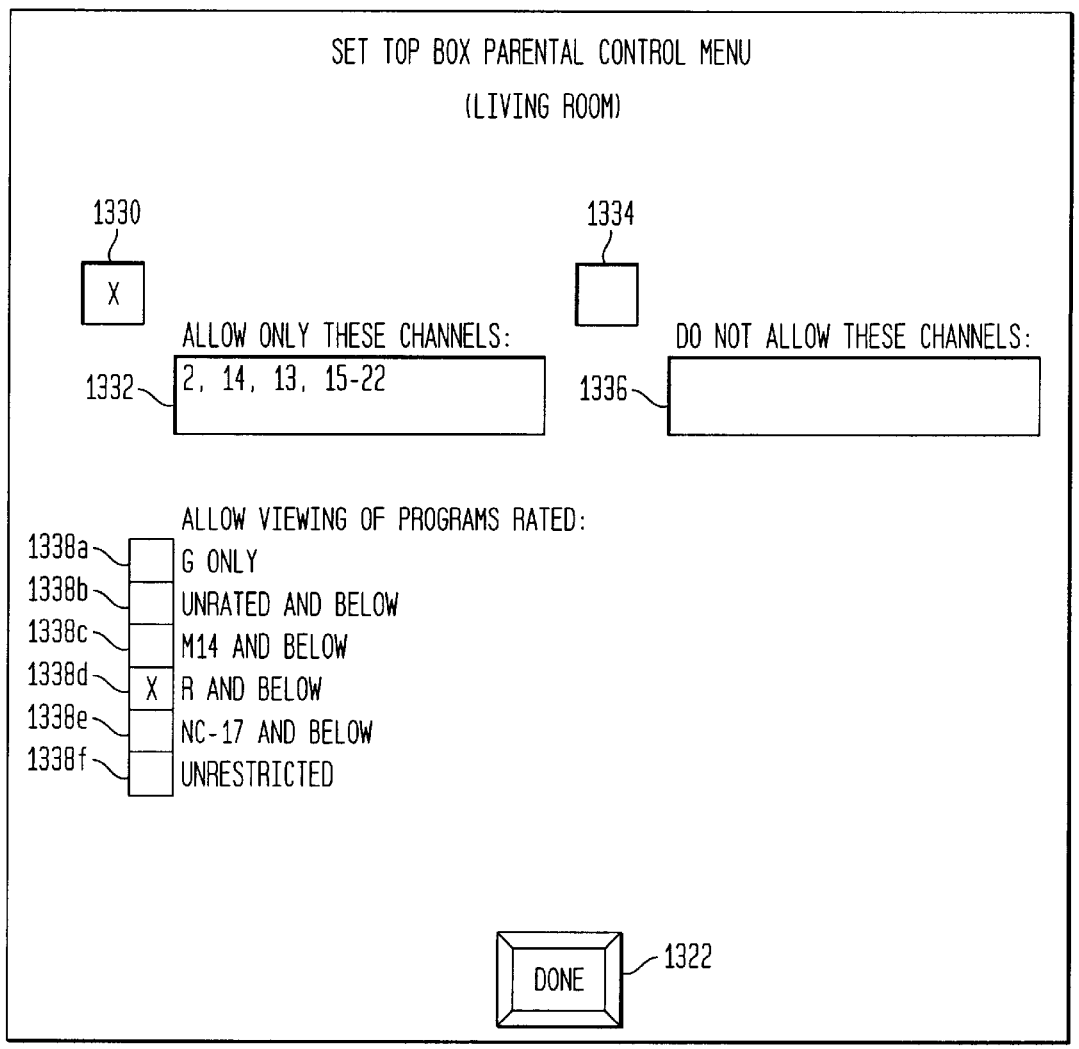
FIG. 47 illustrates a living room set top box parental control menu screen according to one embodiment of the present invention.

FIG. 47 illustrates the living room set top box parental control menu display screen shown on the touch-sensitive screen 141 when the living room set top box icon 1300 is selected according to one embodiment of the present invention. A plurality of fields 1330–1334 and a done icon 1322 are provided on the menu screen. By selecting field 1330 the user is able to enter the numbers of the allowed channels that can be viewed thru the living room set top box in field 1332. If the user selected field 1334, the user is able to enter the numbers of the channels that can not be viewed thru the living room set top box in field 1336. Fields 1338*a*–1338*f* permit the user to select one and only one field to specify the level of the programs that can be viewed thru the living room set top box (for example, in FIG. 47, field 1338*d* is selected to permit R-rated programs and below to be viewed). Selecting the done icon 1322 returns the system to the parental control state.

Figure 48:
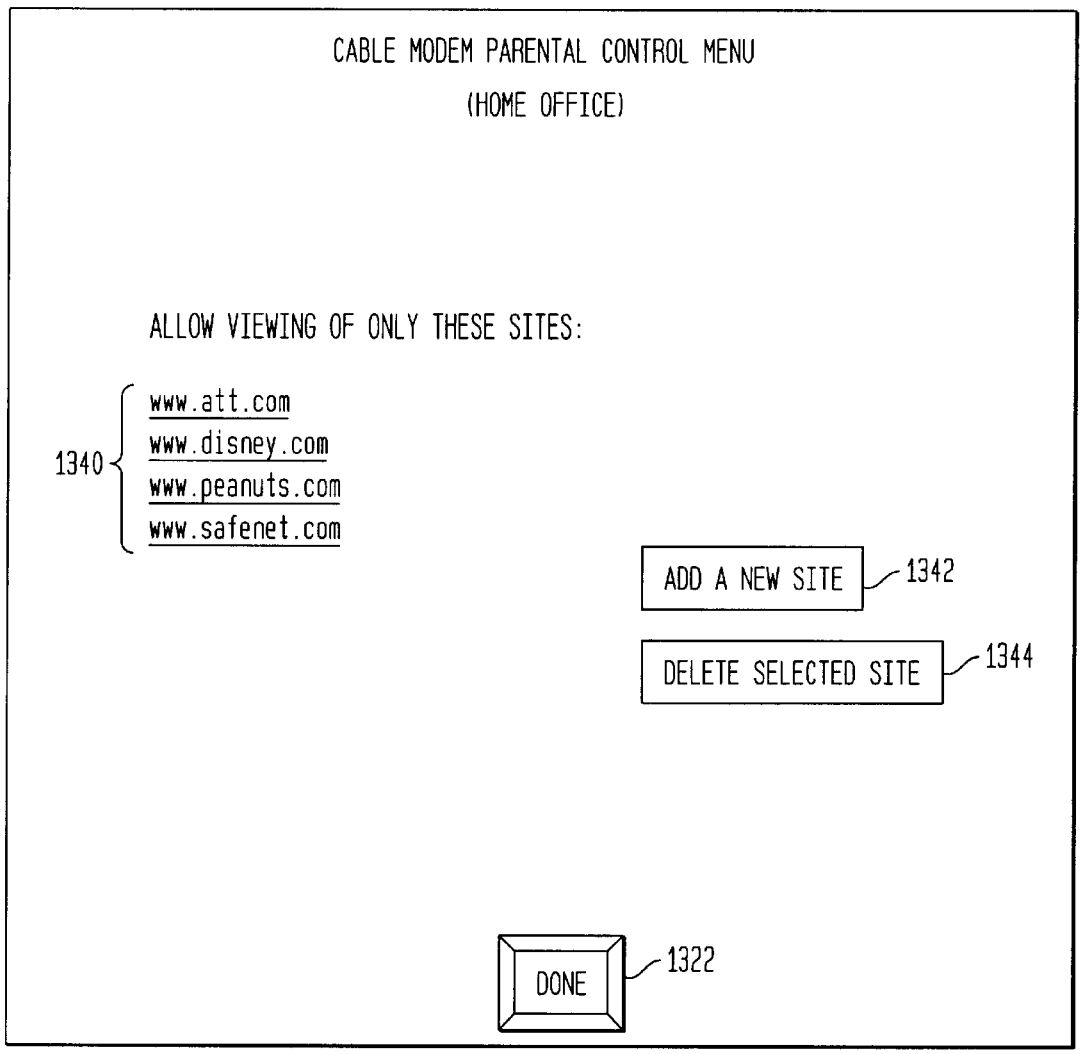
FIG. 48 illustrates a home office cable modem parental control menu screen according to one embodiment of the present invention.

FIG. 48 illustrates the cable modem parental control menu display screen shown on the touch-sensitive screen 141 when the home office cable modem icon 1306 is selected according to one embodiment of the present invention. A plurality of fields 1340–1344 and a done icon 1322 are provided on the menu screen. By selecting field 1342 the user is able to enter the Universal Resource Locators (URLs) of the allowed websites that can be viewed thru the home office cable modem in field 1340. If the user selects field 1344, the user is able to delete previously entered allowable URLs in field 1340. Selecting the done icon 1322 returns the system to the parental control state.

FIG. 49 illustrates the IP telephony parental control menu display screen shown on the touch-sensitive screen 141 when the kitchen phone icon 1310 is selected according to one embodiment of the present invention. A plurality of fields 1350–1358 and a done icon 1322 are provided on the menu screen. The user can only select either field 1350 to restrict the hours of use of the kitchen phone or field 1352 to permit unrestricted use of the kitchen phone. Similarly, to restrict the calling patterns, the user can select either field 1354 to restrict the kitchen phone to local and credit card calls or field 1356 to restrict the kitchen phone to local calls only or field 1358 to restrict the kitchen phone to specific area codes. Selecting the done icon 1322 returns the system to the parental control state.

Figure 50:
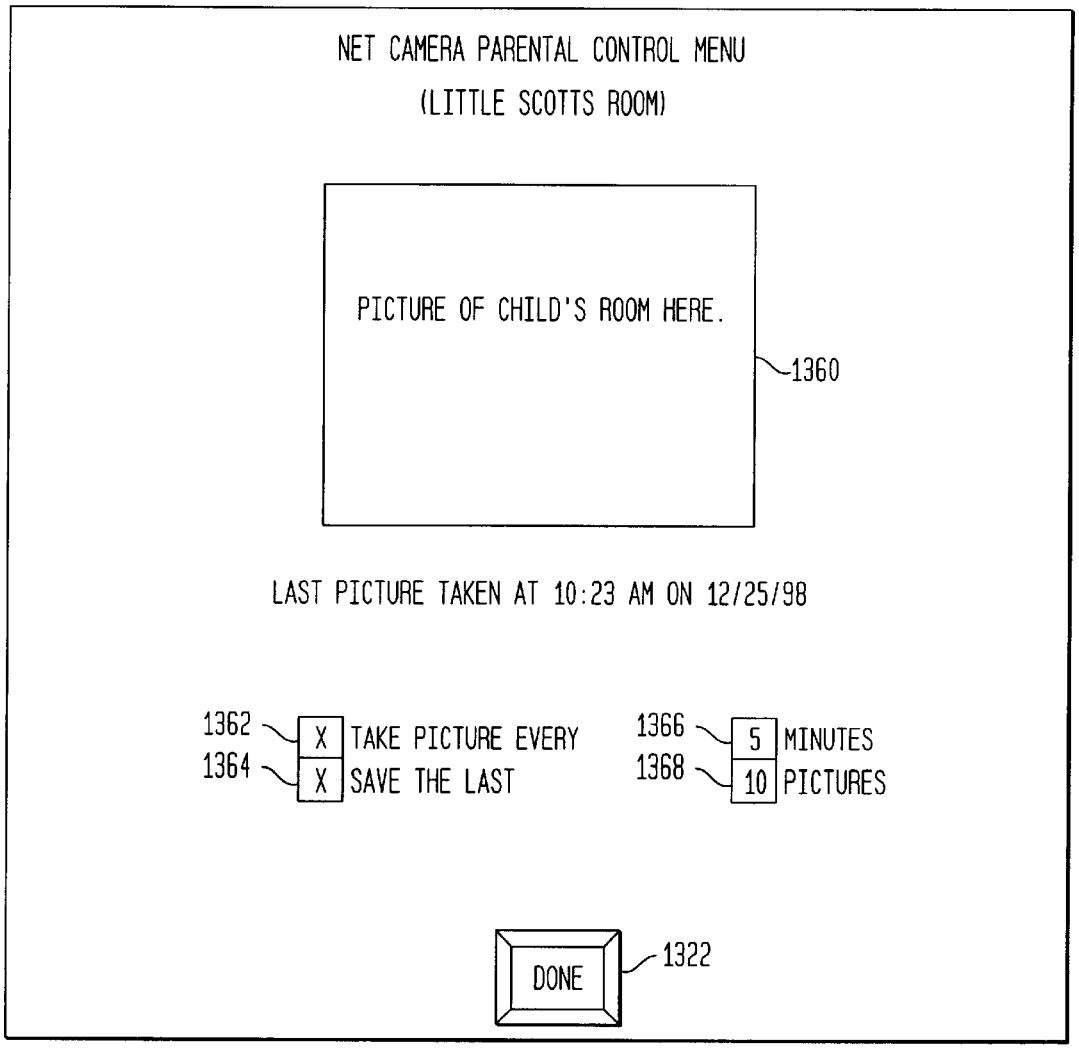
FIG. 50 illustrates a net camera parental control menu screen according to one embodiment of the present invention.

FIG. 50 illustrates the net camera parental control menu display screen shown on the touch-sensitive screen 141 when the net camera icon 1320 is selected according to one embodiment of the present invention. A plurality of fields 1360–1368 and a done icon 1322 are provided on the menu screen. Field 1360 is used to display the last picture taken from the net camera. While the present embodiment relates to still image photography, alternate embodiments are contemplated using a video camera and providing a real-time image stream in field 1360. If the user selects field 1362, then the frequency of taking pictures can be entered in field 1366. Similarly, to specify the number of pictures to be saved, the user can select field 1364 and then enter how many of the last sequentially ordered pictures are to be saved in field 1368. Selecting the done icon 1322 returns the system to the parental control state.

Figure 52:
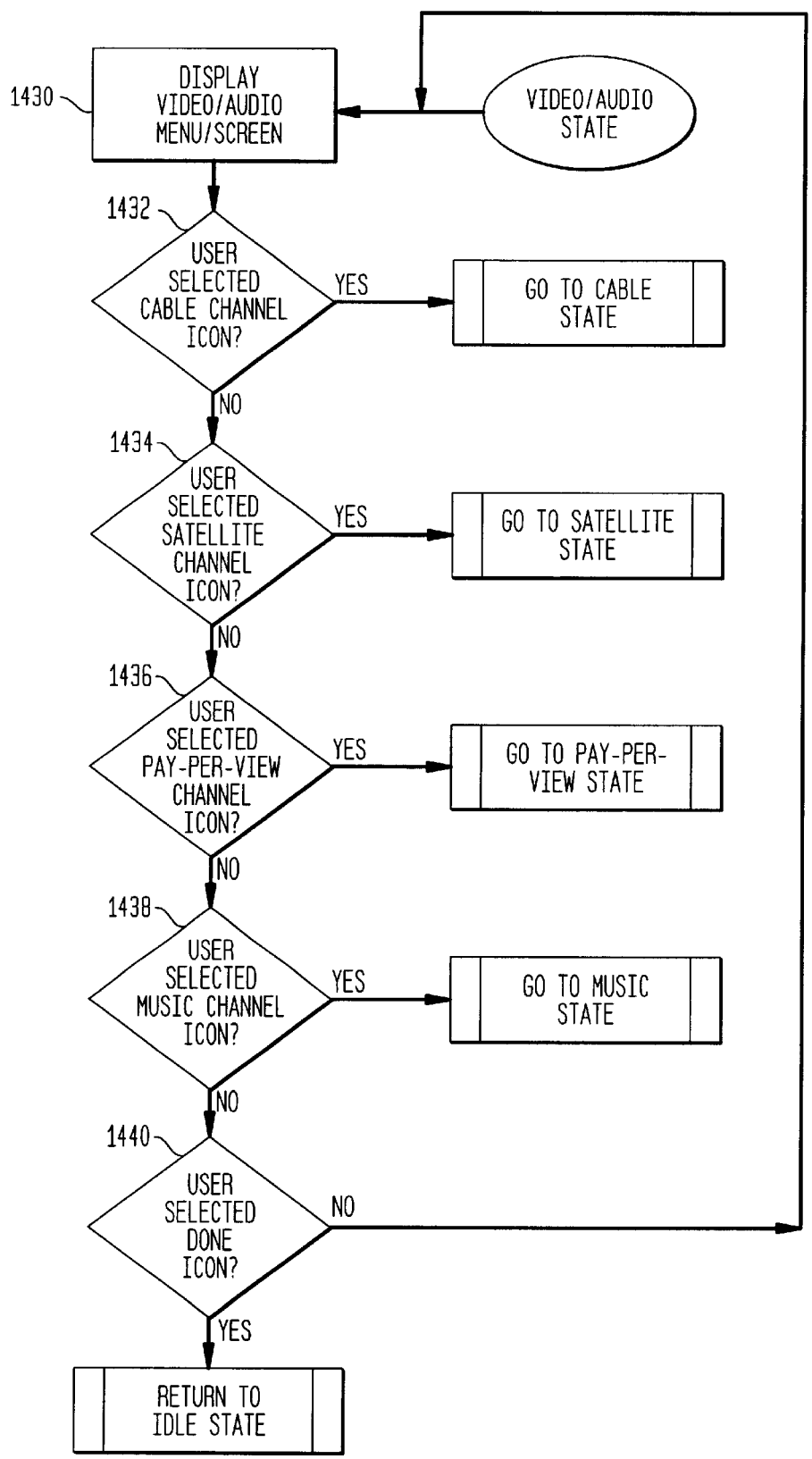
FIG. 52 is a flow chart illustrating a video/audio state of the video telephone according to one embodiment of the present invention.

FIG. 52 illustrates the operation of the video telephone 130 in the Video/Audio state according to one embodiment of the present invention. In step 1430, a video/audio menu is displayed on the touch-sensitive screen 141. The controller then determines whether the user has selected the cable channel icon (not shown) in step 1432. If the user has selected the cable channel icon, the system goes to the Cable state which will be described below with reference to FIG. 53. If the user has not selected the cable channel icon, then the controller determines whether the user has pressed the satellite channel icon (not shown) in step 1434. If the user has selected the satellite channel icon, the system goes to the Satellite state which will be described below with reference to FIG. 54. If the user has not selected the satellite channel icon, then the controller determines whether the user has selected the pay-per-view icon (not shown) in step 1436.

If the user has selected the pay-per-view icon, the system goes to the Pay-Per-View state which will be described below with reference to FIG. 55. If the user has not selected the pay-per-view icon, then the controller determines whether the user has pressed the music channel icon (not shown) in step 1438. If the user has selected the music channel icon, the system goes to the Music state which will be described below with reference to FIG. 56. If the user has not selected the music channel icon, then the controller determines whether the user has pressed the done icon (not shown) in step 1440. If the user has selected the done icon, the system returns to the idle state. If the user has not selected the done icon, then the system goes to step 1430 and displays the video/audio menu screen.

Figure 53:
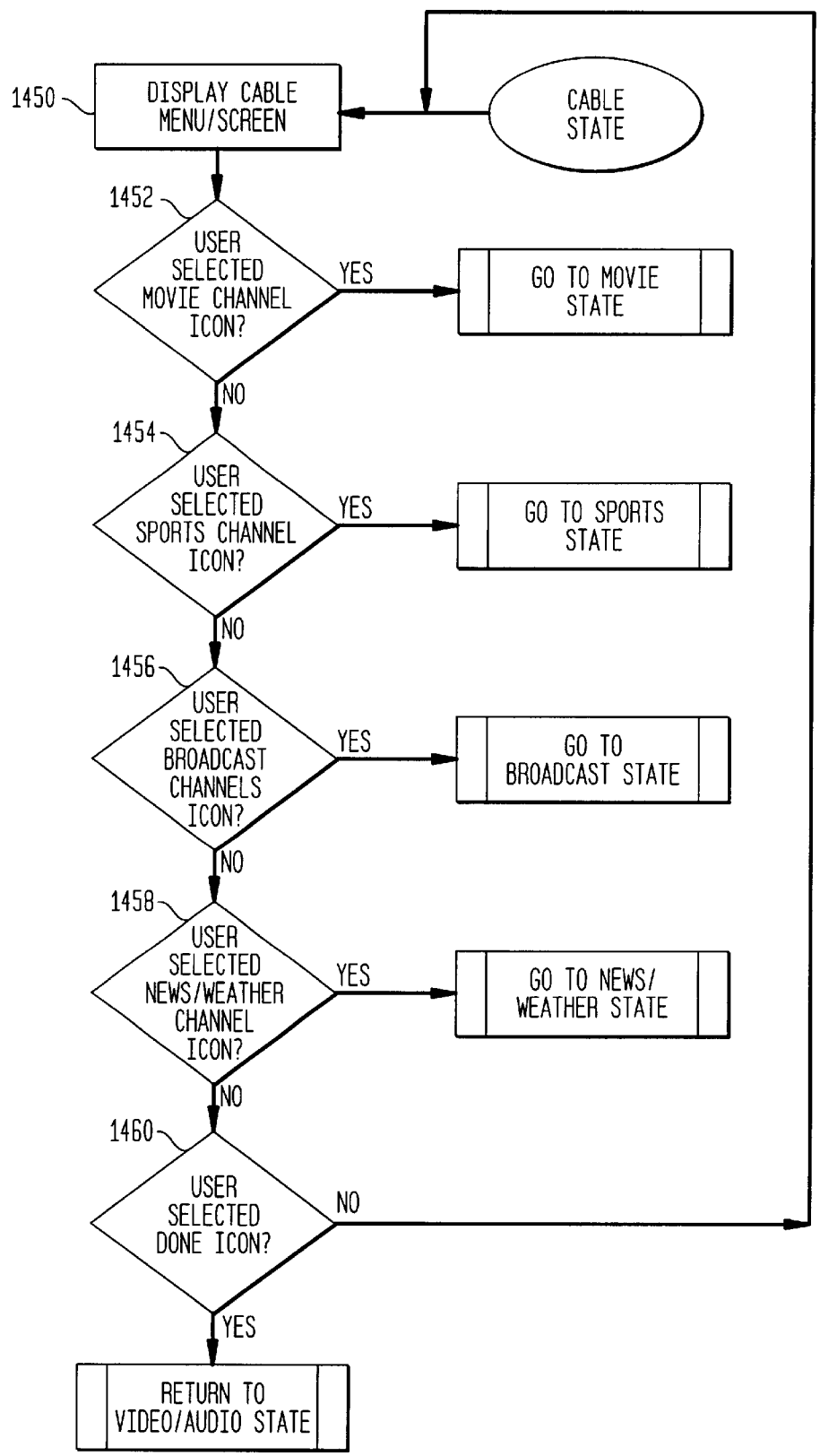
FIG. 53 is a flow chart illustrating a cable state of the video telephone according to one embodiment of the present invention.

FIG. 53 illustrates the operation of the video telephone 130 in the Cable state according to one embodiment of the present invention. Detailed descriptions of the subsequent sub-states shown in this FIG. 53 and FIGS. 54–57 are not provided, but are within the capabilities of one skilled in the art to develop in accordance with the teachings herein. In step 1450, a cable channel menu is displayed on the touch-sensitive screen 141. The controller then determines whether the user has selected the movie channel icon (not shown) in step 1452. If the user has selected the movie channel icon, the system goes to the Movie state. If the user has not selected the movie channel icon, then the controller determines whether the user has pressed the sports channel icon (not shown) in step 1454. If the user has selected the sports channel icon, the system goes to the Sports state. If the user has not selected the sports channel icon, then the controller determines whether the user has selected the broadcast channels icon (not shown) in step 1456.

If the user has selected the broadcast channels icon, the system goes to the Broadcast state. If the user has not selected the broadcast channels icon, then the controller determines whether the user has pressed the news/weather channel icon (not shown) in step 1458. If the user has selected the music channel icon, the system goes to the news/weather channel state. If the user has not selected the news/weather channel icon, then the controller determines whether the user has pressed the done icon (not shown) in step 1460. If the user has selected the done icon, the system returns to the idle state. If the user has not selected the done icon, then the system goes to step 1450 and displays the cable menu screen.

Figure 54:
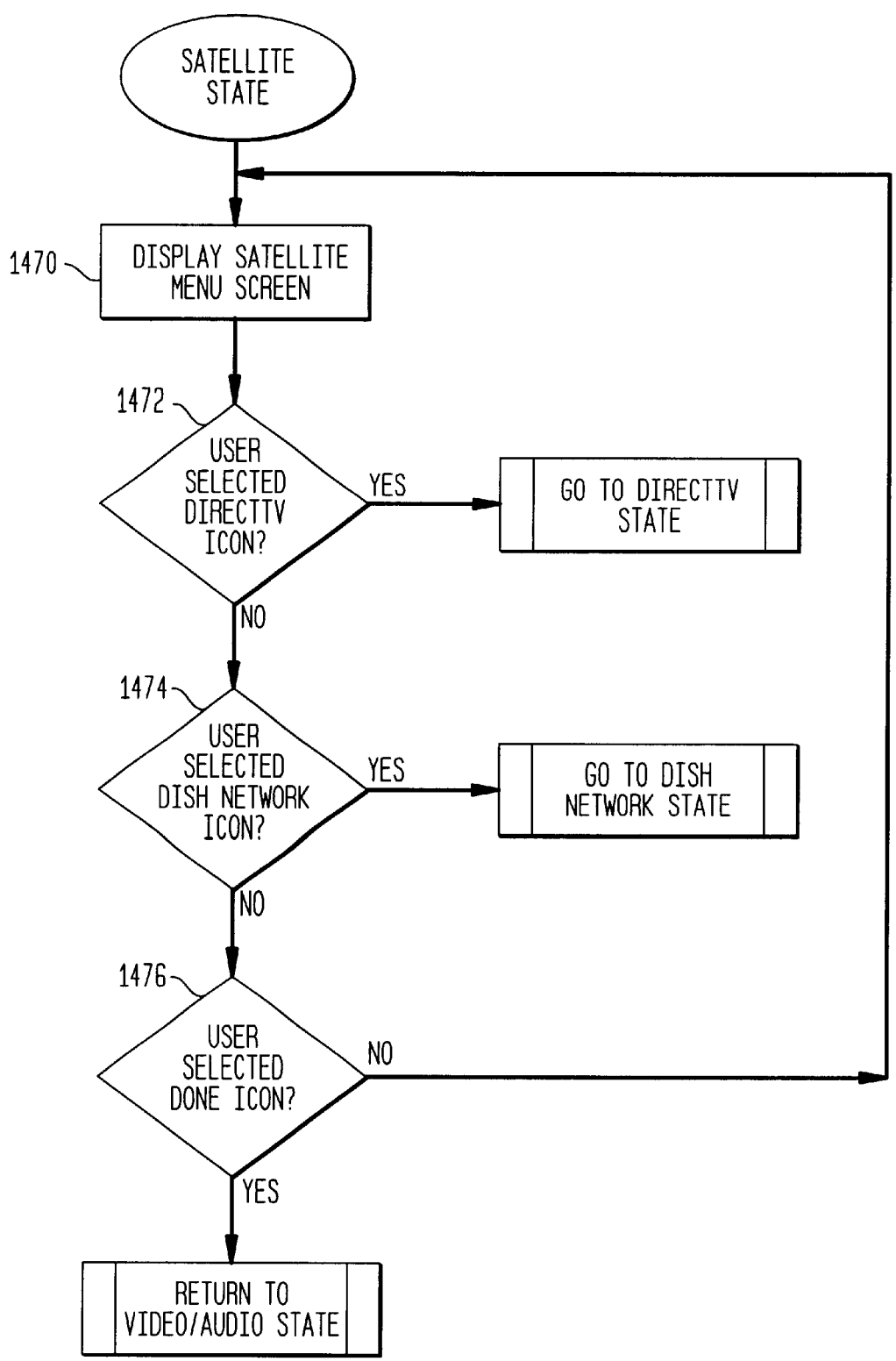
FIG. 54 is a flow chart illustrating a satellite state of the video telephone according to one embodiment of the present invention.

FIG. 54 illustrates the operation of the video telephone 130 in the Satellite state according to one embodiment of the present invention. In step 1470, a satellite channel menu is displayed on the touch-sensitive screen 141. The controller then determines whether the user has selected the DirectTV$^{SM}$ icon (not shown) in step 1472. If the user has selected the DirectTV$^{SM}$ icon, the system goes to the DirectTV$^{SM}$ state. If the user has not selected the DirectTV$^{SM}$ icon, then the controller determines whether the user has selected the Dish Network icon (not shown) in step 1474. If the user has selected the Dish Network icon, the system goes to the Dish Network state. If the user has not selected the Dish Network icon, then the controller determines whether the user has pressed the done icon (not shown) in step 1476. If the user has selected the done icon, the system returns to the video/audio state. If the user has not selected the done icon, then the system goes to step 1470 and displays the satellite channel menu screen.

Figure 55:
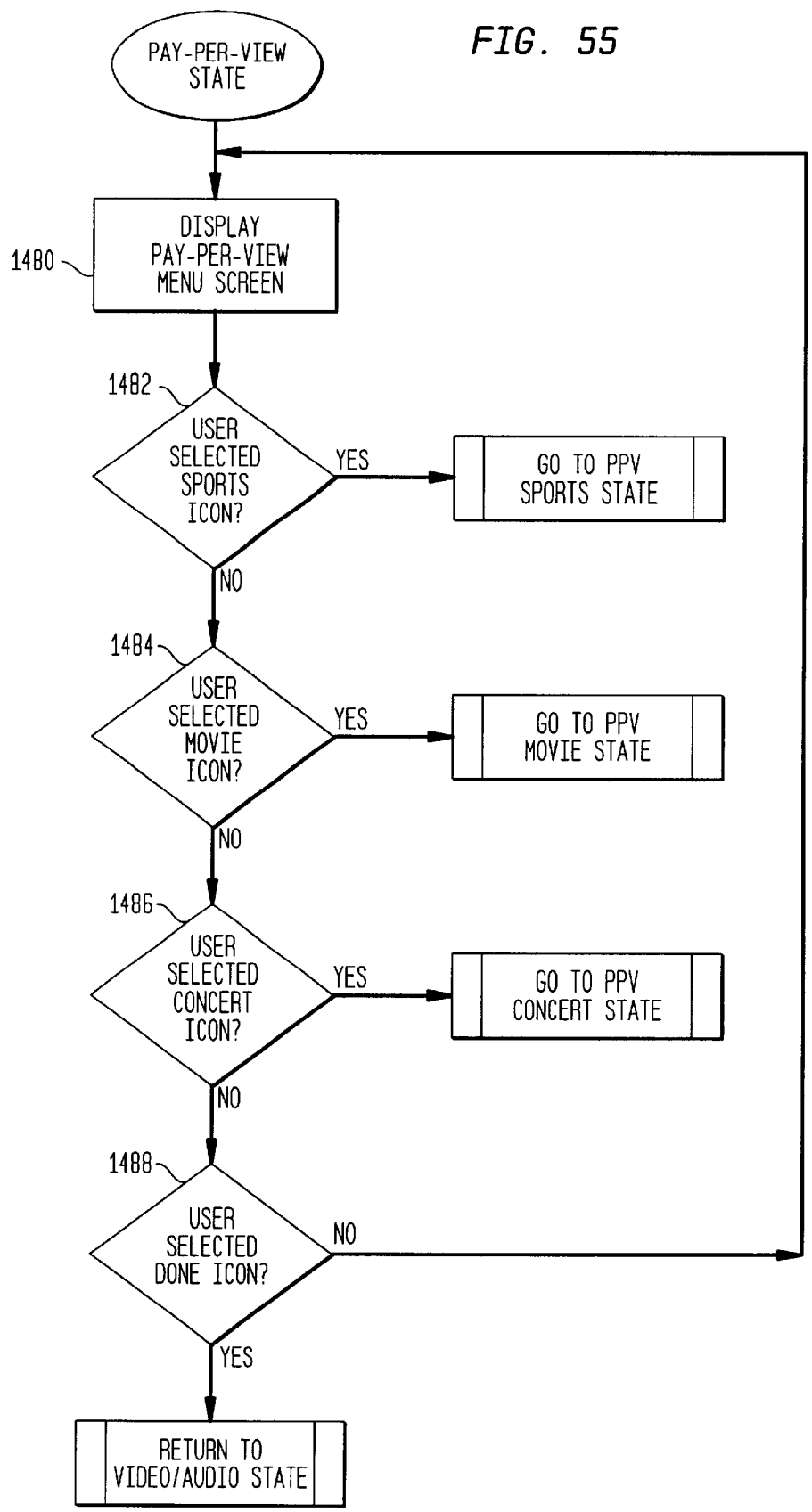
FIG. 55 is a flow chart illustrating a pay-per-view state of the video telephone according to one embodiment of the present invention.

FIG. 55 illustrates the operation of the video telephone 130 in the Pay-Per-View state according to one embodiment of the present invention. In step 1480, a Pay-Per-View channel menu is displayed on the touch-sensitive screen 141. The controller then determines whether the user has selected the sports channel icon (not shown) in step 1482. If the user has selected the sports channel icon, the system goes to the Pay-Per-View Sports state. If the user has not selected the sports channel icon, then the controller determines whether the user has selected the movie channel icon (not shown) in step 1484. If the user has selected the movie channel icon, the system goes to the pay-per-view movie channel state. If the user has not selected the movie channel icon, then the controller determines whether the user has selected the concert channels icon (not shown) in step 1486.

If the user has selected the concert channels icon, the system goes to the pay-per-view concert channels state. If the user has not selected the concert channels icon, then the controller determines whether the user has pressed the done icon (not shown) in step 1488. If the user has selected the done icon, the system returns to the idle state. If the user has not selected the done icon, then the system goes to step 1480 and displays the pay-per-view channel menu screen.

Figure 56:
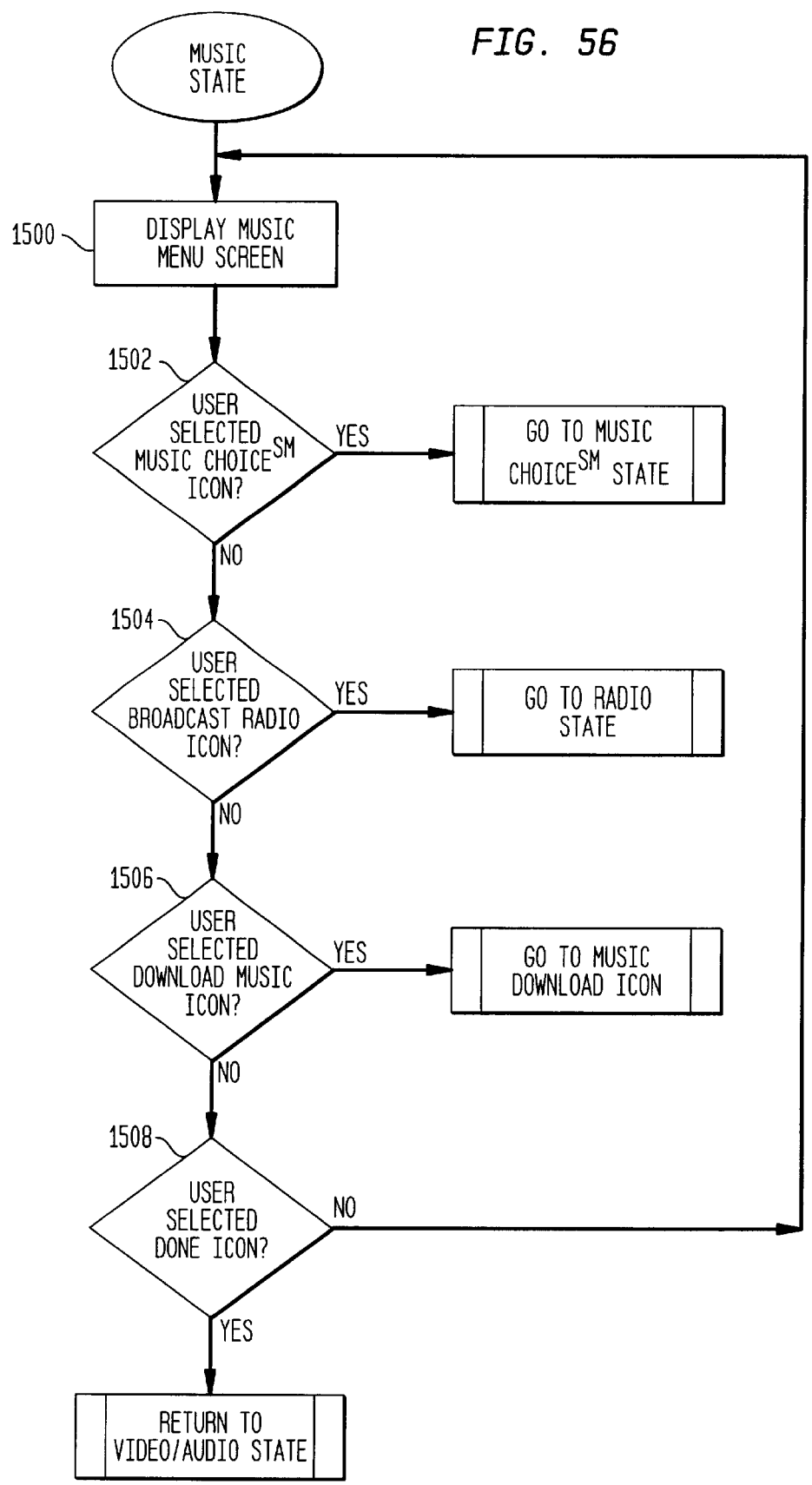
FIG. 56 is a flow chart illustrating a music state of the video telephone according to one embodiment of the present invention.

FIG. 56 illustrates the operation of the video telephone 130 in the Music state according to one embodiment of the present invention. In step 1500, a Music menu is displayed on the touch-sensitive screen 141. The controller then determines whether the user has selected the MusicChoice<sup>SM</sup> icon (not shown) in step 1502. If the user has selected the MusicChoice<sup>SM</sup> icon, the system goes to the Music-Choice<sup>SM</sup> state. If the user has not selected the Music-Choice<sup>SM</sup> icon, then the controller determines whether the user has selected the broadcast radio icon (not shown) in step 1504. If the user has selected the broadcast radio icon, the system goes to the broadcast radio state. If the user has not selected the broadcast radio icon, then the controller determines whether the user has selected the download music icon (not shown) in step 1506.

If the user has selected the download music icon, the system goes to the download music state. If the user has not selected the download music icon, then the controller determines whether the user has pressed the done icon (not shown) in step 1508. If the user has selected the done icon, the system returns to the idle state. If the user has not selected the done icon, then the system goes to step 1500 and displays the pay-per-view channel menu screen.

Figure 57:
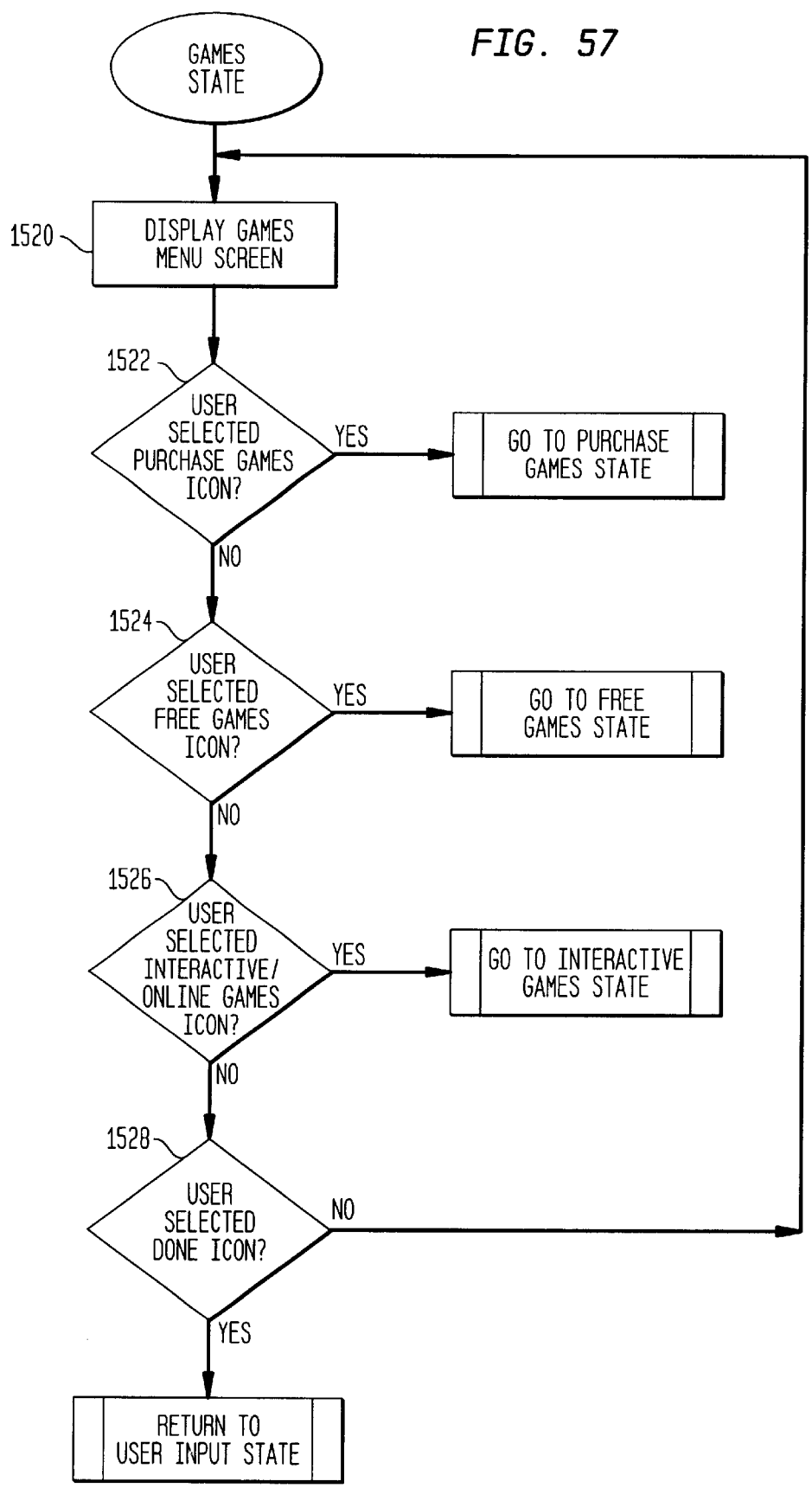
FIG. 57 is a flow chart illustrating a games state of the video telephone according to one embodiment of the present invention.

FIG. 57 illustrates the operation of the video telephone 130 in the Games state according to one embodiment of the present invention. In step 1520, a Games menu is displayed on the touch-sensitive screen 141. The controller then determines whether the user has selected the purchase games icon (not shown) in step 1522. If the user has selected the purchase games icon, the system goes to the purchase games state. If the user has not selected the purchase games icon, then the controller determines whether the user has selected the free games icon (not shown) in step 1524. If the user has selected the free games icon, the system goes to the free games state. If the user has not selected the free games icon, then the controller determines whether the user has selected the interactive/on-line games icon (not shown) in step 1526.

If the user has selected the interactive/on-line games icon, the system goes to the interactive/on-line games state. If the user has not selected the interactive/on-line games icon, then the controller determines whether the user has pressed the done icon (not shown) in step 1528. If the user has selected the done icon, the system returns to the idle state. If the user has not selected the done icon, then the system goes to step 1520 and displays the games menu screen.

The following applications are hereby incorporated by reference:
1. A Hybrid Fiber Twisted-pair Local Loop Network Service Architecture, U.S. application Ser. No. 09/001,360, filed Dec. 31, 1997;
2. Dynamic Bandwidth Allocation for use in the Hybrid Fiber Twisted-pair Local Loop Network Service Architecture, U.S. application Ser. No. 09/001,425, filed Dec. 31, 1997;
3. The VideoPhone, U.S. application Ser. No. 09/001,905, filed Dec. 31, 1997;
4. VideoPhone Privacy Activator, U.S. application Ser. No. 09/001,909, filed Dec. 31, 1997;
5. VideoPhone Form Factor, U.S. application Ser. No. 09/001,583 filed Dec. 31, 1997;
6. VideoPhone Centrally Controlled User Interface With User Selectable Options, U.S. application Ser. No. 09/001,576, filed Dec. 31, 1997;
7. VideoPhone User Interface Having Multiple Menu Hierarchies, U.S. application Ser. No. 09/001,908, filed Dec. 31, 1997;
8. VideoPhone Blocker, U.S. Pat. No. 5,949,474, issued on Sep. 7, 1999;
9. VideoPhone Inter-com For Extension Phones, U.S. application Ser. No. 09/001,358, filed Dec. 31, 1997;
10. Advertising Screen Saver, U.S. Pat. No. 6,084,583, issued on Jul. 4, 2000;
11. VideoPhone FlexiView Advertising Information Display for Visual Communication Device, U.S. Pat. No. 6,222,520, issued on Apr. 24, 2001;
12. VideoPhone Multimedia Announcement Answering Machine, U.S. application Ser. No. 09/001,911, filed Dec. 31, 1997;
13. VideoPhone Multimedia Announcement Message Toolkit, U.S. application Ser. No. 09/001,345, filed Dec. 31, 1997;
14. VideoPhone Multimedia Video Message Reception, U.S. application Ser. No. 09/001,362, filed Dec. 31, 1997;
15. VideoPhone Multimedia Interactive Corporate Menu Answering Machine U.S. Pat. No. 6,226,362, issued on May 1, 2001; Announcement,
16. VideoPhone Multimedia Interactive On-Hold Information Menus, U.S. Pat. No. 6,020,916, issued on Feb. 1, 2000;
17. VideoPhone Advertisement When Calling Video Non-enabled VideoPhone Users, U.S. application Ser. No. 09/001,361, filed Dec. 31, 1997;
18. Motion Detection Advertising, U.S. application Ser. No. 09/001,355, filed Dec. 31, 1997;
19. Interactive Commercials, U.S. Pat. No. 6,178,446, issued on Jan. 23, 2001;
20. Video communication device providing in-home Catalogue Services, U.S. Pat. No. 5,970,473, issued on Oct. 19, 1999;
21. A Facilities Management Platform For Hybrid Fiber Twisted-pair Local Loop Network, Service Architecture, U.S. application Ser. No. 09/001,422, filed Dec. 31, 1997;
22. Life Line Support for Multiple Service Access on Single Twisted-pair, U.S. application Ser. No. 09/001,343, filed Dec. 31, 1997;
23. A Network Server Platform (NSP) For a Hybrid Fiber Twisted-pair (HFTP) Local Loop Network Service Architecture, U.S. Pat. No. 6,229,810, issued on May 8, 2001;
24. A Communication Server Apparatus For Interactive Commercial Service, U.S. application Ser. No. 09/001,344, filed Dec. 31, 1997;
25. NSP Multicast, PPV Server NSP Based Multicast Digital Program Delivery Services, U.S. application Ser. No. 09/001,580, filed Dec. 31, 1997;
26. NSP Internet, JAVA Server and VideoPhone Application Server, U.S. Pat. No. 6,044,403, issued on Mar. 28, 2000;
27. NSP WAN Interconnectivity Services for Corporate Telecommuters Telecommuting, U.S. application Ser. No. 09/001,540, filed Dec. 31, 1997;
28. NSP Telephone Directory White-Yellow Page Services, U.S. Pat. No. 6,052,439, issued on Apr. 18, 2000;
29. NSP Integrated Billing System For NSP services and Telephone services, U.S. application Ser. No. 09/001,359, filed Dec. 31, 1997;
30. Network Server Platform/Facility Management Platform Caching Server, U.S. application Ser. No. 09/001,419, filed Dec. 31, 1997;
31. An Integrated Services Director (ISD) Overall Architecture, U.S. application Ser. No. 09/001,417, filed Dec. 31, 1997;

32. ISD/VideoPhone (Customer Premises) Local House Network, U.S. application Ser. No. 09/001,418, filed Dec. 31, 1997;
33. ISD Wireless Network, U.S. application Ser. No. 09/001,363, filed Dec. 31, 1997;
34. ISD Controlled Set-Top Box, U.S. application Ser. No. 09/001,424, filed Dec. 31, 1997;
35. Integrated Remote Control and Phone, U.S. application Ser. No. 09/001,423, filed Dec. 31, 1997;
36. Integrated Remote Control and Phone User Interface, U.S. application Ser. No. 09/001,420, filed Dec. 31, 1997;
37. Integrated Remote Control and Phone Form Factor, U.S. application Ser. No. 09/001,910, filed Dec. 31, 1997;
38. VideoPhone Mail Machine, U.S. application Ser. No. 60/070,104, filed Dec. 31, 1997;
39. Restaurant Ordering Via VideoPhone, U.S. application Ser. No. 60/070,121, filed Dec. 31, 1997;
40. Ticket Ordering Via VideoPhone, U.S. application Ser. No. 09/218,171, filed Dec. 31, 1997;
41. Multi-Channel Parallel/Serial Concatenated Convolutional Codes And Trellis Coded Modulation Encode/Decoder, U.S. Pat. No. 6,088,387, issued on Jul. 11, 2000;
42. Spread Spectrum Bit Allocation Algorithm, U.S. application Ser. No. 09/001,842, filed Dec. 31, 1997;
43. Digital Channelizer With Arbitrary Output Frequency, U.S. application Ser. No. 09/001,581, filed Dec. 31, 1997;
44. Method And Apparatus For Allocating Data Via Discrete Multiple Tones, U.S. Pat. No. 6,134,274, issued on Oct. 17, 2000;
45. Method And Apparatus For Reducing Near-End Cross Talk In Discrete Multi-Tone Modulators/Demodulators, U.S. application Ser. No. 08/997,176, filed Dec. 23, 1997;

In addition, the following two earlier filed patent applications are hereby incorporated by reference:
1. U.S. Pat. No. 6,061,326 issued on May 9, 2000, entitled Wideband Communication System for the Home, to Robert R. Miller, II and Jesse E. Russell, and
2. U.S. Pat. No. 6,111,895 issued on Aug. 29, 2000, entitled Wide Band Transmission Through Wire, to Robert R. Miller, II, Jesse E. Russell and Richard R. Shively.

The following patent applications are related by subject matter and are concurrently filed herewith and should be deemed to be incorporated by reference as to their entire contents (the first listed application being the present application):
1. U.S. application Ser. No. 09/224,286, entitled "Set Top Integrated Visionphone User Interface Having Multiple Menu Hierarchies" of Gerszberg et al.
2. U.S. application Ser. No. 09/224,283, entitled "Coaxial Cable/Twisted Pair Cable Telecommunications Network Architecture" of Gerszberg et al.
3. U.S. application Ser. No. 09/224,281, entitled "Coaxial Cable/Twisted Pair Fed, Integrated Residence Gateway Controlled, Set-top Box" of Gerszberg et al.
4. U.S. application Ser. No. 09/224,285, entitled "A Network Server Platform (NSP) for a Hybrid Coaxial/Twisted Pair Local Loop Network Service Architecture" of Gerszberg et al.
5. U.S. application Ser. No. 09/224,287, entitled "A Facilities Management Platform for a Hybrid Coaxial/Twisted Pair Local Loop Network Service Architecture" of Gerszberg et al.
6. U.S. application Ser. No. 09/224,290, entitled "Intercom for Extension Phones Using an ISD in a Cable Environment" of Gerszberg et al.
7. U.S. application Ser. No. 09/224,288, entitled "Video Phone Multimedia Video Message Reception" of Gerszberg et al.
8. U.S. application Ser. No. 09/224,284, entitled "Cable Connected NSP for Telephone White-Yellow Page Services and Emergency 911 Location Identification" of Gerszberg et al.
9. U.S. application Ser. No. 09/224,282, entitled "A Network Server Platform for Providing Integrated Billing for CATV, Internet, Telephony and Enhanced Bandwidth Services" of Gerszberg et al.
10. U.S. application Ser. No. 09/224,289, entitled "Method and Apparatus for Providing Uninterrupted Service in a Hybrid Fiber Coaxial System" by Gerszberg et al.
11. U.S. application Ser. No. 09/224,276, entitled "Lifeline Service for HFCLA Network Using Wireless ISD" of Gerszberg et al.

We claim:
1. A user interface for a videophone connected to a coaxial cable network, comprising:
a display screen responsive to pressure input such that the display screen displays a plurality of first user selectable options corresponding to a plurality of service modes of the videophone; and
a controller configured to process the plurality of service modes such that the controller displays at least one menu hierarchy on the screen display after a user selectable option has been selected within the plurality of first user selectable options; wherein the controller is configured with a first operating state such that the controller receives control signals from a network device to control the display of the first plurality of user selectable options; and the controller configured with a second operating state such that the controller displays a plurality of second user selectable options provided by the network device upon receiving a signal from the controller that the first user selectable options have not been selected after a predetermined time; wherein the first user selectable options and the second user selectable options are displayed simultaneously on the display screen such that the controller displays information linked to a second user selectable option responsive to being selected.

2. The user interface of claim 1, wherein the second user selectable options are selectable advertisements in which the linked information includes an electronic coupon.

3. The user interface of claim 1, wherein said plurality of service modes includes at least one of a billing service, a banking service, an electronic shopping service, an operator service, an electronic message service, a telephone directory service, and a customer care service.

4. The user interface according to claim 1, wherein said at least one menu hierarchy includes an Internet user menu.

5. The user interface according to claim 1, wherein said at least one menu hierarchy includes a speed dial menu.

6. The user interface according to claim 1, wherein said at least one menu hierarchy includes a cash and coupons user selectable menu.

7. The user interface according to claim 1, wherein said at least one menu hierarchy includes an operator services menu.

8. The user interface according to claim 1, wherein said at least one menu hierarchy includes a customer care menu.

9. The user interface according to claim 1, wherein said at least one menu hierarchy includes a customer billing menu.

10. The user interface according to claim 1, wherein said at least one menu hierarchy includes a mail menu.

11. The user interface according to claim 1, wherein said at least one menu hierarachy includes a video mail menu.

12. The user interface according to claim 1, wherein said at least one menu hierarachy includes a smart card validation menu.

13. The user interface according to claim 1, wherein said at least one menu hierarchy includes a telephone directory menu.

14. The user interface according to claim 13, wherein said telephone directory menu further includes a residential telephone directory menu.

15. The user interface according to claim 13, wherein said telephone directory menu further includes a business telephone directory menu.

16. The user interface according to claim 13, wherein said at least one menu hierarchy includes an electronic shopping menu.

17. The user interface according to claim 1, wherein said telephone directory menu includes a toll-free number telephone directory menu.

18. The user interface according to claim 1, wherein said at least one menu hierarchy includes a call dialing menu.

19. The user interface according to claim 1, wherein said at least one menu hierarchy includes a parental control menu.

20. The user interface according to claim 19, wherein said parental control menu includes a set top box parental control menu.

21. The user interface according to claim 19, wherein said parental control menu includes a cable modem parental control menu.

22. The user interface according to claim 19, wherein said parental control menu include an IP telephony parental control menu.

23. The user interface according to claim 19, wherein said parent control menu includes a home automation parental control menu.

24. The user interface according to claim 1, wherein said at least one menu hierarch includes a video/audio menu.

25. The user interface according to claim 24, wherein said video/audio menu includes a cable channel menu.

26. The user interface according to claim 24, wherein said video/audio menu includes a satellite channel menu.

27. The user interface according to claim 24, wherein said video/audio menu includes a pay-per-view channel menu.

28. The user interface according to claim 24, wherein said video/audio menu includes a music channel menu.

29. The user interface according to claim 1, wherein said at least one menu hierarchy includes a games menu.

30. The user interface according to claim 1, wherein said at least one menu hierarchy includes a speed dial menu.

* * * * *